3,595,867
2 - PIPERIDINO- AND METHYL-SUBSTITUTED PIPERIDINO-SUBSTITUTED-PHENYL CYCLO-ALKANE-METHANOLS AND DERIVATIVES
Jacob Szmuszkovicz, Kalamazoo, Mich., assignor to The Upjohn Company, Kalamazoo, Mich.
No Drawing. Original application June 13, 1966, Ser. No. 556,892, now Patent No. 3,558,599, dated Jan. 26, 1971. Divided and this application Dec. 23, 1968, Ser. No. 786,385
Int. Cl. C07d 29/16
U.S. Cl. 260—294.7                16 Claims

ABSTRACT OF THE DISCLOSURE
Novel 1,3-aminoalcohol of the formula

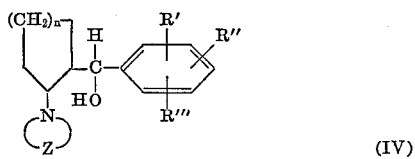

(IV)

wherein $n$ has the value of 1 to 4, inclusive, wherein

is a heterocyclic amino radical of 5 to 10 nuclear atoms, inclusive, wherein R', R'' and R''' are hydrogen, halogen, alkyl and alkoxy containing from 1 to 6 carbon atoms, inclusive, or $CF_3$, are prepared. The new compounds of Formula IV per se as well as in the form of acid addition salts have diuretic activity and some of them have antihyperglycemic activity. Compounds of Formula IV are thus useful to provide diuresis in mammals and are also useful as oral antidiabetic agents.

CROSS-REFERENCES TO RELATED APPLICATIONS

This application is a division of application S.N. 556,892 filed June 13, 1966 by Jacob Szmuszkovicz now Pat. No. 3,558,599.

This invention relates to new organic compounds and is particularly concerned with new 1,3-aminoalcohols, the intermediates thereof, the ethers, esters, N-oxides, acid addition salts and quaternary ammonium salts thereof as well as the process of production therefor.

The novel compounds and the basic process of invention can be illustratively represented by the following sequence of formulae:

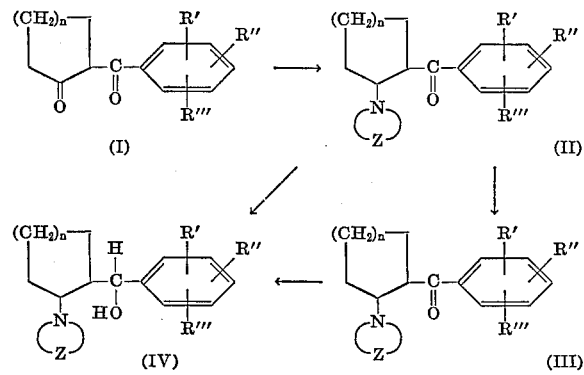

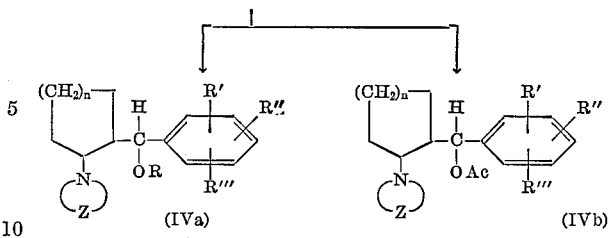

wherein $n$ has the value of 1 to 4, inclusive, wherein

represents a heterocyclic amino radical containing from 5 to 10 nuclear atoms, inclusive, wherein R is an alkyl containing from 1 to 6 carbon atoms, inclusive, wherein R', R'', R''' are selected from the group of substituents consisting of hydrogen, halogen, alkyl and alkoxy containing from 1 to 6 carbon atoms, inclusive, and —$CF_3$, and wherein Ac is the acyl radical of a hydrocarbon carboxylic acid containing from 2 to 12 carbon atoms, inclusive.

The invention further includes the compounds of Formulae IV, IVa and IVb when in the form of the N-oxides, acid addition salts and quaternary alkyl ammonium halides in which the alkyl group has from 1 to 12 carbon atoms, inclusive, and the halogen can be chlorine, bromine and iodine. Also the acid addition salts of the compounds of Formula III are embraced by this invention.

Examples of the cycloalkyl radical illustratively represented by the formula

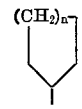

are cyclopentyl, cyclohexyl, cycloheptyl and cyclooctyl.
Examples of the heterocyclic amino radical

having from 5 to 10 nuclear atoms, include: pyrrolidino, 2-methylpyrrolidino, 2-ethylpyrrolidino, 2,2-dimethylpyrrolidino, 3,4-dimethylpyrrolidino, 2-isopropylpyrrolidino, 2-sec.butylpyrrolidino, and like alkylpyrrolidino groups, morpholino, 2-ethylmorpholino, 2-ethyl-5-methylmorpholino, 3,3-dimethylmorpholino, thiamorpholino, 3-methylthiamorpholino, 2,3,6-trimethylthiamorpholino, 4-methylpiperazino, 4-butylpiperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethyleneimino, 2-methylhexamethyleneimino, 3.6-dimethylhexamethyleneimino, homomorpholino, 1,2,3,4-tetrahydroquinolyl, heptamethyleneimino, octamethyleneimino, 3-azabicyclo[3.2.2]nonan-3-yl, 2-azabicyclo[2.2.2]octan-2-yl, and the like.

Illustrative examples of alkyl groups having from 1 to 6 carbon atoms are methyl, ethyl, propyl, isopropyl, butyl, isobutyl, tertiary butyl, pentyl, 2-methylbutyl, neopentyl, hexyl, 2-methylpentyl, 3-methylpentyl and the like. Alkyl groups for the quaternary ammonium halide salts include, in addition to the preceding alkyl groups, others such as heptyl, octyl, nonyl, decyl, undecyl, dodecyl and the like. The halogen moiety in such salts includes iodine, bromine and chlorine.

Illustrative examples of the acyl groups Ac of hydrocarbon carboxylic acids are particularly the acyl groups of alkanoic acids of 2 to 12 carbon atoms, e.g., acetyl, propionyl, butyryl, isobutyryl, valeryl, isovaleryl, hexanoyl, octanoyl, decanoyl, β-cyclopentylpropionyl, lauroyl; of benzoic and aralkanoic acids, e.g., benzoyl, phenyl-acetyl, 3-phenylpropionyl, toluoyl, ethylbenzoyl, propylbenzoyl; of alkenoic acids, e.g., acryloyl, crotonoyl, chrysanthemum monocarbonyl, cinnamoyl, hexenoyl; of alkynoic acids, e.g., propioloyl, 2- and 3-butynoyl and the like.

Under halogen substitutents for R', R" or R'" is understood fluorine, chlorine, bromine and iodine.

The novel compounds III, IV, IVa and IVb exist in different steroisomeric forms such as geometric and optically active forms (e.g., compounds of Formula III have at least two asymmetric carbon atoms, while the final products, IV, IVa and IVb, have at least three asymmetric carbon atoms) as well as in racemic mixtures. These optically active forms and racemic mixtures and geometric isomers are also encompassed by this invention.

The process of the present invention comprises: heating a diketo compound of Formula I in which one of the radicals on the central carbonyl group is a 2-oxocycloalkyl group having from 5 to 8 carbon atoms, inclusive, and the other group is substituted or unsubstituted phenyl, with a heterocyclic amine

having from 5 to 10 nuclear atoms, inclusive, in the presence of an acidic catalyst, e.g., p-toluenesulfonic acid, to give the unsaturated keto compound of Formula II; hydrogenating the thus-obtained Compound II in the presence of hydrogenation catalyst, preferably a noble metal catalyst such a platinum oxide, rhodium, palladium or the like to add stepwise one and thereupon two molar equivalents of hydrogen, thus yielding respectively (with 1 molar equivalent of hydrogen) the keto Compound III and (with 2 molar equivalents of hydrogen) the alcohol IV. The thus-obtained 1,3-amino alcohols IV can be converted to alcohol derivatives such as ethers (IVa) with an alkyl halide (1 to 6 carbon atoms) in the presence of a base, or with a lower alkanol (1 to 6 carbon atoms) in the presence of anhydrous hydrogen chloride, and to esters (IVb) with an acid anhydride or acid halide in a suitable organic solvent.

The amino function in Formulae IV, IVa and IVb compounds furthermore permits the transformation of these compounds, by neutralization with inorganic and organic acids, into acid addition salts such as the hydrochloride, hydrobromide, hydroiodide, sulfate, phosphate, perchlorate, pamoate, cyclohexanesulfamate, methanesulfonate, ethanesulfonate, p - toluenesulfonate, benzenesulfonate, tartrate, citrate, lactate, and the like. By treatment of the compounds of Formulae IV, IVa and IVb with peracids such as m-chloroperbenzoic acid, peracetic acid, perbenzoic acid, perphthalic acid, and the like, the corresponding N-oxide derivatives are obtained. By treatment of the compounds of Formulae IV, IVa and IVb with alkyl halides, the corresponding quaternary ammonium halide salts are obtained.

The compounds of Formulae IV, IVa and IVb, including the acid addition salts, the N-oxides, and the alkyl quaternary ammonium halides thereof, are compounds of significant diuretic activity. The may be administered to mammals and birds by both oral and parenteral routes in order to produce their pharmacological, that is, diuretic effects. For oral administration, the new compounds of Formulae IV, IVa and IVb, as well as the acid addition salts, the N-oxides and the quaternary ammonium halides salts, can be compounded into solid and liquid unit dosage forms such as tablets, capsules, powders, granules, syrups, elixirs and the like, containing the appropriate amounts for treatment. For tablets, common pharmaceutically acceptable carriers are used such as starch, lactose, kaolin, dicalcium phosphate and the like. The compounds IV, IVa and IVb can also be given as powders, particularly in gelatin capsules with or without carriers such as methylcellulose, magnesium stearate, calcium stearate, talc and the like. For fluid preparations, these compounds may be dissolved or suspended in aqueous alcoholic vehicles with or without buffering agents and flavoring mixtures.

The thus-obtained pharmaceutical formulations are administered to edematous animals for the treatment of conditions associated with excess electrolyte retention and excess fluid retention. For example, the compositions are useful in treating the following conditions: edema associated with hepatic disease, edema and toxemia of pregnancy, hypertensive vascular disease, premenstrual fluid retention and congestive heart failure. Dosages between 0.5 and 30 mg./kg. of body weight are suitable to produce significantly increased diuresis. For example, the ether cis-1-[2 - ($\alpha$,p - dimethoxybenzyl)cyclohexyl]piperidine of melting point 83–85° C. produced at 5 mg. dosage level per kg. of body weight of rats a 73% increase in diuresis, as determined by the procedure of Lipschitz et al., J. Pharmacol. Exp. Therap. 79, 97, 1943.

The compounds of Examples 38, 39, 48, 54, 55, 97, 99, 100 and 136A have demonstrated significant anti-hyperglycemic activity in rats. They are useful as oral anti-diabetic agents.

As noted above, the new compounds of Formulae IV, IVa and IVb can be used in the form of their acid addition salts with inorganic or organic acids, for example, hydrochlorides, lactates, sulfates, tartrates, hydroiodides, hydrobromides, and the like. Moreover, the fluosilicates of these compounds are useful moth-proofing agents according to U.S. Pats. 1,915,334 and 2,075,359. The thiocyanic acid addition salts of the same compounds can be condensed with formaldehyde to form resinous polymers which according to U.S. Pats. 2,425,320 and 2,606,155 are useful as pickling inhibitors. The trichloroacetic acid addition salts of the compounds of the same Formulae IV, IVa and IVb are useful as herbicides, for example, against Johnson grass, yellow foxtail, green foxtail, Bermuda grass and quack grass.

The alkyl quaternary ammonium halides of the compounds of Formulae IV, IVa and IVb, such as $\alpha$-(3,4,5-trimethoxyphenyl)-2-(hexahydro-1-methyl-1 - azepinium) cyclohexanemethanol iodide (Example 142), possess high wetting power and electroconductivity and are thus suitable to prepare electrocardiographic jellies.

A suitable composition of an electrocardiographic jelly thus prepared comprises:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding the quaternary ammonium salt. The mixture is then allowed to stand for at least two days with occasional agitation to allow the formation of a gel.

The starting materials of Formula I are known in part from the art, e.g., Campbell et al., J. Am Chem. Soc. 82, 2389 (1960); Linn et al., J. Am. Chem. Soc. 78, 6066 (1956); Eistert et al., Ann. 650, 133 (1961). An elegant method by which the 1,3-diones of the types of Formula I are synthesized consists of the reaction of a selected cycloalkanone with pyrrolidine or piperidine to give the corresponding enamine and to react the enamine with a selected substituted or unsubstituted benzoyl chloride [Campbell et al., J. Org. Chem. 28, 379 (1963)]. This particular method is shown repeatedly in the examples in order to synthesize hitherto unoknwn 1,3-diones of the type of Formula I.

In carrying out the process of the present invention a 1,3-diketo compound (I) is reacted with a heterocyclic amine in the presence of a acid catalyst and preferably under conditions in which the water produced in the condensation process is separated from the reaction mixture such as by employing an azeotropic separator together with the reflux condenser. As solvent, essentially water-free organic solvents are used such as benzene, toluene, xylene or the like. The heterocyclic amines used include particularly pyrrolidine, 2-methylpyrrolidine, 2-ethylpyrrolidine, 2,2-dimethylpyrrolidine, 3,4-dimethylpyrrolidine, 2-isopropylpyrrolidine, 2-sec.butylpyrrolidine and other like alkylpyrrolidines; morpholine, 2-ethylmorpholine, 2-ethyl-5-methylmorpholine, 3,3-dimethylmorpholine, thiamorpholine, 3-methylthiamorpholine, 2,3,6-trimethylthiamorpholine and other like alkylmorpholines and alkylthiamorpholines; 4-methylpiperazine, 4-butylpiperazine and other like alkylpiperazines; piperidine, 2-methylpiperidine, 3-methylpiperidine, 4-methylpiperidine, 4-propylpiperidine, 2-propylpiperidine, 4-isopropylpiperidine and other like alkylpiperidines; hexamethyleneimine, 2-methylhexamethyleneimine, 3,6 - dimethylhexamethyleneimine and other like alkylhexamethyleneimines; homomorpholine, 1,2,3,4-tetrahydroquinoline, heptamethyleneimine, octamethyleneimine, 3-azabicyclo[3.2.2]nonane, 2-azabicyclo[2.2.2]octane, and the like.

The reaction is generally carried out at temperatures between 50–150° C. but lower or higher temperatures are operative. Preferably, the reaction is carried out at the reflux temperature of the reaction mixture. The time for completion of the reaction is between 1 hour and 48 hours, but if low temperatures are used, longer reaction times are necessary. When the reaction is terminated, the product is isolated in conventional manner such as evaporating the reaction mixture to dryness.

The keto product of Formula II is then hydrogenated in the presence of a catalyst, preferably platinum oxide, at a hydrogen pressure between 40 and 60 pounds per square inch. Larger or smaller pressures can be used, but pressures between 50–55 pounds at the beginning of the reaction are found to be most convenient. The reaction can be followed by the hydrogen absorption and can be allowed to go to completion, that is, to the point of addition of 2 molar equivalents of hydrogen to give the alcohol of Formula IV, or alternatively may be interrupted after the addition of 1 molar equivalent of hydrogen to give the keto compound of Formula III. In cases where the addition of hydrogen is slow, additional amounts of catalyst may be added after an interval of several hours. Other catalysts that can be used in this reaction are palladium and rhodium, and these catalysts can be used with catalyst carriers such as charcoal, alumina and the like. After the hydrogenation is completed, the product is isolated by filtering the mixture to remove the catalyst and evaporating the solvent to obtain either the keto compound of Formula III or the alcohol of Formula IV. The thus-isolated products are purified by conventional means such as by crystallization and recrystallization, chromatography, or the like. If desired, the keto product of Formula III can be hydrogenated again to give the alcohol of Formula IV.

The conversion of the alcohol of Formula IV to an ether of Formula IVa is usually achieved by two methods: (1) reacting the alcohol of Formula IV in liquid ammonia containing sodium amide or potassium amide at low temperature with the selected alkyl halide, or (2) reacting the alcohol of Formula IV with a lower alkanol in the presence of hydrogen chloride. The starting temperature of the first method is usually the temperature of a Dry Ice-acetone bath, that is, approximately −70° C. and is completed at about room temperature. In the preferred embodiment of this invention, the selected alcohol (IV), is dissolved in ether and is added to liquid ammonia containing sodium amide under continuous stirring. When this mixture reaches the Dry Ice-acetone bath temperature, a solution of the alkyl halide, preferably an alkyl iodide, is added over a few minutes time to allow cooling. When the calculated amount of alkyl halide is consumed, the reaction mixture in the flask is removed from the Dry Ice-acetone bath and allowed to warm to room temperature under continuous stirring. Instead of sodium amide, other strong basic compounds can be used such as potassium amide, lithium amide, and the like. Instead of liquid ammonia and alkali metal amides, other reaction systems can be used, e.g., butyl lithium in the presence of tetrahydrofuran and a temperature range of about −70° to 25° C. After the reaction is terminated, the ether thus produced (IVa) is isolated by conventional procedures such as extraction, evaporation of solvents, formation of amine addition salts such as the hydrochloride, and using the differential water solubility of the hydrochloride and the like. For purification, recrystallization and chromatography are usually employed.

In the second method, the alcohol IV is stirred with a solution of hydrogen chloride gas in a lower alkanol, e.g., methanol, ethanol, propanol, 1-butanol, 2-butanol and the like, usually at room temperature. Lower or higher temperatures are operative, however. The product is obtained as a hydrochloride of the amino ether. The free base is obtained by treating the hydrochloride with a base, e.g., 20% aqueous sodium hydroxide, extracting the free base with a water-immiscible solvent, e.g., ether, methylene chloride, chloroform and the like and evaporating the solvent.

Esters (IVb) of the alcohol of Formula IV are usually obtained in conventional manner, that is, treatment of the alcohol with an acid anhydride or acid halide, preferably in solution at room temperature. The solvents used in this reaction are methylene chloride, tetrahydrofuran, pyridine and the like. The anhydrides used in this reaction are usually of hydrocarbon carobxylic acids, e.g., of alkanoic acids such as acetic, propionic, butyric, isobutyric, valeric, hexanoic, heptanoic, octanoic acids and the like; of benzoic and aralkanoic acids such as acid, salicyclic acid, toluic acid, phenylacetic acid, 3-phenylpropionic acid and the like; of cycloalkanoic acids, e.g., of cyclohexanecarboxylic acid and the like. The acid halides used in this reaction can be of alkanoic acids, particularly higher alkanoic acids having from 6 to 12 carbon atoms, such as hexanoyl chloride, hepanoyl chloride, octanoyl chloride, decanoyl chloride, undecanoyl chloride, lauroyl chloride or the acid bromides thereof, but the chlorides and bromides of lower alkanoic acids are also useful. The invention also encompasses the use of the anhydrides and acid chlorides and bromides of unsaturated acids such as cinnamic acid, acrylic acid, crotonic acid, propiolic acid, 2-butynoic acid, chrysanthemum monocarboxylic acid and the like. After termination of the reaction; the product is isolated by conventional procedures such as extraction, chromatography, crystallization and the like.

Acid addition salts of the amino alcohols (IV), amino ethers (IVa) and amino esters (IVb) are synthesized in the usual manner, that is, by directly reacting the acid with the free amine, preferably in an aqueous or anhydrous solvent such as water, ether, methanol, ethanol, ethyl acetate or the like. Evaporation of the solvent provides the desired acid addition salt.

N-oxides of the compounds of Formulae IV, IVa and IVb are obtained by reacting the compound at a temperature between 0–30° C., preferably at the start of the reaction at a temperature between 0–10° C., with a peracid such as peracetic, perpropionic, perbenzoic, perphthalic, m-chloroperbenzoic or other organic peracids in a solvent such as methanol, ethanol, ether or the like. Evaporation of the solvent provides the desired N-oxide of the products of Formulae IV, IVa and IVb.

The alkyl quaternary ammonuim halides of products of Formulae IV, IVa and IV are produced by conventional methods such as heating to reflux a solution of the selected compound IV, IVa or IVb in the presence of methanol, ethanol, acetonitrile or the like with a selected alkyl halide such as an iodide or bromide or, less desirably, a chloride of methyl, ethyl, propyl, butyl, isobutyl, isopropyl, pentyl, hexyl, heptyl, octyl, decyl, undecyl, dodecyl or isomers of these alkyl compounds. After the reaction is terminated, the reaction mixture is evaporated to dryness to give the product which can be purified by recrystallization from organic solvents such as methanol, ethanol, ether, Skellysolve B hexanes, mixtures thereof and the like.

It is obvious from the configuration of products III, IV, IVa and IVb that these products can exist in more than one isomeric structure, since the compounds of Formula III have at least two asymetric centers and those of Formulae IV, IVa and IVb have at least three asymetric centers, as noted above. It will be seen from the examples that many of the reactions are either stereospecific giving only one single product (racemic) or are stereo-selective, that is, giving one major component with smaller amounts of other components. Thus, the hydrogenation of the compound II to the ketone III with platinum oxide appears to give only one single form of the cis-ketone. Heating the thus-obtained cis-ketone with a base, for example, refluxing it with piperidine, produces a single trans-ketone (III), which according to thermodynamic principles of stability has the substituents on the cycloalkane moiety of the equatorial position.

Further hydrogenation of a cis-ketone of Formula III with platinum oxide as catalyst produces one single cis-alcohol form (racemate A). Heating this cis-alcohol of Formula IV with trifluoroacetic acid produces another Formula IV cis-alcohol (racemate B).

Further hydrogenation of a trans-ketone of Formula III with platinum oxides as catalyst produces one single Formula IV trans-alcohol (racemate C) which can be converted to the other Formula IV trans-alcohol (racemate D) with trifluoroacetic acid. Reduction of a trans-ketone of Formula III with lithium aluminum hydride produces the two above-mentioned trans-alcohols of Formual IV. The racemates can be resolved by standard methods. The subsequent examples further illustrate the stereo-isomeric considerations.

The following examples are illustrative of the process and products of the present invention, but are not to be construed as limiting.

EXAMPLE 1

2-(3,4,5-trimethoxybenzoyl)cyclohexanone

A mixture of 147 g. (1.5 moles) of cyclohexanone and 213.3 g. (3 moles) of pyrrolidine was refluxed in 2250 ml. of benzene in a flask equipped with an azeotropic separator. After the water formed during the reaction was collected, the solution was evaporated to dryness in vacuo and the resulting crude oil, consisting of 1-pyrrolidino-1-cyclohexene, was used directly for the next step.

A solution of 3,4,5-trimethoxybenzoyl chloride (138.3 g.; 0.6 mole) in 240 ml. of chloroform was added during a period of 2 hours to a solution of the crude 1-pyrrolidino-1-cyclohexene in 630 ml. of chloroform, under a nitrogen atmosphere, with continuous stirring while keeping the temperature between 5 to 10° C. After the solution was stirred overnight (about 18 hours) at room temperature (about 22 to 25° C.), there was added 900 ml. of 10% aqueous hydrochloric acid, and the resulting mixture was stirred at room temperature for 2 hours. The aqueous layer was extracted with two 150-ml. portions of chloroform, and the chloroform extracts were combined with the chloroform layer above. The combined extracts were washed with water, saturated aqueous sodium bicarbonate solution, water and saturated salt solution. The thus-obtained chloroform solution was dried by passing it through anhydrous sodium sulfate and the dry solution was evaporated to give a residue which was crystallized from methanol to yield 100 g. of long, colorless needles of 2-(3,4,5-trimethoxybenzoyl) cyclohexanone of melting point 141–142° C.

*Analysis.*—Calcd. for $C_{16}H_{20}O_5$ (percent): C, 65.74; H, 6.90. Found (percent): C, 65.48; H, 6.84.

EXAMPLE 2

2-(3,4,5-trimethoxybenzoyl)cyclopentanone

A mixture of 126 g. (1.5 moles) of cyclopentanone and 213.3 g. (3 moles) of pyrrolidine was refluxed in 2250 ml. of benzene in a flask equipped with an azeotropic separator. After the calculated amount of water, produced during the condensation, had been collected, the reaction mixture was evaporated to give as an oil 1-pyrrolidino-1-cyclopentene.

A solution of 3,4,5-trimethoxybenzoyl chloride (138.3 g.; 0.6 mole) in chloroform was added to a chloroform solution of the oily 1-pyrrolidino-1-cyclopentene over a period of 1 hour. The reaction mixture was thereupon worked up as in Example 1 to give a brown oil weighing 190 g. This oil was dissolved in 500 ml. of ethanol and the ethanol solution was added to a solution of 172 g. of cupric acetate monohydrate in 2600 ml. of water. The mixture was stirred for ½ hour, cooled and filtered, providing a crude copper complex of 2-(3,4,5-trimethoxybenzoyl) cyclopentanone. This product was crystallized from methylene chloride to give 70 g. of the pure copper complex melting at 206–208° C.

*Analysis.*—Calcd. for $C_{30}H_{34}CuO_{10}$ (percent): C, 58.29; H, 5.54; Cu, 10.28. Found (percent): C, 58.58; H, 5.81; Cu, 9.49.

The thus-obtained copper complex (70 g.) was dissolved in 350 ml. of chloroform and decomposed with 670 ml. of 10% aqueous hydrochloric acid to give 60 g. (yield 36%) of 2-(3,4,5-trimethoxybenzoyl)cyclopentanone having a melting point of 81–86° C. A sample of this material was recrystallized from Skellysolve B hexanes to give 2-(3,4,5-trimethoxybenzoyl)cyclopentanone of melting point 92–95° C.

*Analysis.*—Calcd. for $C_{15}H_{18}O_5$ (percent): C, 64.73; H, 6.52. Found (percent): C, 64.95; H, 6.52.

In a run twice the size of the above synthesis, a yield of 47% was obtained.

EXAMPLE 3

2-(3,4,5-trimethoxybenzoyl)cycloheptanone

A mixture of 500 g. of cycloheptanone (4.5 moles), 785 g. of morpholine (9 moles), 900 ml. of toluene and 5 g. of p-toluene-sulfonic acid was refluxed for 23 hours, collecting the water produced in the reaction with an azeotropic separator. Ninety-eight ml. of a lower phase was collected and discarded. The remaining mixture was then evaporated in vacuo to give an oil which was distilled. The fraction boiling between 119–125° C. consisted essentially of 262.7 g. of 1-morpholino-1-cycloheptene (32% yield).

In the manner given in Example 1, 3,4,5-trimethoxybenzoyl chloride (92.5 g.; 0.4 mole) was reacted with 181.37 g. (1 mole) of 1-morpholino-1-cycloheptene. The crude product was crystallized from 500 ml. of methanol and gave a first crop of 26 g. of 2-(3,4,5-trimethoxybenzoyl)cycloheptanone of melting point 99–100° C. After two more recrystallizations from methanol, the product had a melting point of 107–108° C.

*Analysis.*—Calcd. for $C_{17}H_{22}O_5$ (percent): C, 66.65; H, 7.24. Found (percent): C, 66.16; H, 7.48.

From the above methanolic filtrate another 48.3 g. of 2-(3,4,5-trimethoxybenzoyl)cycloheptanone was obtained as a second crop. The total yield was 61%.

EXAMPLE 4

2-(p-methoxybenzoyl)cyclohexanone

A solution of 167 g. (0.98 mole) of p-anisoyl chloride in 480 ml. of chloroform was added during a period of 1.5 hours to a solution of 371.7 g. (2.46 moles) of distilled 1-pyrrolidino-1-cyclohexene in 1260 ml. of chloroform. The temperature was kept between 5–10° C. by cooling with ice. After stirring for a period of about 20 hours at room temperature, the mixture was decomposed by addition of 1800 ml. of 10% aqueous hydrochloric acid over a period of 20 minutes. The mixture was then stirred for 2 hours, allowed to settle, the organic layer was separated and the aqueous layer extracted twice with 250 ml. portions of chloroform. The original organic layer and the chloroform extracts were combined, washed with water, saturated salt solution, and then dried by passage through sodium sulfate and evaporated. The residue resulting from the above evaporation was a brown oil which was dissolved in 1 l. of ethanol and added to a solution of 344 g. of cupric acetate monohydrate in 5200 ml. of water, preheated to 65° C. The mixture was stirred for 0.5 hour, cooled to room temperature and filtered. The obtained precipitate was washed with water and then with ether. It was then dissolved in 800 ml. of chloroform and added to a solution of 300 ml. of concentrated hydrochloric acid in 1100 ml. of water. The mixture was stirred for 1 hour. The organic layer was separated, and the aqueous layer was extracted once with chloroform. The combined chloroform original layer and extract were washed with water, saturated salt solution, dried by passing through anhydrous sodium sulfate and evaporated, to give a solid which was crystallized from 7 l. of methanol, yielding 136.5 g. of 2-(p-methoxybenzoyl)cyclohexanone having a melting point of 115–128° C. A second crop of 26 g., melting point 116–127° C., was obtained from the mother liquor; the total yield was 71%. A recrystallized sample from methanol of 2-(p-methoxybenzoyl) cyclohexanone had a melting point of 117–122° C.

*Analysis.*—Calcd. for $C_{14}H_{16}O_3$ (percent): C, 72.39; H, 6.94. Found (percent): C, 72.30; H, 7.05.

EXAMPLE 5

*2-(p-methoxybenzoyl)cyclopentanone*

In the manner given in Example 2, 204 g. (1.2 moles) of p-anisoyl chloride was reacted with 1-pyrrolidino-1-cyclopentene prepared from 252 g. (3 moles) of cyclopentanone. The crude product was converted to the copper complex as in Example 4, the complex being crystallized from chloroform-ether to give 80 g. of copper complex of 2-(p-methoxybenzoyl)cyclopentanone with a melting point of 252° C. dec.). The copper complex was decomposed with hydrochloric acid to give 67 g. of an oil which was crystallized from ethanol to give 13.9 g. of 2-(p-methoxybenzoyl)cyclopentanone of melting point 82–83° C. The filtrate from the first crystallization was evaporated to dryness and the residue crystallized from ether-Skellysolve B hexanes to give 30.1 g. of a second crop of 2-(p-methoxybenzoyl)cyclopentanone of melting point 76–77° C. (total yield 17%). Two crystallizations from methanol gave 2-(p-methoxybenzoyl)cyclopentanone having a melting point of 83–87° C.

*Analysis.*—Calcd. for $C_{13}H_{14}O_3$ (percent): C, 71.54; H, 6.47. Found (percent): C, 71.83; H, 6.48.

EXAMPLE 6

*2-(p-ethoxybenzoyl)cyclohexanone*

In the manner given in Example 2, 1-piperidino-1-cyclohexene was reacted with p-ethoxybenzoyl chloride in chloroform solution to give, after the copper complex purification procedure (Example 2), 2-(p-ethoxybenzoyl)cyclohexanone.

EXAMPLE 7

*2-(p-benzyloxybenzoyl)cyclohexanone*

In the manner given in Example 2, 1-pyrrolidino-1-cyclohexene was reacted with p-benzyloxybenzoyl chloride in cholroform solution to give, after the copper complex purification procedure (Example 2), 2-(p-benzyloxybenzoyl)cyclohexanone of melting point 111–111.5 C.

EXAMPLE 8

*2-[p-(2-hydroxyethoxy)benzoyl]cyclohexnone*

In the manner given in Example 2, 1-piperidino-1-cyclohexene was reacted with p-(2-acetoxyethoxy)benzoyl chloride in chloroform solution to give, after the copper complex purification procedure (Example 2), 2-[p-(2-acetoxyethoxy)benzoyl]cyclohexanone. The 2-[p-(2-acetoxyethoxy)benzoyl]cyclohexanone was subjected to alkaline hydrolysis in conventional manner, neutralized with acid and 2-[p-(2-hydroxyethoxy)benzoyl]cyclohexnone recovered by extraction.

EXAMPLE 9

*2-(o-methoxybenzoyl)cyclohexanone*

In the manner given in Example 2, 1-piperidino-1-cyclohexene was reacted with o-methoxybenzoyl chloride in chloroform solution to give, after the copper complex purification procedure (Example 2), 2-(o-methoxybenzoyl)cyclohexanone of melting point 65–68° C.

EXAMPLE 10

*2-(o-hydroxybenzoyl)cyclohexanone*

In the manner given n Example 2, 1-piperidino-1-cyclohexene was reacted with o-acetoxybenzoyl chloride in chloroform solution to give, after the copper complex purification procedure (Example 2), 2-(o-acetoxybenzoyl)cyclohexanone. The thus-obtained 2-(o-acetoxybenzoyl)cyclohexanone was subjected to alkaline hydrolysis, the mixture acidified and the 2-(o-hydroxybenzoyl) cyclohexanone recovered by extraction.

EXAMPLE 11

*2-(2-ethoxy-4-methylbenzoyl)cyclohexanone*

In the manner given in Example 2, 1-piperidino-1-cyclohexene was reacted with 2-methoxy-4-methylbenzoyl chloride in chloroform solution to give, after the copper complex purification procedure (Example 2), 2-(2-methoxy-4-methylbenzoyl)cyclohexanone.

EXAMPLE 12

*2-(p-methoxybenzoyl)-4,4-dimethylcyclohexanone*

In the manner given in Example 2, 1-piperidino-4,4-dimethyl-1-cyclohexene was reacted with p-methoxybenzoyl chloride in chloroform solution to give, after the copper complex purification procedure (Example 2), 2-(p-methoxybenzoyl)-4,4-dimethylcyclohexanone.

EXAMPLE 13

*2-(3,5-dimethyl-4-methoxybenzoyl)cyclohexanone*

In the manner given in Example 2, 1-pyrrolidino-1-cyclohexene was reacted with 3,5-dimethyl-4-methoxybenzoyl chloride in chloroform solution to give, after the copper complex purification procedure (Example 2), 2-(3,5-dimethyl-4-methoxybenzoyl)cyclohexanone of melting point 125–126° C.

EXAMPLE 14

*2-[p-(methylcarbamoyloxy)benzoyl]cyclohexanone*

In the manner given in Example 2, 1-piperidino-1-cyclohexene was reacted with p-methylcarbamoyloxybenzoyl chloride in chloroform solution to give, after the copper complex purification procedure (Example 2), 2-[p-(methylcarbamoyloxy)benzoyl]cyclohexanone.

EXAMPLE 15

*2-(3,4-methylenedioxybenzoyl)cyclohexanone*

In the manner given in Example 2, 1-piperidino-1-cyclohexene was reacted with 3,4-methylenedioxybenzoyl chloride in chloroform solution to give, after the copper complex purification procedure (Example 2), 2-(3,4-methylenedioxybenzoyl)cyclohexanone.

EXAMPLE 16

*2-(p-trifluoromethylbenzoyl)cyclohexanone*

In the manner given in Example 2, 1-piperidino-1-cyclohexene was reacted with p-trifluoromethylbenzoyl chloride in chloroform solution to give, after the copper complex purification procedure (Example 2), 2-(p-trifluoromethylbenzoyl)cyclohexanone.

EXAMPLE 17

2-(p-chlorobenzoyl)cyclohexanone

In the manner given in Example 2, 1-piperidino-1-cyclohexene was reacted with p-chlorobenzoyl chloride in chloroform solution to give, after the copper complex purification procedure (Example 2), 2-(p-chlorobenzoyl)cyclohexanone.

EXAMPLE 18

2-(p-hydroxybenzoyl)cyclohexanone

In the manner given in Example 2, 1-piperidino-1-cyclohexene was reacted with p-acetoxybenzoyl chloride in cholroform solution to give, after the copper complex purification procedure (Example 2), 2-(p-acetoxybenzoyl)cyclohexanone. The thus-obtained 2-(p-acetoxybenzoyl)cyclohexanone was subjected to alkaline hydrolysis, the mixture acidified and the 2-(p-hydroxybenzoyl)cyclohexanone recovered by extraction.

EXAMPLE 19

2-(o-methylbenzoyl)cyclohexanone

In the manner given in Example 2, 1-piperidino-1-cyclohexene was reacted with o-methylbenzoyl chloride in chloroform solution to give, after the copper complex purification procedure (Example 2), 2-(o-methylbenzoyl)cyclohexanone.

EXAMPLE 20

2-(p-methylbenzoyl)cyclohexanone

In the manner given in Example 2, 1-pyrrolidino-1-cyclohexene was reacted with p-methylbenzoyl chloride in chloroform solution to give, after the copper complex purification procedure (Example 2), 2-(p-methylbenzoyl)cyclohexanone of melting point 108–110° C.

EXAMPLE 21

2-(2,4-dimethylbenzoyl)cyclohexanone

In the manner given in Example 2, 1-pyrrolidino-1-cyclohexene was reacted with 2,4-dimethylbenzoyl chloride in chloroform solution to give, after the copper complex purification procedure (Example 2), 2-(2,4-dimethylbenzoyl)cyclohexanone of melting point 51–52.5° C.

EXAMPLE 22

2-(2-methoxy-4-methylbenzoyl)cyclohexanone

In the manner given in Example 2, 1-piperidino-1-cyclohexene was reacted with 2-methoxy-4-methylbenzoyl chloride in chloroform solution to give, after the copper complex purification procedure (Example 2), 2-(2-methoxy-4-methylbenzoyl)cyclohexanone.

EXAMPLE 23

2-(2-hydroxy-5-chlorobenzoyl)cyclohexanone

In the manner given in Example 2, 1-piperidino-1-cyclohexene was reacted with 2-acetoxy-5-chlorobenzoyl chloride in chloroform solution to give, after the copper complex purification procedure (Example 2), 2-(2-acetoxy-5-chlorobenzoyl)cyclohexanone. The thus-obtained 2-(2-acetoxy-5-chlorobenzoyl)cyclohexanone was subjected to alkaline hydrolysis, the mixture acidified and the 2-(2-hydroxy-5-chlorobenzoyl)cyclohexanone recovered by extraction.

EXAMPLE 24

2-(p-allyloxybenzoyl)cyclohexanone

In the manner given in Example 2, 1-piperidino-1-cyclohexene was reacted with p-allyloxybenzoyl chloride in chloroform solution to give after the copper complex purification procedure (Example 2), 2-(p-allyloxybenzoyl)cyclohexanone.

EXAMPLE 25

2-[p-(carboxymethoxy)benzoyl]cyclohexanone

In the manner given in Example 2, 1-piperidino-1-cyclohexene was reacted with p-(carboxymethoxy)benzoyl chloride in chloroform solution to give, after the copper complex purification procedure (Example 2), 2-[p-(carboxymethoxy)benzoyl]cyclohexanone.

EXAMPLE 26

2-(p-benzyloxybenzoyl)cycloheptanone

In the manner given in Example 2, 1-pyrrolidino-1-cycloheptane was reacted with p-benzyloxybenzoyl chloride in chloroform solution to give after the copper complex purification procedure (Example 2), 2-(p-benzyloxybenzoyl)cycloheptanone.

EXAMPLE 27

2-(p-ethoxybenzoyl)cyclooctanone

In the manner given in Example 2, 1-morpholino-1-cyclooctene was reacted with p-ethoxybenzoyl chloride in chloroform solution to give, after the copper complex purification procedure (Example 2), 2-(p-ethoxybenzoyl)cyclooctanone

EXAMPLE 28

2-(2,3,4-trimethoxybenzoyl)cyclooctanone

In the manner given in Example 2, 1-piperidino-1-cyclooctene was reacted with 2,3,4-trimethoxybenzoyl chloride in chloroform solution to give, after the copper complex purification procedure (Example 2), 2-(2,3,4-trimethoxybenzoyl)cyclooctanone.

EXAMPLE 29

2-(p-bromobenzoyl)cyclooctanone

In the manner given in Example 2, 1-piperidino-1-cyclooctene was reacted with p-bromobenzoyl chloride in chloroform solution to give, after the copper complex purification procedure (Example 2), 2-(p-bromobenzoyl)cyclooctanone.

EXAMPLE 30

2-(3-methylbenzoyl)cyclooctanone

In the manner given in Example 2, 1-piperidino-1-cyclooctene was reacted with 3-methylbenzoyl chloride in chloroform solution to give, after the copper complex purification procedure (Example 2), 2-(3-methylbenzoyl)cyclooctanone.

In the same manner given in the foregoing examples, other 2-benzoylcycloalkanones of Formula I (starting compounds) are prepared by reacting a 1-cyclicamino-1-cycloalkene, wherein the cycloalkene moiety has from 5 to 8 nuclear carbon atoms, inclusive, and the cyclicamino moiety has from 5 to 10 nuclear atoms, inclusive, with a selected benzoyl chloride. Representative starting materials, thus prepared, include:

2-(3,5-diiodobenzoyl)cyclopentanone;
2-(p-fluorobenzoyl)cyclohexanone;
2-(2-methoxy-4-chlorobenzoyl)cyclohexanone;
2-(2-methoxy-3-methylbenzoyl)cyclohexanone;
2-(2-methyl-4-trifluoromethylbenzoyl)cyclohexanone;
2-(3,4-dipropylbenzoyl)cycloheptanone;
2-(2,5-dichlorobenzoyl)cycloheptanone;
2-(3,4-dichlorobenzoyl)cyclooctanone;
2-(p-propoxybenzoyl)cyclooctanone;
2-(2,5-diiodobenzoyl)cycloheptanone;
2-(3-fluorobenzoyl)cyclopentanone;
2-(p-bromobenzoyl)cyclopentanone;
2-(p-hexylbenzoyl)cyclopentanone;
2-(3-pentylbenzoyl)cyclohexanone;
2-(2-butylbenzoyl)cyclohexanone;
2-(2-propylbenzoyl)cycloheptanone;

2-(3-ethylbenzoyl)cyclooctanone;
2-(2-methoxy-5-bromo)cyclopentanone;
2-benzoylcyclooctanone;
2-benzoylcycloheptanone;
and the like.

EXAMPLE 31

*3,4,5-trimethoxyphenyl 2-piperidino-1-cyclohexen-1-yl ketone*

A mixture consisting of 35 g. (0.12 mole) of 2-(3,4,5-trimethoxybenzoyl)cyclohexanone, 30.6 g. (0.36 mole) of piperidine, 960 ml. of toluene, and 0.8 g. of p-toluenesulfonic acid was refluxed for 23 hours under nitrogen using an azeotropic separator (during this time 1.8 ml. of water was collected). The mixture was thereupon evaporated to dryness to give partially crystalline 3,4,5-trimethoxyphenyl 2-piperidino-1-cyclohexen-1-yl ketone.

EXAMPLE 32

*α-(3,4,5-trimethoxyphenyl)-2-piperidinocyclohexanemethanol and its hydrochloride*

A solution of 3,4,5-trimethoxyphenyl 2-piperidino-1-cyclohexen-1-yl ketone [prepared from 35 g. of 2-(3,4,5-trimethoxybenzoyl)cyclohexanone and 30.6 g. of piperidine, as in Example 31] in 300 ml. of ethanol was hydrogenated in the presence of 1.2 g. of platinum oxide at an initial pressure of 50.1 pounds of hydrogen. Two molar equivalents of hydrogen were taken up during 3.5 hours. The mixture was filtered through a filter aid and evaporated to dryness. The oily residue was dissolved in 400 ml. of ether and 400 ml. of 10% aqueous hydrochloric acid was added. The thus-obtained reaction mixture was stirred for 0.5 hour. A suspension was obtained which was filtered, yielding an "original filtrate" and a solid which was washed with ether. The solid was twice recrystallized from methanol to give 14.7 g. of α-(3,4,5-trimethoxyphenyl)-2-piperidinocyclohexanemethanol hydrochloride of melting point 265–266° C. An analytical sample, prepared by additional recrystallization from methanol had a melting point of 266–267° C. Ultraviolet: sh. 228 (8,100); sh. 232; λ max. 269 (825); sh. 278 (612).

*Analysis.*—Calcd. for $C_{21}H_{33}NO_4 \cdot HCl$ (percent): C, 63.06; H, 8.57; Cl, 8.87; N, 3.50. Found (percent): C, 62.99; H, 8.24; Cl, 8.66; N, 3.46.

The above "original filtrate" was separated into layers, the aqueous layer was extracted with ether and then basified and extracted with methylene chloride. The extract was washed with water and saturated salt solution, then dried by pouring through anhydrous sodium sulfate and the water-free solution was evaporated to give 5.0 g. of an oil. The oil was converted to the hydrochloride with ethereal hydrogen chloride to give a second crop of 0.7 g. of α-(3,4,5 - trimethoxyphenyl)-2-piperidinocyclohexanemethanol hydrochloride (total yield 32%; 15.4 g.).

The ether layer, after washing, drying and evaporation, gave 6.1 g. of an oil which was redissolved in ether and allowed to crystallize, yielding 0.5 g. of α-(3,4,5-trimethoxyphenyl) - 2 - hydroxycyclohexanemethanol of melting point 130–131° C. (after additional recrystallization from ether).

*Analysis.*—Calcd. for $C_{16}H_{24}O_5$ (percent): C, 64.84; H, 8.16. Found (percent): C, 64.69; H, 8.29.

EXAMPLE 33

*3,4,5-trimethoxyphenyl 2-morpholino-1-cyclohexene-1-yl ketone*

In the manner given in Example 31, 8.75 g. of 2-(3,4,5-trimethoxybenzoyl)cyclohexanone, 7.84 g. of morpholine, 240 ml. of benzene and 0.2 g. of p-toluenesulfonic acid was refluxed under nitrogen for a period of 23 hours whereby 0.49 ml. of water was collected. The solution was evaporated and the material worked up as in Example 31 to give 3,4,5-trimethoxyphenyl 2-morpholino-1-cyclohexene-1-yl ketone.

EXAMPLE 34

*α-(3,4,5-trimethoxyphenyl)-2-morpholinocyclohexanemethanol and its hydrochloride*

A solution of 3,4,5-trimethoxyphenyl 2-morpholino-1-cyclohexen-1-yl ketone [produced as in Example 33 from 8.75 g. of 2- (3,4,5-trimethoxybenzoyl)cyclohexanone] in 100 ml. of ethanol was hydrogenated in the presence of 0.3 g. of platinum oxide catalyst at an initial hydrogen pressure of 52.5 pounds. Two molar equivalents of hydrogen were taken up during a period of 6 hours. The mixture was filtered through diatomaceous earth (Filtercel) and evaporated to dryness. The resulting oil was dissolved in 100 ml. of 10% aqueous hydrochloric acid, 100 ml. of ether was added and the mixture was stirred for ½ hour. The aqueous layer was extracted twice with two 50-ml. portions of ether. The ether extracts were combined, washed with water, then with saturated salt solution, and finally dried by passage through anhydrous sodium sulfate. The thus-obtained solution was evaporated to give 2.3 g. of an oily material which after crystallization from ether gave 1 g. of 1-(3,4,5-trimethoxybenzoyl)-1-cyclohexene of melting point 73–74° C.

The above aqueous layer was cooled in ice, basified by adding sodium hydroxide solution and extracted with methylene chloride (three portion of 100 ml.) The extracts were combined, washed with water and saturated salt solution, and dried by passing through anhydrous sodium sulfate. The thus-obtained solution was concentrated to give 7.89 g. of an oily material which was converted to the hydrochloride by adding a solution of hydrogen chloride in ether. The solid thus obtained was recrystallized from methanol-ether to give 5 g. (42% yield) of α-(3,4,5-trimethoxyphenyl) - 2 - morpholinocyclohexanemethanol hydrochloride of melting point 205–206° C. Ultraviolet: sh. 228 (8,150); sh. 236 (6,350); λ max. 269 (788); sh. 278 (555).

*Analysis.*—Calcd. for $C_{20}H_{31}NO_5 \cdot HCl$ (percent): C, 59.76; H, 8.03; Cl. 8.82; N, 3.49. Found (percent): C, 59.81; H, 8.52; Cl, 8.52; N, 3.57.

EXAMPLE 35

*3,4,5-trimethoxyphenyl 2-(4-methyl-1-piperazinyl)-1-cyclohexene-1-yl ketone*

A mixture of 8.75 g. (0.03 mole) of 2-(3,4,5-trimethoxybenzoyl)cyclohexanone, 9 g. (0.09 mole) of N-methylpiperazine, 240 ml. of toluene and 0.2 g. of p-toluenesulfonic acid was refluxed in a nitrogen atmosphere for a period of 7 hours. After 7 hours, 0.6 ml. of water had been collected in an azeotropic separator. The reaction mixture was thereupon evaporated to dryness to give 3,4,5-trimethoxyphenyl 2-(4-methyl - 1 - piperazinyl)-1-cyclohexen-1-yl ketone.

EXAMPLE 36

*α-(3,4,5-trimethoxyphenyl)-2-(4-methyl-1-piperazinyl) cyclohexanemethanol dihydrochloride*

A solution of 3,4,5-trimethoxyphenyl 2-(4-methyl-1-piperazinyl)-1-cyclohexen-1-yl ketone, prepared from 8.75 g. of 2-(3,4,5-trimethoxybenzoyl)cyclohexanone as in Example 35, was dissolved in 100 ml. of methanol and then hydrogenated in the presence of 0.3 g. of platinum oxide at an initial pressure of 54 pounds. After 6.5 hours, the hydrogenation becomes sluggish, therefore, 0.03 mole of acetic acid and 0.3 g. of platinum oxide were added. After another period of 3 hours a total of 2 molar equivalents of hydrogen was absorbed. The mixture was filtered through diatomaceous earth (Filtercel) and evaporated to dryness. The resulting oil was dissolved in 100 ml. of 10% aqueous hydrochloric acid and 100 ml. of ether and the solution was stirred for 0.5 hour. The aqueous layer was extracted with three 50-ml. portions of methylene chloride. The extracts were discarded. The aqueous solution was then basified and extracted with four portions of 50 ml. each of methylene chloride. The methylene chloride extracts were combined, washed with water and with saturated salt solution, dried by passing through anhydrous sodium sulfate and evaporated to give 5.9 g. of oil. This oil was dissolved in ether and then acidified with 35 ml. of 2 N ethereal hydrogen chloride. The resulting solid was recrystallized from methanol, yielding 4.4 g. (31% yield) of α-(3,4,5-trimethoxyphenyl) - 2 - (4-methyl-1-piperazinyl) cyclohexanemethanol dihydrochloride hemimethanol solvate of melting point 232–233° C. Ultraviolet: sh. 228 (8,400); Sh. 234.5 (6,850); λ max. 270.5 (980); sh. 278 (915).

Analysis.—Calcd. for $C_{21}H_{34}N_2O_4 \cdot 2HCl \cdot \frac{1}{2}CH_3OH$ (percent): C, 55.24; H, 8.19; Cl, 15.17; N, 5.99. Found (percent): C, 54.90; H, 8.05; Cl, 15.30; N, 6.58.

The dihydrochloride above (1 g.) was treated with the calculated amount of aqueous sodium hydroxide solution and the mixture was extracted with methylene chloride. The methylene chloride extract was evaporated and the thus-obtained residue was recrystallized twice from methanol to give α-(3,4,5-trimethoxyphenyl)-2-(4 - methyl-1-piperazinyl)cyclohexanemethanol.

EXAMPLE 37

*p-Methoxyphenyl-2-piperidino-1-cyclohexene-1-yl ketone*

In the manner given in Example 31, 23.2 g. (0.1 mole) of 2-(p-methoxybenzoyl)cyclohexanone was heated with 25.5 g. (0.3 mole) of piperidine in 800 ml. of toluene in the presence of 0.67 g. of p-toluenesulfonic acid to give p-methoxyphenyl 2-piperidino-1-cyclohexene-1-yl ketone.

EXAMPLE 38

*Cis-A-α-(p-methoxyphenyl)-2-piperidinocyclohexane-methanol*

A solution of p-methoxyphenyl 2-piperidino-1-cyclohexen-1-yl ketone (obtained from a synthesis of the same scale as shown in Example 37) in 300 ml. of ethanol was hydrogenated in the presence of 1 g. of platinum oxide under an initial hydrogen pressure of 51 pounds. Two molar equivalents of hydrogen were absorbed during a period of 2.5 hours. The mixture was filtered through Filtercel diatomaceous earth. The filtrate was then evaporated to dryness and the residue dissolved in 250 ml. of ether. The ether solution upon standing produced crystals which were recovered by filtration and washed with ether. One g. of material was obtained having a melting point 152–168° C. This material after recrystallization from methanol-ether was found to be the p-toluenesulfonic acid salt of cis-A-α-(p-methoxyphenyl)-2-piperidinocyclohexane-methanol of melting point 182–183° C. Ultraviolet: γ/max. 223 (21,800); sh. 256 (705); sh. 262 (980); sh. 268 (1,360); 275 (1,530); 282 (1,280).

Analysis.—Calcd. for $C_{26}H_{37}NO_5S$ (percent): C, 65.66; H, 7.84; N, 2.95; S, 6.74. Found (percent): C, 65.27; H, 7.88; N, 2.89; S, 6.86.

The ethereal filtrate above was stirred with 200 ml. of 10% aqueous acetic acid for ½ hour. The aqueous layer was separated, then extracted once with ether, and the ether extract discarded. The aqueous layer was then cooled, basified with aqueous sodium hydroxide solution and extracted with methylene chloride (four portions of 75 ml. each). The extracts were combined, washed with water, saturated salt solution dried by passing the solution through anhydrous sodium sulfate and evaporated to give 22.5 g. of oily material. This material was recrystallized from petroleum ether to give 21.4 g. (71% yield) of cis-A-α-(p - methoxyphenyl)-2-piperidinocyclohexanemethanol of melting point 78–80° C. Ultraviolet: λ/max. 225 (11,500); 275 (1,500); 283 (1.300).

Analysis.—Calcd. for $C_{19}H_{29}NO_2$ (percent): C, 75.20; H, 9.63; N, 4.62. Found (percent): C, 75.17; H, 9.88; N, 4.47.

Treating cis-A-α-(p-methoxyphenyl)-2-piperidinocyclohexamethanol with ethereal hydrogen chloride gave cis-A - α - (p - methoxyphenyl) - 2 - piperidinocyclohexane-methanol hydrochloride of melting point 235–236° C.

In subsequent examples, compounds in different isomeric forms will appear, e.g., p-methoxyphenyl 2-piperidino-cyclohexyl ketone can be used in cis or trans isomeric forms:

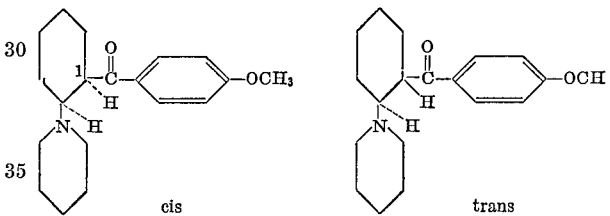

The above configurations are simplified. For example, a truer representation of the cis form above would be the configurations (X) and (Y) below.

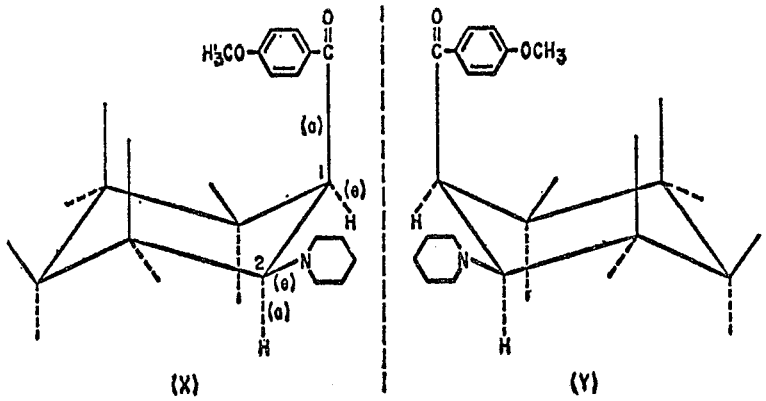

In the configuration (X) the p-methoxybenzoyl group (at 1) is attached by an axial bond (a) to the cyclohexane moiety (chair form) and the piperidino group (at 2) by an equatorial bond (e). While this would indicate the existence of a cis isomer with reversed grouping, i.e., p-methoxybenzoyl on an equatorial bond and piperidino on an axial bond, such an isomer is thermodynamically less stable under ordinary conditions. However, the optical isomers (Y) and (X) of the cis form are stable and thus the simplified cis configuration represents a mixture of (X) and (Y). In the trans form, the equatorial-equatorial positions of the vicinal substituents is the thermodynamically stable configuration and thus only one trans-p- methoxyphenyl 2-piperidinocyclohexyl ketone consisting of two optical forms; as for the cis compound, is obtained.

EXAMPLE 39

*Cis-p-methoxyphenyl 2-piperidinocyclohexyl ketone*

A mixture of 139 g. (0.6 mole) of 2-(p-methoxybenzoyl) cyclohexanone, 153 g. (1.8 moles) of piperidine, 4800 ml. of toluene and 4.02 g. of p-toluenesulfonic acid monohydrate was refluxed for 20 hours in a vessel equipped with an azeotropic separator. A total of 10.1 ml. of water was collected. The reaction mixture was evaporated to dryness on a steam bath to give a residue which was dissolved in 1200 ml. of ethanol and the thus-obtained solution was divided into four equal parts. Each part was hydrogenated in the presence of 1.5 g. of platinum oxide at an initial pressure of 50 pounds of hydrogen. Hydrogenation was stopped after the uptake of 1 molar equivalent. The time required for this procedure was 25 minutes to 55 minutes. Thereafter, the combined mixture was filtered through diatomaceous earth, and the solution was evaporated to dryness. A deep yellow oil was obtained which was dissolved in 1200 ml. of ether and allowed to stand for 15 minutes. The mixture was thereupon filtered and a precipitate was collected weighing 5.3 g. The ethereal filtrate was stirred with 1 l. of 10% aqueous hydrochloric acid for 45 minutes. The acidic layer was separated, filtered and basified with 20% aqueous sodium hydroxide solution. The resulting oil which solidified after a short time was extracted with methylene chloride (five portions of 200 ml. each), the extracts were combined, washed with water, then with saturated salt solution, dried over anhydrous sodium sulfate and evaporated to give a crude product of 116 g. Recrystallization of this crude product from petroleum ether gave 75 g. (42% yield) of colorless needles of cis-p-methoxyphenyl 2-piperidinocyclohexyl ketone having a melting point of 86–88° C. Further recrystallization from petroleum ether for analytical purposes gave cis-p-methoxyphenyl 2-piperidinocyclohexyl ketone of melting point 86.5–88° C. Ultraviolet: λ/max. 217 (11,850); 273 (15,800); 278 (15,500).

*Analysis.*—Calcd. for $C_{19}H_{27}NO_2$ (percent): C, 75.71; H, 9.03; N, 4.65. Found (percent): C, 76.19; H, 9.19; N, 4.88.

EXAMPLE 40

*Trans-p-methoxyphenyl 2-piperidinocyclohexyl ketone*

A solution of 68.3 g. (0.227 mole) of cis-p-methoxyphenyl 2-piperidinocyclohexyl ketone was refluxed for 68 hours in 683 ml. of piperidine. The reaction mixture was thereupon evaporated to dryness to give 55 g. of a residual oil which was dissolved in 500 ml. of ether and extracted with four portions of 100 ml. each of 10% aqueous acetic acid. The acid extracts were combined, cooled in ice and basified with 20% aqueous sodium hydroxide solution and thereupon extracted with four portions of 150 ml. each of methylene chloride. The methylene chloride extracts were combined, washed with saturated salt solution, dried over anhydrous sodium sulfate and evaporated to give 22 g. of a colorless solid which was crystallized from 150 ml. of petroleum ether (boiling range from 30–60° C.) to give 12.05 g. of trans-p-methoxyphenyl 2-piperidinocyclohexyl ketone of melting point 100–101° C. A second crop of 3.5 g. of the same material was also obtained; a total of 23% yield. Ultraviolet: λ/max. 216 (12,900); 271 (15,350).

*Analysis.*—Calcd. for $C_{19}H_{27}NO_2$ (percent): C, 75.71; H, 9.03; N, 4.65. Found (percent): C, 75.28; H, 8.66; N, 4.62.

The original ether layer above contained also 1-(p-methoxybenzoyl)-1-cyclohexene, a yellow oil boiling at 145–155° C.

*Analysis.*—Calcd. for $C_{14}H_{16}O_2$ (percent): C, 77.75; H, 7.46. Found (percent): C, 77.99; H, 7.57.

Treatment of 3.45 g. of 1-(p-methoxybenzoyl)-1-cyclohexene with 20 ml. of piperidine on the steam bath for a period of 8 hours produced 36 mg. of trans-p-methoxyphenyl 2-piperidinocyclohexyl ketone of melting point 99–101° C.

EXAMPLE 41

*Cis-A-α-(p-methoxyphenyl)-2-piperidinocyclohexanemethanol*

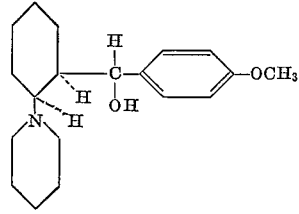

A solution of cis-p-methoxyphenyl 2-piperidinocyclohexyl ketone (3.01 g.; 0.01 mole) in 100 ml. of ethanol was subjected to hydrogenation in the presence of platinum oxide (0.3 g.) at an initial pressure of 53 pounds of hydrogen. One molar equivalent was absorbed in 25 hours. The mixture was filtered, and the filtrate was evaporated to dryness, giving 3.1 g. of an oily material. A 2.9-g. portion of this oil was chromatographed over 150 g. of Florisil (anhydrous magnesium silicate) using 150-ml. portions of an eluant of 6% acetone-94% Skellysolve B hexanes. The first four fractions containing 0.126 g. were discarded. The next eight fractions (150 ml. each) using an eluant of 12% acetone-88% Skellysolve B hexanes gave 2.294 g. of solid melting at 81–82° C. Fractions 13–16 (150 ml. each) using an eluant of 25% acetone-75% Skellysolve B hexanes gave 0.309 g. of solid material melting at 81–82° C. The solids were combined and recrystallized from petroleum ether (boiling range 30–60° C.) to give in two crops 2.4 g. of cis-A-α-(p-methoxyphenyl) - 2 - piperidinocyclohexanemethanol of melting point 81–82.5° C.

Since the carbon atom of the methanol group of α-(p-methoxyphenyl) - 2 - piperidinocyclohexanemethanol is asymmetric, it is obvious that besides the cis-A-alcohol, the cis-B-alcohol is possible (Example 42).

EXAMPLE 42

*Cis-A- and cis-B-α-(p-methoxyphenyl)-2-piperidinocyclohexanemethanol*

Solid cis-p-methoxyphenyl 2-piperidinocyclohexyl ketone (3.01 g.; 0.01 mole) was added to an ice-cooled solution of sodium borohydride (3 g.) in 100 ml. of ethanol. The reaction mixture was then stirred at room temperature (22–25° C.) for a period of 16 hours. It was evaporated to dryness in vacuo at 40° C. To the residue was added 100 ml. of water, and the mixture was then stirred for 30 minutes. The resulting oil was extracted three times with ether. The ether extracts were combined, washed with water, the water discarded, then washed with four 25-ml. portions of 10% aqueous acetic acid. The acidic extract was washed once with ether, and the ether discarded. It was then cooled in ice and basified with 15% sodium hydroxide solution. The reaction mixture was then extracted three times with ether, the extracts combined, washed with water, then with saturated salt solution, dried over anhydrous sodium sulfate and evaporated to give 3 g. of an oil. The oily material was crystallized from 50 ml. of petroleum ether (boiling range 30–60° C.) to give 1.8 g. of cis-A-α-(p-methoxyphenyl)-2-piperidinocyclohexanemethanol, melting point 78–80° C.

The filtrate was evaporated to dryness, and the residue was chromatographed on 60 g. of Florisil (anhydrous magnesium silicate). The column of Florisil was eluted twice with 150-ml. portions of an eluant consisting of 6% acetone and 94% Skellysolve B hexanes; four times with 150-ml. portions of an eluant consisting of 12% acetone and 88% Skellysolve B hexanes; and finally three times with 150-ml. portions of a 20% acetone-80% Skellysolve B hexanes solution, giving 0.576 g. of cis-A-alcohol, which after recrystallization from petroleum ether had a melting point of 80–81° C. Elution with 50% acetone-50% Skellysolve B hexanes (four portions of 150 ml. each) and acetone (two portions of 250 ml. each) gave 0.316 g. of cis-B-α-(p-methoxyphenyl)-2-piperidinocyclohexanemethanol, which after recrystallization from ether weighed 0.1 g. and had a melting point of 135–136° C.

These cis alcohols A and B can also be produced from cis-p-methoxyphenyl 2-piperidinocyclohexyl ketone by reduction with lithium aluminum hydride.

EXAMPLE 43

*Cis-A and cis-B-α-(p-methoxyphenyl)-2-piperidinocyclohexanemethanol*

A solution of 0.9 g. (3 mmoles) of cis-p-methoxyphenyl 2-piperidinocyclohexyl ketone in 25 ml. of ether was added dropwise during 5 minutes to a solution containing 1 g. of lithium aluminum hydride in 100 ml. of ether. The mixture was stirred during a period of 22 hours and was then decomposed by successive addition of 1 ml. of water, 1 ml. of 15% aqueous sodium hydroxide and 3 ml. of water. The resulting suspension was stirred for a period of 2 hours. It was then filtered and the solid washed with ether. The combined filtrate and washings were extracted with three portions of 30 ml. each of 10% aqueous acetic acid, and the combined acidic extracts were backwashed once with ether. The acidic extract was then basified with 15% aqueous sodium hydroxide and extracted three times with ether. The combined ether extracts were washed with water, saturated salt solution, and dried by passage through anhydrous sodium sulfate. The resulting dried solution was evaporated to give 0.77 g. of a colorless oil. This oil was chromatographed over 35 g. of Florisil (anhydrous magnesium silicate) by eluting with an eluant consisting of 6% acetone and 94% Skellysolve B hexanes. The first four fractions of 150 ml. each gave 0.607 g. (67% yield) of cis - A - α - (p - methoxyphenyl) - 2 - piperidinocyclohexanemethanol (melting point 80–81° C.). Further elution with an eluent consisting of 12% acetone and 88% Skellysolve B hexanes gave, in four 150-ml. fractions, 0.209 g. of cis - B - α - (p - methoxyphenyl) - 2 - piperidinocyclohexanemethanol of melting point 134–135° C. (23% yield).

EXAMPLE 44

*Trans-C-α-(p-mthoxyphenyl)-2-piperidinocyclohexanemethanol*

In the manner given in Example 41, trans-p-methoxyphenyl 2-piperidinocyclohexyl ketone (3.01 g.; 0.01 mole) was hydrogenated in ethanol solution in the presence of 0.5 g. of platinum oxide catalyst at 53 pounds initial hydrogen pressure. The solution after 138 minutes of hydrogenation was filtered through Filtercel diatomaceous earth. The filtrate was evaporated giving 3 g. of a solid of melting point 141–145° C. This solid was crystallized from methanol to give 2.5 g. of colorless needles of trans - C - α - (p - methoxyphenyl) - 2 - piperidinocyclohexanemethanol of melting point 148–149° C. A second crop of 0.25 g. of product was obtained from the filtrate; the total yield was 91%. Ultraviolet: 225 (12,150); 275 (1,500); 281 (1,300).

*Analysis.*—Calcd. for $C_{18}H_{29}NO_2$ (percent): C, 75.20; H, 9.63; N, 4.62. Found (percent): C, 75.18; H, 9.81; N, 4.82.

EXAMPLE 45

*Trans-D-α-(p-methoxyphenyl)-2-piperidinocyclohexanemethanol*

A solution of 0.60 g. (1.98 mmoles) of trans-C-α-(p-methoxyphenyl)-2-piperidinocyclohexanemethanol in 4 ml. of trifluoroacetic acid was stirred for 20 minutes. It was cooled in ice, 10 ml. of water was added, followed by 10 ml. of 20% aqueous sodium hydroxide solution. The mixture was thereupon extracted twice with methylene chloride. The combined extract was washed with water, saturated salt solution, dried by passage through anhydrous sodium sulfate and evaporated to give 0.6 g. of a colorless solid of melting point 129–140° C. Crystallization from methanol yielded 0.325 g. of recovered starting material of melting point 145–147° C. The filtrate was evaporated to dryness and the residue was chromatographed over 15 g. of Florisil (anhydrous magnesium silicate). The column containing the Florisil was eluted with 400 ml. of a solution containing 6% acetone and 94% Skellysolve B hexanes. The filtrates from the solution were combined and evaporated, and the residue was recrystallized from petroleum ether (boiling range 30–60° C.) to give 77 mg. of a product melting at 81–82° C., namely trans - D - α - (p - methoxyphenyl) - 2 - piperidinocyclohexanemethanol. Ultraviolet: 226 (11,000); 276 (1,650); 282 (1,450).

*Analysis.*—Calcd. for $C_{19}H_{29}NO_2$ (percent): C, 75.20; H, 9.63; N, 4.62. Found (percent): C, 75.19; H, 9.63; N, 4.55.

EXAMPLE 46

*Trans-C- and trans-D-α-(p-methoxyphenyl)-2-piperidinocyclohexanemethanol*

A solution of trans-p-methoxyphenyl 2-piperidinocyclohexyl ketone (23.9 g.; 0.0795 mole) in 575 ml. of ether was added to a solution of 24 g. of lithium aluminum hydride in 2400 ml. of ether over a period of 30 minutes. The mixture was then stirred for about 20 hours. It was thereupon decomposed successively with 24 ml. of water, 24 ml. of 15% aqueous sodium hydroxide and 72 ml. of water. The resulting mixture was filtered and the cake was washed with ether. The combined filtrate and washings were evaporated to dryness to give 22.5 g. of a colorless oily solid which upon crystallization from 75 ml. of ethanol gave 13.4 g. of trans-C-α-(p-methoxyphenyl)-2-piperidinocyclohexanemethanol of melting point 145–146° C.

The filtrate was evaporated to dryness. The residue was dissolved in 50 ml. of methylene chloride and chromatographed over 460 g. of Florisil (anhydrous magnesium silicate). The column containing the Florisil was eluted with 750 ml. of an eluant consisting of 3% acetone and 97% Skellysolve B hexanes. This fraction yielded 81 mg. of solid which was discarded; thereupon were taken nineteen 250-ml. portions using an eluant consisting of 6% acetone and 94% Skellysolve B hexanes. These fractions were combined and evaporated to give 5.31 g. of solid melting at 80–82° C. Further elution with an eluant consisting of 15% acetone and 85% Skellysolve B hexanes (4 fractions of 250 ml. each) gave 0.535 g. of solid melting at 80–81° C. Recrystallization of the combined material from petroleum ether afforded 4.6 g. of trans-D-α-(p-methoxyphenyl) - 2 - piperidinocyclohexanemethanol of melting point 81–82° C.

Nuclear magnetic resonance spectrum (in $CDCl_3$) showed methoxy at 229 c.p.s.; broad band for benzylic hydrogen centered at 278.5 c.p.s.

EXAMPLE 47

*Cis-B-α-(p-methoxyphenyl)-2-piperidinocyclohexanemethanol*

A solution was prepared having 30.3 g. (0.1 mole) of cis-A-α-(p-methoxyphenyl) - 2 - piperidinocyclohexanemethanol in 200 ml. of trifluoroacetic acid, under cooling with ice. The mixture was then stirred at room temperature for 20 minutes, giving a greenish solution which was again cooled in ice. To this solution was added 150 g. of ice followed by 500 ml. of water and then 500 ml. of 20% aqueous sodium hydroxide. The mixture was stirred for 15 minutes and was thereupon extracted with five portions of 200 ml. each of methylene chloride. The methylene chloride extracts were combined, washed with water, saturated salt solution, then dried by passage through anhydrous sodium sulfate and evaporated to dryness to give 28 g. of a colorless oil. This oil was dissolved in 1 l. of ether and the solution was concentrated to about 200 ml. at which point crystallization commenced. The solution was allowed to cool and was then filtered to provide 16.4 g. of cis-B-α-(p-methoxyphenyl)-2-piperidinocyclohexanemethanol as needles melting at 133–134° C. From second and third crops, additional 6.8 g. of cis-β-α-(p-methoxyphenyl)-2-piperidinocyclohexanemethanol was obtained.

*Analysis.*—Calcd. of $C_{19}H_{29}NO_2$ (percent): C, 75.20; H, 9.63; N, 4.62. Found (percent): C, 74.96; H, 9.62; N, 4.55.

EXAMPLE 48

α-(3,4,5-trimethoxyphenyl)-2-hexahydro-1H-azepin-1-yl)cyclohexanemethanol hydrochloride

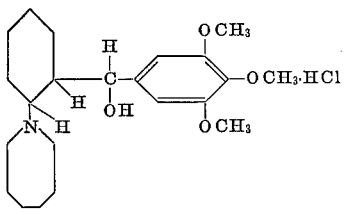

A mixture of 35 g. (0.12 mole) of 2-(3,4,5-trimethoxybenzoyl)cyclohexanone, 35.6 g. (0.36 mole) of hexamethyleneimine, 960 ml. of toluene and 0.8 g. of p-toluenesulfonic acid was refluxed for 7.5 hours in a nitrogen atmosphere in a vessel equipped with an azeotropic separator. A total of 1.8 ml. of water was collected. The mixture was thereupon evaporated to dryness, the residue was dissolved in 250 ml. of ethanol and hydrogenated in the presence of 1.2 g. of platinum oxide at an initial pressure of 51.5 pounds of hydrogen. Two molar equivalents of hydrogen were absorbed during 5 hours. The reaction mixture was then filtered through diatomaceous earth (Filtercel), and the filtrate was evaporated to dryness. The thus-obtained residue was dissolved in 400 ml. of ether. The ether solution was stirred with 400 ml. of 10% hydrochloric acid for 0.5 hour, and the resulting suspension was filtered. The obtained solid was washed with ether to give 18.2 g. of material. This material was crystallized from 250 ml. of methanol to give 16.4 g. of α-(3,4,5-trimethoxyphenyl)-2-(hexahydro-1H-azepin - 1 - yl)cyclohexanemethanol hydrochloride of melting point 244–246° C. Ultraviolet: sh, 228 (8,250); 268 (757; 276 (608).

*Analysis.*—Calcd. for $C_{22}H_{35}NO_4 \cdot HCl$ (percent): C, 63.83; H, 8.77; Cl, 8.56; N, 3.38. Found (percent) C, 63.95; H, 913; Cl, 8.47; N, 3.58.

Workup of the aqueous hydrochloric acid filtrate above provided another 0.7 g. of α-(3,4,5-trimethoxyphenyl)-2-(hexahydro - 1 - azepin - 1 - yl)cyclohexanemethanol hydrochloride of melting point 242–243° C.; thus a total yield of 34%.

EXAMPLE 49

Cis-A-α-(p-methoxyphenyl)-2-(hexahydro-1H-azepin-1-yl)cyclohexanemethanol hydrochloride (A) 1-hexamethyleneimino-1-cyclohexene.—A mixture of 196 g. (2 moles) of cyclohexanone, 396 g. (4 moles) of hexamethyleneimine, 3 l. of benzene and 2.5 g. of p-toluenesulfonic acid was refluxed for 24 hours, separating 34 ml. of water with an azeotropic separator. Distillation of the material provided 293.7 g. (82% yield) of 1-hexamethylene-imino-1-cyclohexene having a boiling point of 138–140° C. at 16 mm. [this enamine was reported by Nightingale et al., J. Org. Chem. 28, 642 (1963)].

(B) Cis - A - α - (p-methoxyphenyl)-2-(hexahydro-1H-azepin-1-yl)cyclohexanemethanol hydrochloride.—To a solution of 107.4 g. (0.6 mole) of 1-hexamethyleneim-ino-1-cyclohexene in 252 ml. of chloroform (purified by passage through basic alumina) was added 60.0 g. (0.6 mole) of triethylamine at a temperature of 5° C. To the reaction mixture was added a solution of 102 g. (0.6 mole) of p-anisoyl chloride in 240 ml. of purified chloroform during a period of 2 hours while keeping the temperature between 5 to 10° C. A suspension resulted which was stirred for a period of about 20 hours at room temperature. The suspension was thereupon filtered, and the precipitate washed with ether, the ether wash being discarded. The precipitate was 46.8 g. of triethylamine hydrochloride of melting point 253–254° C. The chloroform filtrate was evaporated to dryness. The resulting residue was dissolved in 900 ml. of ethanol and hydrogenated in three portions, each in the presence of 1 g. of platinum oxide at a hydrogen pressure of about 50–52 pounds. After the absorption of about 80% of the hydrogen had taken place, the hydrogenation stopped and another 1 g. of platinum oxide was added. Two molar equivalents of hydrogen were absorbed during 22 hours. The resulting thick suspension was filtered and the precipitate washed with ethanol. The moist cake was refluxed with 1500 ml. of ethanol, filtered and allowed to crystallize. The first crop of crystals amounted to 80.7 g. of cis-A-α-(p-methoxyphenyl)-2-(hexahydro-1H-azepin-1-yl(cyclohexanemethanol hydrochloride of melting point of 230–231° C. A second crop of 20 g. was also collected. Further recrystallization did not change the melting point of the product. Ultraviolet: λ max. 226 (12,150); 276 (1,550); 282 (1,350).

*Analysis.*—Calcd. for $C_{20}H_{31}NO_2 \cdot HCl$ (percent): C, 67.87; H, 9.12; Cl, 10.02; N, 3.97. Found (percent): C, 67.27; H, 9.14; Cl, 9.97; N, 4.03.

EXAMPLE 50

α-(p-trifluoromethylphenyl)-2-(hexahydro-1H-azepin-1-yl)cyclohexanemethanol hydrochloride In the manner given in Example 49, 0.1 mole of triethylamine and 0.1 mole of 1-hexamethyleneimino-1-cyclohexene was reacted in chloroform solution with 0.1 mole of p-trifluoromethylbenzoyl chloride. The resulting product was hydrogenated in 300 ml. of methanol in the presence of 1 g. of platinum oxide. Two molar equivalents of hydrogen were absorber in 3.5 hours. The hydrogenation reaction mixture was filtered through diatomaceous earth (Filtercel) and the filtrate evaporated to dryness. The resulting solid was suspended in 200 ml. of ether and 200 ml. of 10% aqueous acetic acid, and the suspension was stirred for a period of 3.5 hours. The suspension was then filtered, and the solid washed with water followed by ether. Thirteen and four-tenths g. of solid was thus obtained which was recrystallized from methanol giving α-(p-trifluoromethylphenyl)-2-(hexahydro - 1H-azepin-1 yl)cyclohexanemethanol hydrochloride of melting point 263–264° C. Ultraviolet: λ max. 216 (8,050); 252 (298); 257 (357; 263 (364); 269 (290).

*Anaylsis.*—Calcd. for $C_{20}H_{18}F_3NO \cdot HCl$ (percent): C, 61.29; H, 7.46; Cl, 9.05; F, 14.54; N, 3.57. Found (percent): C, 60.89; H, 7.58; Cl, 9.17; F, 13.96 N, 3.66.

EXAMPLE 51

α-(p-chlorophenyl)-2-(hexahydro-1H-azepin-1-yl)cyclohexanemethanol hydrochloride In the manner given in Example 49, 0.1 mole of triethylamine, 0.1 mole of 1-hexamethyleneimino-1-cyclohexene and 0.1 mole of p-chlorobenzoyl chloride were reacted in purified chloroform and the resulting product hydrogenated for 5.5 hours in 300 ml. of methanol in the presence of 1 g. of platinum oxide. The resulting suspension was diluted with 400 ml. of ethanol, heated to reflux, filtered and the solution allowed to crystallize. Filtration yielded 12.25 g. of α-(p-chlorophenyl)-2-(hexahydro - 1H - azepin - 1 -yl)cyclohexanemethanol hydrochloride of melting point 274–275° C. Ultraviolet: λ max. 221 (10,000); sh, 226 (8,200); 252 (182); 258 (210); 267 (260); 275 (193).

*Analysis.*—Calcd. for $C_{19}H_{28}ClNO \cdot HCl$ (percent): N, 3.91. Found (percent): N, 3.98.

EXAMPLE 52

*α-phenyl-2-(hexahydro-1H-azepin-1-yl)cyclohexanemethanol hydrochloride*

In the manner given in Example 49, 0.1 mole of triethylamine, 0.1 mole of 1-hexamethyleneimino-1-cyclohexene and 0.1 mole (14 g.) of benzoyl chloride were reacted, and the reaction product hydrogenated in methanol in the presence of platinum oxide for a period of 2.5 hours. The mixture was filtered, evaporated to dryness and the solid residue was suspended in 200 ml. of ether and 200 ml. of 10% aqueous acetic acid. The mixture was stirred for 0.5 hour and the resulting suspension filtered yielding a solid which was washed with water followed by ether. The thus-obtained product, 3.6 g., was recrystallized from methanol to give 2.8 g. of α-phenyl-2-(hexahydro-1H-azepin-1-yl)cyclohexanemethanol hydrochloride of melting point 276–277° C. Ultraviolet: λ max. 247 (107); 252 (130); 257 (178); 263 (130); 267 (91).

*Analysis.*—Calcd. for $C_{19}H_{29}NO \cdot HCl$ (percent): C, 70.45; H, 9.34; Cl, 10.95; N, 4.33. Found (percent): C, 70.22; H, 8.94; Cl, 11.03; N, 4.45.

EXAMPLE 53

*α-(3,4-methylenedioxyphenyl)-2-(hexahydro-1H-azepin-1-yl)cyclohexanemethanol hydrochloride*

A solution of piperonyloyl chloride in 120 ml. of chloroform was added during 1.5 hours with cooling and stirring to a solution of 1-hexamethyleneimino-1-cyclohexene (53.6 g.; 0.3 mole) and 30.3 g. (0.3 mole) of triethylamine in 126 ml. of chloroform at a temperature below 10° C. The reaction mixture was then stirred for about 20 hours at a temperature between 23–26° C. The thus-obtained suspension was filtered to give 23 g. of triethylamine hydrochloride melting at 252–254° C. The filtrate was evaporated to dryness, the residue was dissolved in 600 ml. of ethanol and hydrogenated in the presence of 3 g. of platinum oxide at an initial pressure of 52.5 pounds of hydrogen. After 6 hours, a 1 g. quantity of platinum oxide catalyst was added and hydrogenation continued for another 16 hours. The resulting suspension was filtered and the solid, consisting of the product and catalyst, was refluxed in 1800 ml. of ethanol; this suspension was filtered, evaporated to 900 ml. and allowed to crystallize, yielding 50 g. of α-(3,4-methylenedioxyphenyl) - 2 - (hexahydro - 1H - azepin-1-yl)cyclohexanemethanol hydrochloride of melting point 235–236° C.

Work-up of the filtrate by evaporation and stirring with 400 ml. of 10% aqueous acetic acid and 450 ml. of ether gave another 10 g. of solid material which after recrystallization from ethanol gave 5 g. of α-(3,4-methylenedioxyphenyl) - 2 - (hexahydro-1H-azepin - 1 - yl)cyclohexanemethanol hydrochloride of melting point 233–234° C. Ultraviolet: λ max. 235 (4,150); 286 (4,050).

*Analysis.*—Calcd. for $C_{20}H_{29}NO_3 \cdot HCl$ (percent): C, 65.29; H, 8.22; Cl, 9.64; N, 3.81. Found (percent): C, 65.18; H, 8.38; Cl, 9.93; N, 3.79.

The above compound is useful as a diuretic and oral anti-diabetic agent.

EXAMPLE 54

*α-(3,4-dimethoxyphenyl)-2-(hexahydro-1H-azepin 1-yl)cyclohexanemethanol hydrochloride*

In the manner given in Example 53, 1-hexamethyleneimino - 1 - cyclohexene was reacted with 3,4-dimethoxybenzoyl chloride (53.6 g.; 0.3 mole) in the presence of triethylamine. The resulting product was hydrogenated in the presence of platinum oxide and the mixture was worked up as in Example 53 giving 52.2 g. of α-(3,4 - dimethoxyphenyl) - 2 - (hexahydro - 1H-azepin - 1 - yl)cyclohexanemethanol hydrochloride of melting point 225–228° C. in the first crop. Additional material was obtained by the work-up of filtrates with acetic acid and ether. A total yield of about 50% was obtained. The analytical sample, prepared by recrystallization from ethanol, gave α-(3,4 - dimethoxyphenyl)-2-(hexahydro - 1H - azepin - 1 - yl)cyclohexanemethanol hydrochloride of melting point 225–226° C. Ultraviolet: λ max. 230 (8,550); 279 (2,950); sh 285 (2,550).

*Analysis.*—Calcd. for $C_{21}H_{33}NO_3 \cdot HCl$ (percent): C, 65.69; H, 8.93; Cl, 9.24; N, 3.65. Found (percent): C, 65.88; H, 9.19; Cl, 9.30; N, 3.95.

EXAMPLE 55

*Cis-B-α-(p-methoxyphenyl)-2-(hexahydro - 1H - azepin-1 - yl)cyclohexanemethanol and the hydrochloride thereof*

To 240 ml. of trifluoroacetic acid, cooled to 5° C. was added, all at once, 38 g. (0.12 mole) of cis-A-α-(p-methoxyphenyl) - 2 - (hexahydro - 1H - azepin-1-yl)-cyclohexanemethanol with stirring. The mixture was kept stirring for 20 minutes whereby the temperature reached about 40° C. Thereupon, the solution was cooled, ice was added, followed by 600 ml. of water and then 600 ml. of 20% aqueous sodium hydroxide. The mixture was then extracted with five 200-ml. portions of methylene chloride. The extracts were combined, washed with saturated salt solution, dried by passing through anhydrous sodium sulfate, and the filtrate evaporated to give 37.9 g. of a yellowish oil. The oil was dissolved in 150 ml. of petroleum ether (boiling range 30–60° C.) and allowed to crystallize in the refrigerator overnight; 13.6 g. of crystals were recovered by filtration. These crystals were recrystallized from 50 ml. of ether to give 10.1 g. of cis-B-α-(p-methoxyphenyl) - 2 - (hexahydro - 1H - azepin-1-yl)cyclohexanemethanol of melting point 94–95.5° C. Ultraviolet: λ max. 225 (12,750); 275 (1,550); 281 (1,350).

*Analysis.*—Calcd. for $C_{20}H_{31}NO_2$ (percent): C, 75.67; H, 9.84; N, 4.41. Found (percent): C, 75.86; H, 9.85; N, 4.48.

The hydrochloride of cis-B-α-(p-methoxyphenyl) - 2-(hexahydro - 1H - azepin - 1 - yl)cyclohexanemethanol was prepared with 1.5 N ethereal hydrogen chloride. After two crystallizations from methanol-ether, colorless needles were obtained melting at 188–189° C. Ultraviolet: λ max. 226 (12,700); 275 (1,450); 281 (1,250).

*Analysis.*—Calcd. for $C_{20}H_{31}NO_2 \cdot HCl$ (percent): C, 67.87; H, 9.12; Cl, 10.02; N, 3.97. Found (percent): C, 67.24; H, 9.36; Cl, 9.76; N, 3.96.

Oxidation of both cis-A and cis-B-α-(p-methoxyphenyl)-2-(hexahydro - 1H - azepin - 1 - yl)cyclohexanemethanol with chromic acid (Jones reagent) gave the same cis-p-methoxyphenyl 2-(hexahydro - 1H - azepin-1-yl)cyclohexyl ketone as a pale yellow oil. Treating this oil with hydrogen chloride in ether provided after recrystallizing from methanol-ether the hydrochloride of cis-p-methoxyphenyl 2-(hexahydro - 1H - azepin-1-yl)-cyclohexyl ketone of melting point 164–165° C.

*Analysis.*—Calcd. for $C_{20}H_{29}NO_2 \cdot HCl$ (percent): C, 68.26; H, 8.59; Cl, 10.08; N, 3.98. Found (percent): C, 67.92; H, 8.55; Cl, 10.06; N, 4.05.

EXAMPLE 56

*α-(3,4,5-trimethoxyphenyl)-2-piperidinocycloheptane methanol hydrochloride*

(A) 1-piperidino-1-cycloheptene.—A mixture of 224.2 g. (2 moles) of cycloheptanone, 340 g. (4 moles) of piperidine, 400 ml. of benzene and 2.2 g. of p-toluenesulfonic acid was refluxed for a period of 16 hours in a nitrogen atmosphere, using an azeotropic separator. A total of 5 ml. of water was collected. Since this was less than the calculated amount of water produced during the reaction, the separator was replaced with a Soxhlet extractor containing 322 g. of crystalline sodium aluminum silicate, $Na_{12}\ [(Al_2O_2)_{12}(SiO_2)_{12}]$ [Linde molecular sieve, Type 4A; see The Merck Index, Merck and Co., Inc. 1960, seventh edition, page 1592], and the mixture was refluxed for three days. After the solvent was removed by distillation from the reaction mixture, 319.7 g. of 1 - piperidino-1-cycloheptene of boiling point 130–131° C. at 17 mm. (89% yield) was obtained.

(B) α-(3,4,5-trimethoxyphenyl) - 2 - piperidinocycloheptanemethanol hydrochloride.—In the manner given in Example 49, Part B, 23 g. (0.1 mole) of 3,4,5-trimethoxybenzoyl chloride, 17.9 g. (0.1 mole) of 1-piperidino-1-cycloheptene and triethylamine (0.1 mole) were reacted at low temperature in a chloroform solution. The resulting product was hydrogenated in methanol for a period of 3 hours during which 2 molar equivalents of hydrogen were consumed. The resulting reaction mixture was then filtered and evaporated, and the residue stirred with 150 ml. of water and 150 ml. of methylene chloride for a period of 0.5 hour. The methylene chloride layer was separated and stirred with 250 ml. of 10% aqueous hydrochloric acid for ½ hour. The resulting suspension was filtered and the solid washed with water to give 7.5 g. of α-(3,4,5-trimethoxyphenyl) - 2 - piperidinocycloheptanemethanol hydrochloride of melting point 237–238° C. This material was recrystallized from methanol to give α-(3,4,5 - trimethoxyphenyl) - 2 - piperidinocycloheptanemethanol hydrochloride of melting point 243–244° C. Ultraviolet: sh. 266 (8,250); sh. 234 (6,800); λ max. 270 (782); sh. 278 (546).

*Analysis.*—Calcd. for $C_{22}H_{35}NO_4 \cdot HCl$ (percent): C, 63.82; H, 8.77; Cl, 8.57; N, 3.38. Found (percent): C, 63.43; H, 8.85; Cl, 8.66; N, 3.20.

The work-up of the methylene chloride layer gave 1.5 g. of cycloheptyl 3,4,5-trimethoxyphenyl ketone of melting point 76–77° C. in colorless crystalline plates.

*Analysis.*—Calcd. for $C_{17}H_{24}O_4$ (percent): C, 69.83; H, 8.27. Found (percent): C, 69.64; H, 8.24.

EXAMPLE 57

α-(3,4,5-trimethoxyphenyl)-2-(1-pyrrolidinyl)cyclohexanemethanol and hydrochloride A mixture of 17.5 g. (0.06 mole) of 2-(3,4,5-trimethoxybenzoyl)cyclohexanone, 12.8 g. (0.18 mole) of pyrrolidine and 480 ml. of benzene was refluxed for 1.25 hours using an azeotropic separator; 1.5 ml. of water was collected. The mixture was evaporated to dryness to give a yellow oil. A small sample was crystallized twice from ether to give yellow prisms melting at 118–120° C. and constituting 3,4,5-trimethoxyphenyl 2-(1-pyrrolidinyl)-1-yl ketone. Ultraviolet: in ether λ max. 262 (11,500); 358 (5,500); in ethanol sh. 220 (17,000); 269 (7,700); 372 (7,050).

*Analysis.*—Calcd. for $C_{20}H_{27}NO_4$ (percent): C, 69.54; H, 7.88; N, 4.06. Found (percent): C, 69.91; H, 8.08; N, 3.76.

The crude 3,4,5-trimethoxyphenyl 2-(1-pyrrolidinyl)-1-cyclohexen-1-yl ketone was dissolved in 250 ml. of ethanol and hydrogenated in the presence of 0.6 g. of platinum oxide. Two molar equivalents of hydrogen were taken up in 6 hours. The mixture was then filtered through diatomaceous earth and the filtrate evaporated to dryness. The residue was stirred with 200 ml. of 10% aqueous hydrochloric acid and 250 ml. of ether for 0.5 hour. The aqueuos layer was separated, extracted with ether, basified with sodium bicarbonate and extracted with four 125-ml. portions of methylene chloride. The methylene chloride extracts were combined, washed with water, then with saturated salt solution, dried by passing through anhydrous sodium sulfate and evaporated to give 16.5 g. of solid. This solid was recrystallized from ether to give 9.7 g. of α - (3,4,5 - trimethoxyphenyl)-2-(1-pyrrolidinyl)cyclohexanemethanol of melting point 121–122° C. A second crop of 2 g. of the alcohol was obtained with a melting point of 119–120° C. The total yield was 56%. Ultraviolet sh. 226 (9,200); λ max. 269 (744); sh. 280 (542).

*Analysis.*—Calcd. for $C_{20}H_{31}NO_4$ (percent): C, 68.74; H, 8.94; N, 4.01. Found (percent): C, 68.61; H, 8.84; N, 4.17.

In a similar manner 3,4,5-trimethoxyphenyl 2-(1-pyrrolidinyl)-1-cyclohexen-1-yl ketone [prepared from 0.1 mole of 2-(3,4,5-trimethoxybenzoyl)cyclohexanone] was hydrogenated in ethanol in ethanol in the presence of 1 g. of 5% rhodium on alumina catalyst. The hydrogenation continued for 30 hours. The mixture was then filtered, evaporated to dryness, and the residue was dissolved in ether and treated with etheral hydrogen chloride to give 5.2 g. of solid. This solid was recrystallized from isopropyl alcohol to give 4.6 g. of α-(3,4,5-trimethoxyphenyl)-2-(1-pyrrolidinyl)-cyclohexanemethanol hydrochloride of melting point 216–217° C.

*Analysis.*—Calcd. for $C_{20}H_{31}NO_4 \cdot HCl$ (percent): C, 62.24; H, 8.36; Cl, 9.19; N, 3.63. Found (percent): C, 62.31; H, 8.82; Cl, 9.15; N, 3.65.

EXAMPLE 58

3,4,5-trimethoxy-α-(2-piperidinocyclopentyl)benzyl alcohol [α - (3,4,5 - trimethoxyphenyl)-2-piperidinocyclopentanemethanol]

(A) 3,4,5 - trimethoxyphenyl 2 - piperidinocyclopentyl ketone.—A solution of 15.1 g. (0.1 mole) of 1-piperidino-1-cyclopentene was added, in a nitrogen atmosphere, with ice cooling, to a solution of 10.1 g. (0.1 mole) of triethylamine in 42 ml. of chloroform (purified by passage through a column of basic alumina). To this solution was added a solution of 23.0 g. (0.1 mole) of 3,4,5-trimethoxybenzoyl chloride in 40 ml. of chloroform, over a period of 1.5 hours, while the temperature of the reaction mixture was kept at 5–10° C. The mixture was then stirred overnight at room temperature (22–25° C.) and was filtered to give 6.91 g. of triethylamine hydrochloride. The filtrate was evaporated to dryness at 50° C. The residue was dissolved in 250 ml. of ethanol, 12 g. (0.2 mole) of acetic acid and 1 g. of platinum oxide were added and hydrogenation was carried out at an initial pressure of 51 pounds. Two moles of hydrogen were taken up during 1 hour and 28 minutes; more than 90% of the calculated hydrogen was absorbed in the first half hour. The mixture was then filtered and evaporated to dryness. A mixture of 100 ml. of ether and 100 ml. of 10% aqueous hydrochloric acid was added, and the obtained reaction mixture was stirred for 1.5 hours. The layers were separated and the aqueous layer was extracted once with ether. The ether extracts were washed with water to give the "neutral layer." The acidic layer was cooled in ice and basified with 20% aqueous sodium hydroxide. It was extracted twice with ether, the combined ether extract was washed with water, saturated salt solution, dried by passage through anhydrous sodium sulfate and evaporated to give 14.6 g. of a brown oil which solidified on standing in vacuo overnight. The solid was dissolved in 150 ml. of petroleum ether (boiling range between 30–60° C.) and 20 ml. of ether and cooled with ice for 2 hours. The resulting suspension was decanted, thus providing solid A and filtrate B. Filtrate B' was evaporated to about half the volume and cooled. The resulting solid, 1.2 g. of melting point 120–130° C., was removed by filtration. Recrystallization of this solid from ether gave colorless needles of melting point 133.5–134.5° C. The melting point of this material was not changed by recrystallization from ether. Ultraviolet, infrared and NMR spectra and also carbon, hydrogen and nirtogen analysis indicated that this product was a mixture.

Solid A and the residue from filtrate B were combined to give 13.3 g. of a yellow solid. This solid was dissolved in 50 ml. of benzene and chromatographed over 400 g. of neutral alumina, taking six benzene fractions of 250 ml. each. Fraction 2 contained 2.378 g. of material which was crystallized from 20 ml. of Skellysolve B hexanes to give 1.5 g. of 3,4,5-trimethoxyphenyl 2-piperidinocyclopentyl ketone of melting point 79–80° C. Ultraviolet: λ max. 217 (29,400); 283 (10,700).

*Analysis.*—Calcd. for $C_{20}H_{29}NO_4$ (percent): C, 69.13; H, 8.41; N, 4.03. Found (percent): C, 69.21; H, 8.58; N, 4.14.

The above "neutral layer" contained a solid fraction of 8.78 g. which after recrystallization from Skellysolve B hexanes gave 6.8 g. of cyclopentyl 3,4,5-trimethoxyphenyl ketone of melting point 46–47.5° C.

(B) 3,4,5 - trimethoxy - α - (2 - piperidinocyclopentyl) benzyl alcohol.—A solution of 1.2 g. (3.48 mmoles) of 3,4,5 - trimethoxyphenyl 2-piperidinocyclopentyl ketone in 25 ml. of ether was added over a period of 5 minutes to a solution of 1.2 g. of lithium aluminum hydride in 100 ml. of ether, and the mixture was stirred for 21 hours. It was then decomposed by successive addition of 1.2 g. of water, 1.2 ml. of 15% aqueous sodium hydroxide and 3.6 ml. of water. The thus-obtained reaction mixture was stirred for a period of 2 hours giving a suspension. This suspension was filtered and the solid washed with ether. The ether washing and the ether filtrate were combined, dried by passage through anhydrous sodium sulfate and evaporated to give 1.2 g. of an oil. The oil was chromatographed over 48 g. of Florisil (anhydrous magnesium silicate). Elution with five 100-ml. portions of a mixture consisting of 10% acetone and 90% Skellysolve B hexanes gave 0.136 g. of an oil. Elution with five portions of 100 ml. each of 20% acetone-80% Skellysolve B hexanes mixture gave 0.582 g. of oil. After standing in vacuo for one week, the oil crystallized to give a solid of melting point 85–88° C. This solid was recrystallized from ether-petroleum ether to give a 3,4,5-trimethoxy - α - (2 - piperidinocyclopentyl)benzyl alcohol melting at 91–92° C. Ultraviolet: sh. 224 (9,100); sh. 234; sh. 269 (849); sh. 278 (660).

*Analysis.*—Calcd. for $C_{20}H_{31}NO_4$ (percent): C, 68.74; H, 8.94; N, 4.01. Found (percent): C, 68.49; H, 8.98; N, 4.25.

Further elution with 30% acetone-70% Skellysolve B hexanes (five portions of 100 ml. each) gave 0.140 g. and elution with 50% acetone-50% Skellysolve B hexanes mixture (five portions of 100 ml. each) gave 0.170 g. solids. A 75% acetone-25% Skellysolve B hexanes mixture (five portions of 100 ml. each) gave 0.087 g. and elution with acetone (two portions of 100 ml. each) gave 0.154 g. of solids. These solid fractions were combined and recrystallized from petroleum ether (boiling range 30–60° C.) to give 0.44 g. of crystals, which after recrystallization from a 1:1 mixture of ether-petroleum ether (boiling range of petroleum ether 30–60° C.), gave a material melting at 119–120° C. which was another isomer of 3,4,5 - trimethoxy - α - (2 - piperidinocyclopentyl)-benzyl alcohol.

EXAMPLE 59

*3,4,5 - trimethoxy - α - (2-pyrrolidinocyclopentyl)benzyl alcohol [α - (3,4,5 - trimethoxyphenyl) - 2 - pyrrolidinocyclopentanemethanol]*

A mixture of 8.35 g. (0.03 mole) of 2-(3,4,5-trimethoxybenzoyl)cyclopentanone, 6.5 g. (0.09 mole) of pyrrolidine, 240 ml. of benzene and 0.2 g. of p-toluenesulfonic acid was refluxed with stirring under a nitrogen atmosphere for 21 hours using an azeotropic separator; 0.5 ml. of water was collected. The solution was evaporated to dryness, 3,4,5-trimethoxyphenyl 2-pyrrolidino - 1 - cyclopenten-1-yl ketone being obtained as a residue. This residue was dissolved in 100 ml. of methanol and hydrogenated in the presence of 0.3 g. of platinum oxide at an initial pressure of 54 pounds. One molar equivalent of hydrogen was taken up over a period of 4 hours whereupon the hydrogenation was stopped. The mixture was filtered through diatomaceous earth, and the filtrate evaporated to dryness, 3,4,5-trimethoxyphenyl 2-pyrrolidinocyclopentyl ketone being obtained as a residue. One-half of this product (5 g.; 0.015 mole) was dissolved in 100 ml. of benzene. This solution was added during 10 minutes to a solution of 5 g. of lithium aluminum hydride in 200 ml. of ether, and the mixture was refluxed with stirring for a period of 3 hours. It was then decomposed by successively adding 5 ml. of water, 5 ml. of 15% aqueous sodium hydroxide and 15 ml. of water. The suspension was filtered, and the solid washed with ether. The filtrate and the ether washings were combined, extracted with 10% hydrochloric acid (four portions of 50 ml. each) and the acidic extracts were basified by the addition of aqueous sodium hydroxide. The basified solution was extracted with four portions (each 50 ml.) of methylene chloride. The methylene chloride extracts were combined, washed with water, then with saturated salt solution, dried by passage through anhydrous sodium sulfate and evaporated to give 4.5 g. of a yellow oil. This yellow oil was dissolved in 20 ml. of methylene chloride and chromatographed over 200 g. of Florisil (anhydrous magnesium silicate). The elution was carried out with five portions of 200 ml. each of 50% acetone-50% Skellysolve B hexanes. The eluates were concentrated to give 0.41 g. of solid which was recrystallized from Skellysolve B hexanes to give 3,4,5-trimethoxy-α-(2-pyrrolidinocyclopentyl)benzyl alcohol of melting point 85–86° C. Ultraviolet: sh, 27 (9,300); λ max. 269 (788); sh. 278 (573). NMR showed H on carbon bearing the OH as a doublet centered at 316.5 c.p.s. ($j=3$ c.p.s.).

*Analysis.*—Calcd. for $C_{19}H_{29}NO_4$ (percent): C, 68.03; H, 8.71; N, 4.18. Found (percent): C, 67.50; H, 8.73; N, 4.43.

Elution of the above column with five portions of 200 ml. each of acetone gave after evaporation 0.58 g. of a solid, which was crystallized from ether and thereupon from tetrahydrofuran-Skellysolve B hexanes to give isomeric 3,4,5 - trimethoxy - α - (2 - pyrrolidinocyclopentyl)benzyl alcohol of melting point 147–148° C. Ultraviolet: sh. 225 (8,950); λ max. 270 (1,100); sh. 227 (567). NMR showed H on carbon bearing the OH as a doublet centered at 291 c.p.s. ($j=5$ c.p.s.).

*Analysis.*—Calcd. for $C_{19}H_{29}NO_4$ (percent): C, 68.03; H, 8.71; N, 4.18. Found (percent): C, 67.70; H, 8.90; N, 4.25.

EXAMPLE 60

*p-Ethoxyphenyl 2-piperidino-1-cyclohexene-1-yl ketone*

In the manner given in Example 31, 2 - (p - ethoxybenzoyl)cyclohexanone was reacted with piperidine in the presence of p-toluenesulfonic acid to give p-ethoxyphenyl 2-piperidino-1-cyclohexen-1-yl ketone.

EXAMPLE 61

*p-Benzyloxyphenyl 2-pyrrolidino-1-cyclohexen-1-yl ketone*

In the manner given in Example 31, 2-(p-benzyloxybenzoyl)-cyclohexanone was reacted with pyrrolidine in the presence of p-toluenesulfonic acid to give p-benzyloxyphenyl 2-pyrrolidino-1-cyclohexen-1-yl ketone.

EXAMPLE 62

*p-Benzyloxyphenyl-2-piperidino-1-cyclohexen-1-yl ketone*

In the manner given in Example 31, 2-(p-benzyloxybenzoyl)-cyclohexanone was reacted with piperdine in the presence of p-toluensulfonic acid to give p-benzyloxyphenyl 2-piperidino-1-cyclohexen-1-yl ketone.

EXAMPLE 63

*p-(2-hydroxyethoxy)phenyl 2-piperidino-1-cyclohexen-1-yl ketone*

In the manner given in Example 31, 2-[-(p-2-hydroxy ethoxy)-benzoyl]cyclohexanone was reacted with piperidine in the presence of p-toluenesulfonic acid to give p-(2-hydroxyethoxy)phenyl 2-piperidino-1-cyclohexen-1-yl ketone.

EXAMPLE 64

*o-Methoxyphenyl 2-piperidino-1-cyclohexen-1-yl ketone*

In the manner given in Example 31, 2-(o-methoxybenzoyl)cyclohexanone was reacted with piperidine in the presence of p-toluenesulfonic acid to give o-methoxyphenyl 2-piperidino-1-cyclohexen-1-yl ketone.

EXAMPLE 65

*o-Hydroxyphenyl 2-piperidino-1-cyclohexen-1-yl ketone*

In the manner given in Example 31, 2-(o-hydroxybenzoyl)cyclohexanone was reacted with piperidine in the presence of p-toluene-sulfonic acid to give o-hydroxyphenyl 2-piperidino-1-cyclohexene-1-yl ketone.

EXAMPLE 65A

*p-Hydroxyphenyl 2-piperidino-1-cyclohexen-1-yl ketone*

In the manner given in Example 31, 2-(p-hydroxybenzoyl)cyclohexanone was reacted with piperidine in the presence of p-toluenesulfonic acid to give p-hydroxyphenyl 2-piperidino-1-cyclohexen-1-yl ketone.

EXAMPLE 66

*2-methoxy-4-methylphenyl 2-piperidino-1-cyclohexen-1-yl ketone*

In the manner given in Example 31, 2-(2-methoxy-4-methylbenzoyl)cyclohexanone was reacted with piperidine in the presence of p-toluenesulfonic acid to give 2 - methoxy-4-methylphenyl 2-piperidino-1-cyclohexen-1-yl ketone.

EXAMPLE 67

*3,5-dimethyl-4-methoxyphenyl 2-piperidino-1-cyclohexen-1-yl ketone*

In the manner given in Example 31, 2-(3,5-dimethyl-4-methoxybenzoyl)cyclohexanone was reacted with piperidine in the presence of p-toluenesulfonic acid to give 3,5 - dimethyl - 4 - methoxyphenyl 2-piperidino - 1 - cyclohexen-1-yl ketone.

EXAMPLE 68

*p-Trifluoromethylphenyl 2-piperidino-1-cyclohexen-1-yl ketone*

In the manner given in Example 31, 2-(p-trifluoromethylbenzoyl)cyclohexanone was reacted with piperidine in the presence of p-toluenesulfonic acid to give p-trifluoromethylphenyl 2 - piperidino - 1 - cyclohexen-1-yl ketone.

EXAMPLE 69

*p-Allyloxyphenyl 2-piperidino-1-cyclohexen-1-yl ketone*

In the manner given in Example 31, 2-(p-allyloxybenzoyl)cyclohexanone was reacted with piperidine in the presence of p-toluenesulfonic acid to give p-allyloxyphenyl 2-piperidino-1-cyclohexen-1-yl ketone.

EXAMPLE 70

*p-(Methoxycarbamoyloxy)phenyl 2-piperidino-1-cyclohexen-1-yl ketone*

In the manner given in Example 31, 2-[p-methylcarbamoyloxy)benzoyl]cyclohexanone was reacted with piperidine in the presence of p-toluenesulfonic acid to give p-(methylcarbamoyloxy)phenyl 2 - piperidino - 1 - cyclohexen-1-yl ketone.

EXAMPLE 71

*3,4-methylenedioxyphenyl 2-(hexahydro-1H-azepin-1-yl)-1-cyclohexen-1-yl ketone*

In the manner given in Example 31, 2-(3,4-methylenedioxybenzoyl)cyclohexanone was reacted with hexamethyleneimine in the presence of p-toluenesulfonic acid to give 3,4-methylenedioxyphenyl 2 - (hexahydro - 1H-azepin-1-yl)-1-cyclohexen-1-yl ketone.

EXAMPLE 72

*p-Chlorophenyl 2-(2-isopropylpyrrolidino)-1-cyclohexen-1-yl ketone*

In the manner given in Example 31, 2-(p-chlorobenzoyl)cyclohexanone was reacted with 2-isopropylpyrrolidine in the presence of p-toluenesulfonic acid to give p-chlorophenyl 2-(2-isopropylpyrrolidino)-1-cyclohexen-1-yl ketone.

EXAMPLE 73

*p-Hydroxyphenyl 2-octamethyleneimino-1-cyclohexen-1-yl ketone*

In the manner given in Example 31, 2-(p-hydroxybenzoyl)cyclohexanone was reacted with octamethyleneimine in the presence of p-toluenesulfonic acid to give p-hydroxyphenyl 2-octamethyleneimino - 1 - cyclohexen-1-yl ketone.

In the same manner given in Example 31, other keto compounds of Formula II can be obtained by reacting a 1,3-diketone of Formula I with a heterocyclic amine in the presence of an acid catalyst, e.g., benzenesulfonic acid, p-toluenesulfonic acid, m-chlorobenzenesulfonic acid and the like. Representative compounds thus obtained include:

o-methylphenyl 2-pyrrolidino-1-cyclohexen-1-yl ketone;
p-methylphenyl 2-pyrrolidino-1-cyclohexen-1-yl ketone;
2-methoxy-4-methylphenyl 2-morpholino-1-cyclohexen-1-yl ketone;
2-hydroxy-5-chlorophenyl 2-homomorpholino-1-cyclohexen-1-yl ketone;
p-(carboxymethoxy)phenyl 2-(3,6-dimethylhexamethyleneimino)-1-cyclohexen-1-yl ketone;
3,4-methylenedioxyphenyl 2-(2-methylpiperidino)-1-cyclohexen-1-yl ketone;
p-ethoxyphenyl 2-pyrrolidino-1-cyclohepten-1-yl ketone;
2,3,4-trimethoxyphenyl 2-piperidino-1-cycloocten-1-yl ketone;
3,5-diiodophenyl 2-(3-methylpiperidino)-1-cyclohexen-1-yl ketone;
2-methoxy-4-chlorophenyl 2-piperidino-1-cyclohexen-1-yl ketone;
2-methyl-4-trifluoromethylphenyl 2-piperidino-1-cyclohexen-1-yl ketone;
3,4-dipropylphenyl 2-pyrrolidino-1-cyclohepten-1-yl ketone;
2,5-dichlorophenyl 2-(hexahydro-1H-azepin-1-yl)-1-cyclohepten-1-yl ketone;
3,4-dichlorophenyl 2-(3-methylpiperidino)-1-cycloocten-1-yl ketone;
p-propoxyphenyl 2-(4-butylpiperazino)-1-cycloocten-1-yl ketone;
2,5-diiodophenyl 2-(2-methylhexamethyleneimino)-1-cyclohepten-1-yl ketone;
3-fluorophenyl 2-pyrrolidino-1-cyclopenten-1-yl ketone;
2-hexylphenyl 2-piperidino-1-cyclopenten-1-yl ketone;
3-pentylphenyl 2-piperidino-1-cyclohexen-1-yl ketone;
2-butylphenyl 2-morpholino-1-cyclohexen-1-yl ketone;
2-propylphenyl 2-(1,2,3,4-tetrahydro-1-quinolyl)-1-cyclohepten-1-yl ketone;
3-ethylphenyl 2-piperidino-1-cycloocten-1-yl ketone;
2-methoxy-5-bromophenyl 2-pyrrolidino-1-cyclopenten-1-yl ketone;
phenyl 2-octamethyleneimino-1-cycloocten-1-yl ketone;
phenyl 2-(2,3,6-trimethylmorpholino)-1-cyclohepten-1-yl ketone; and the like.

EXAMPLE 74

*α-(p-ethoxyphenyl)-2-piperidinocyclohexanemethanol hydrochloride*

In the manner given in Example 32, p-ethoxyphenyl 2-piperidino-1-cyclohexen-1-yl ketone was hydrogenated in the presence of platinum oxide to give α-(p-ethoxyphenyl) 2-piperidinocyclohexanemethanol recovered as hydrochloride; melting point 221–222° C.

EXAMPLE 75

*α-(p-Benzyloxyphenyl)-2-pyrrolidinocyclohexanemethanol*

In the manner given in Example 32, p-benzyloxyphenyl 2-pyrrolidino-1-cyclohexen-1-yl ketone was hydrogenated in the presence of platinum oxide to give α-(p-benzyloxyphenyl)-2-pyrrolidinocyclohexanemethanol.

EXAMPLE 76

*Cis-A-α-(p-benzyloxyphenyl)-2-piperidinocyclohexanemethanol*

In the manner given in Example 32, p-benzyloxyphenyl 2-piperidino-1-cyclohexen-1-yl ketone was hydrogenated in the presence of platinum oxide to give cis-A-α-(p-benzyloxyphenyl) - 2 - piperidinocyclohexanemethanol of melting point 148.5–149.5° C.

In the same manner, catalytic hydrogenation of cis-p-benzyloxyphenyl 2-piperidinocyclohexyl ketone (Example 88) gives the same product.

EXAMPLE 76A

*Cis-B-α-(p-benzyloxyphenyl)-2-piperidinocyclohexanemethanol and hydrochloride thereof*

In the manner given in Example 47, cis-A-α-(p-benzyloxyphenyl) - 2 - piperidinocyclohexanemethanol was converted by means of trifluoroacetic acid to cis-B-α-(p-benzyloxyphenyl) - 2 - piperidinocyclohexanemethanol of melting point 129–130° C.

This base was treated with ethereal hydrogen chloride, to obtain cis-B-α-(p-benzyloxyphenyl)-2-piperidinocyclohexanemethanol hydrochloride of melting point 238–240° C.

EXAMPLE 77

*α-[p-(2-hydroxyethoxy)phenyl]-2-piperidinocyclohexanemethanol hydrochloride*

In the manner given in Example 32, p-(2-hydroxyethoxy)phenyl 2-piperidino-1-cyclohexen-1-yl ketone was hydrogenated in the presence of platinum oxide to give α-[p-(2-hydroxyethoxy)phenyl]-2-piperidinocyclohexanemethanol recovered as hydrochloride of melting point 196–198° C.

The hydrochloride can be converted to the free base, and the latter can be reacted with trichloroacetic acid to give the corresponding trichloroacetic acid salt, useful as a herbicide, for example, against Johnson grass, yellow foxtail, green foxtail, Bermuda grass and quack grass.

EXAMPLE 78

*α-(o-Methoxyphenyl)-2-piperidinocyclohexanemethanol hydrochloride*

In the manner given in Example 32, o-methoxyphenyl 2-piperidino-1-cyclohexen-1-yl ketone was hydrogenated in the presence of platinum oxide to give α-(o-methoxyphenyl)-2-piperidinocyclohexanemethanol recovered as hydrochloride.

EXAMPLE 79

*α-(o-Hydroxyphenyl)-2-piperidinocyclohexanemethanol*

In the manner given in Example 32, o-hydroxyphenyl 2-piperidino-1-cyclohexen-1-yl ketone was hydrogenated in the presence of platinum oxide to give α-(o-hydroxyphenyl) - 2 - piperidinocyclohexanemethanol of melting point 122–122.5° C.

The above compound is useful as a diuretic.

EXAMPLE 79A

*Cis-A-α-(p-hydroxyphenyl)-2-piperidinocyclohexanemethanol and hydrochloride thereof*

In the manner given in Example 32, p-hydroxyphenyl 2-piperidino-1-cyclohexen-1-yl ketone was hydrogenated in the presence of platinum oxide to give cis-A-α-(p-hydroxyphenyl) - 2 - piperidinocyclohexanemethanol of melting point 179–180° C.

This base was treated with ethereal hydrogen chloride to obtain cis-A-α-(p-hydroxyphenyl - 2 - piperidinocyclohexanemethanol hydrochloride of melting point 204–204.5° C.

These above compounds are useful as diuretics.

EXAMPLE 79B

*Cis-B-α-(p-hydroxyphenyl)-2-piperidinocyclohexanemethanol*

In the manner given in Example 47, cis-A-α-(p-hydroxyphenyl)-2-piperidinocyclohexanemethanol was converted by means of trifluoroacetic acid to cis-B-α-(p-hydroxyphenyl)-2-cyclohexanemethanol of melting point 182–183° C.

The above compound is useful as a diuretic.

EXAMPLE 80

*α-(2-methoxy-4-methylphenyl)-2-piperidinocyclohexanemethanol hydrochloride*

In the manner given in Example 32, 2-methoxy-4-methylphenyl-2-piperidino-1-cyclohexen-1-yl ketone was hydrogenated in the presence of platinum oxide to give α-(2 - methoxy-4-methylphenyl)-2-piperidinocyclohexanemethanol recovered as hydrochloride; melting point 251–252° C.

EXAMPLE 81

*α-(3,5-dimethyl-4-methoxyphenyl)-2-piperidinocyclohexanemethanol hydrochloride*

In the manner given in Example 32, 3,5-dimethyl-4-methoxyphenyl 2-piperidino-1-cyclohexen-1-yl ketone was hydrogenated in the presence of platinum oxide to give α-(3,5-dimethyl - 4 - methoxyphenyl)-2-piperidinocyclohexanemethanol recovered as hydrochloride.

EXAMPLE 82

*α-(p-Trifluoromethylphenyl)-2-piperidinocyclohexanemethanol hydrochloride*

In the manner given in Example 32, p-trifluoromethylphenyl 2-piperidino-1-cyclohexen-1-yl ketone was hydrogenated in the presence of platinum oxide to give α-(p-trifluoromethylphenyl)-2 - piperidinocyclohexanemethanol recovered as hydrochloride.

EXAMPLE 83

*α-(p-Propoxyphenyl)-2-piperidinocyclohexanemethanol hydrochloride*

In the manner given in Example 32, p-allyloxyphenyl 2-piperidino-1-cyclohexen-1-yl ketone was hydrogenated in the presence of platinum oxide to give α-(p-propoxyphenyl) - 2 - piperidinocyclohexanemethanol recovered as hydrochloride.

EXAMPLE 83A

*Cis-A-α-(p-allyloxyphenyl)-2-piperidinocyclohexanemethanol*

A mixture of 11.6 g. (0.04 mole) of cis-A-α-(p-hydroxyphenyl)-2-piperidinocyclohexanemethanol and 1.8 g. of a 53.3% mineral oil dispersion of sodium hydride (0.04 mole of sodium hydride) in 100 ml. of dimethylsulfoxide was stirred for a period of 1 hour. A solution of 4.9 g. (0.0404 mole) of allyl bromide in 15 ml. of ether was added to the mixture above during a period of 15 minutes and the obtained reaction mixture was stirred for 3 hours at room temperature and then poured in 1 l. of ice water. A white solid separated which was extracted three times with ether. The ether extracts were combined, washed with water and saturated sodium chloride solution, dried over anhydrous sodium sulfate and evaporated to give a residue. This residue was twice recrystallized from ether-pentane to give a total of 11.8 g. (89%) of cis-A-α-(p-allyloxyphenyl)-2-piperidinocyclohexanemethanol of melting point 70–72° C.

*Analysis.*—Calcd. for $C_{21}H_{31}NO_2$ (percent): C, 76.55; H, 9.48; N, 4.25. Found (percent): C, 76.79; H, 9.10; N, 4.20.

The above compound is useful as an oral antidiabetic agent.

EXAMPLE 84

α-[p-(Methylcarbamoyloxy)phenyl]-2-piperidinocyclohexanemethanol hydrochloride

In the manner given in Example 32, p-(methylcarbamoyloxy)phenyl 2 - piperidino - 1 - cyclohexen - 1 - yl ketone was hydrogenated in the presence of platinum oxide to give α-[p-(methylcarbamoyloxy)phenyl] - 2-piperidinocyclohexanemethanol recovered as hydrochloride.

EXAMPLE 85

α-(3,4-methylenedioxyphenyl)-2-piperidinocyclohexanemethanol hydrochloride

In the manner given in Example 32, 3,4-methylenedioxyphenyl 2 - piperidino - 1 - cyclohexen - 1 - yl ketone was hydrogenated in the presence of platinum oxide to give α-(3,4 - methylenedioxyphenyl) - 2 - piperidinocyclohexanemethanol recovered as hydrochloride.

EXAMPLE 86

α-(p-chlorophenyl)-2-(2-isopropylpyrrolidino) cyclohexanemethanol hydrochloride

In the manner given in Example 32, p-chlorophenyl 2 - (2 - isopropylpyrrolidino) - 1 - cyclohexen - 1 - yl ketone was hydrogenated in the presence of platinum oxide to give α-(p-chlorophenyl)-2-(2-isopropylpyrrolidino)cyclohexanemethanol recovered as hydrochloride.

EXAMPLE 87

α-(p-hydroxyphenyl)-2-octamethyleneimino-cyclohexanemethanol hydrochloride

In the manner given in Example 32, p-hydroxyphenyl 2 - octamethyleneimino - 1 - cyclohexen - 1 - yl ketone was hydrogenated in the presence of platinum oxide to give α-(p-hydroxyphenyl) - 2 - octamethyleneiminocyclohexanemethanol recovered as hydrochloride.

In the same manner given in Example 32, hydrogenating other keto compounds of Formula II in the presence of platinum oxide gives the substituted methanols of the Formula IV recovered as hydrochlorides. Representative hydrochlorides, thus obtained, include: the hydrochlorides of α-(o-methylphenyl)-2-pyrrolidinocyclohexanemethanol;
α-(p-methylphenyl)-2-pyrrolidinocyclohexanemethanol;
α-(2-methoxy-4-methylphenyl)-2-morpholinocyclohexanemethanol;
α-(2-hydroxy-5-chlorophenyl)-2-homomorpholinocyclohexanemethanol;
α-[p-(carboxymethoxy)phenyl]-2-(3,6-dimethylhexamethyleneimino)cyclohexanemethanol;
α-(3,4-methylenedioxyphenyl)-2-(2-methylpiperidino) cyclohexanemethanol;
α-(p-ethoxyphenyl)-2-pyrrolidinocycloheptanemethanol;
α-(2,3,4-trimethoxyphenyl)-2-piperidinocyclooctanemethanol;
α-(3,5-diiodophenyl)-2-(3-methylpiperidino)cyclohexanemethanol;
α-(2-methoxy-4-chlorophenyl)-2-piperidinocyclohexanemethanol;
α-(2-methyl-4-trifluoromethylphenyl)-2-piperidinocyclohexanemethanol;
α-(3,4-dipropylphenyl)-2-pyrrolidinocycloheptanemethanol;
α-(2,5-dichlorophenyl)-2-(hexahydro-1H-azepin-1-yl) cycloheptanemethanol;
α-(3,4-dichlorophenyl)-2-(3-methylpiperidino)cyclooctanemethanol;
α-(p-propoxyphenyl)-2-(4-butylpiperazino)cyclooctanemethanol;
α-2,5-diiodophenyl)-2-(2-methylhexamethyleneimino) cycloheptanemethanol;
α-(3-fluorophenyl)-2-pyrrolidinocyclopentanemethanol;
α-(2-hexylphenyl)-2-piperidinocyclopentanemethanol;
α-(3-pentylphenyl)-2-piperidinocyclohexanemethanol;
α-(butylphenyl)-2-morpholinocyclohexanemethanol;
α-(2-propylphenyl)-2-(1,2,3,4-tetrahydro-1-quinolyl) cycloheptanemethanol;
α-(3-ethylphenyl)-2-piperidinocyclooctanemethanol;
α-(2-methoxy-5-bromophenyl)-2-pyrrolidinocyclopentanemethanol;
α-phenyl-2-octamethyleneiminocyclooctanemethanol;
α-phenyl-2-(2,3,6-trimethylmorpholino)cycloheptanemethanol; and the like.

EXAMPLE 88

Cis-p-benzyloxyphenyl 2-piperidinocyclohexyl ketone

In the manner given in Example 39, p-benzyloxyphenyl 2 - piperidino - 1 - cyclohexen-1-yl ketone dissolved in ethanol was hydrogenated in the presence of platinum oxide until one molar equivalent of hydrogen was consumed (42 minutes) to give cis-p-benzyloxyphenyl 2-piperidinocyclohexyl ketone of melting point 87.5–88.5° C.

*Analysis.*—Calcd. for $C_{25}H_{31}NO_2$ (percent): C, 79.53; H, 8.28; N, 3.71. Found (percent): C, 78.88; H, 8.27; N, 3.65.

In the same manner given in Example 39, selective catalytic reduction (preferably with platinum oxide) of other compounds of Formula II produces cis-ketones of Formula III, e.g., cis-3,4,5-trimethoxyphenyl 2-piperidinocyclohexyl ketone;
cis-p-ethoxyphenyl 2-piperidinocyclohexyl ketone;
cis-p-(2-hydroxyethoxy)phenyl 2-piperidinocyclohexyl ketone;
cis-p-trifluoromethylphenyl 2-piperidinocyclohexyl ketone;
cis-p-chlorophenyl 2-(2-isopropylpyrrolidino)cyclohexyl ketone;
cis-3,4-methylenedioxyphenyl 2-(hexahydro-1H-azepin-1-yl)cyclohexyl ketone;
cis-2,3,4-trimethoxyphenyl 2-piperidinocyclooctyl ketone;
cis-3,4-dichlorophenyl 2-(3-methylpiperidino)cyclooctyl ketone;
cis-2,5-dichlorophenyl 2-(hexahydro-1H-azepinyl-1-yl) cycloheptyl ketone; and the like.

In the manner given in Example 41, other cis-alcohols can be obtained by hydrogenating a compound of Formula II or III in the presence of a catalyst such as platinum oxide, palladium or the like. Representative compounds thus obtained include: cis-α-(p - methylphenyl) - 2-piperidinocyclohexanemethanol, melting point 102–103° C., as hydrochloride melting point 251–253° C.;

cis-α-(p-methoxyphenyl)-2-(4-methyl-1-piperazinyl) cyclohexanemethanol, melting point 132–133° C.;
cis-α-(p-methoxyphenyl)-2-(4-methylpiperidino)cyclohexanemethanol, melting point 93–94° C.;
cis-α-(p-methoxyphenyl)-2-morpholinocyclohexanemethanol, melting point 111–112° C.;
cis-α-(p-methoxyphenyl)-2-(3-azabicyclo[3.2.2]nonan-3-yl)cyclohexanemethanol, melting point 114.5–115.5° C.;
cis-α-(p-methoxyphenyl)-2-pyrrolidinocyclohexanemethanol, melting point 146–147° C.;
cis-α-(p-methoxyphenyl)-2-(2-methylpiperidino)cyclohexanemethanol, as perchlorate, melting point 108–111° C.;
cis-α-(p-methoxyphenyl)-3,3-dimethyl-6-piperidinocyclohexanemethanol, melting point 133–135° C.;
cis-α-(4-methoxy-3,5-dimethylphenyl)-2-(hexahydro- 1H-azepin-1-yl)cyclohexanemethanol, as hydrochloride, melting point 247–248° C.;
cis-α-(2,4-dimethylphenyl)-2-piperidinocyclohexanemethanol, as hydrochloride, melting point 239–240° C.;
cis-α-(2,5-dichlorophenyl)-2-heptamethyleneiminocycloheptanemethanol;
cis-α-(2-butylphenyl)-2-morpholinocyclohexane methanol;
cis-α-(2-propylphenyl)-2-(1,2,3,4-tetrahydro-1-quinolyl)cycloheptanemethanol;
cis-α-(2,3,4-trimethoxyphenyl)-2-piperidinocyclooctane methanol; and the like.

EXAMPLE 89

*1-[2-(α,3,4,5-tetramethoxybenzyl)cyclohexyl]piperidine hydrochloride (isomer cis-A hydrochloride)*

A solution of 4 g. (0.01 mole) of α-(3,4,5-trimethoxyphenyl) - 2 - piperidinocyclohexanemethanol hydrochloride in 160 ml. of water was basified by adding sufficient 10% aqueous sodium hydroxide solution. This solution was extracted three times with 100 ml. of methylene chloride. The methylene chloride solution was evaporated, leaving an oily free base.

A solution of the free base α-(3,4,5-trimethoxyphenyl)-2-piperidinocyclohexanemethanol in 25 ml. of ether was added to 100 ml. of liquid ammonia containing 0.01 mole of sodium amide and the mixture was stirred for a period of 50 minutes, while cooling in Dry Ice-acetone. A solution of 1.42 g. (0.01 mole) of methyl iodide in 5 ml. of ether was then added during 5 minutes; the Dry Ice bath was removed and the mixture allowed to stir at room temperature for a period of 7 hours. It was then allowed to evaporated overnight (about 20 hours). To this reaction mixture was then added 50 ml. of water, and the mixture was extracted with three portions of 50 ml. each of methylene chloride. The combined methylene chloride extracts were washed with water, saturated salt solution, dried by passing through anhydrous sodium sulfate and evaporated, to give 3.6 g. of an oily product. The oil was dissolved in methylene chloride and chromatographed on 108 g. of Florisil (anhydrous magnesium silicate). The column of Florisil was eluted with four portions, each 200 ml., of a 3% acetone-97% Skellysolve B hexanes solution, yielding 1.80 g. of an oil after evaporation of the solvents. The oil was dissolved in ether and treated with ethereal hydrogen chloride to give 1.4 g. of material melting at 227–228° C. This material was recrystallized from methanol-ether to give 1-[2-(α,3,4,5-tetramethoxybenzyl)cyclohexyl]piperidine hydrochloride (isomer cis-A hydrochloride) of melting point 224–225° C. Ultraviolet: λ max. 212 (33,400); sh. 235 (6,000); 271 (923); sh. 279 (646).

*Analysis.*—Calcd. for $C_{22}H_{35}NO_4 \cdot HCl$ (percent): C, 63.82; H, 8.77; Cl, 8.56; N, 3.38. Found (percent): C, 63.70; H, 8.95; Cl, 8.25; N, 3.46.

EXAMPLE 90

*Cis-B-1-[2-(α,p-dimethoxybenzyl)cyclohexyl]piperidine and hydrochloride thereof*

(A) A solution of cis-A-α-(p-methoxyphenyl)-2-piperidino-cyclohexanemethanol (3.0 g.; 0.001 mole) in 50 ml. of methanol was treated with a solution of 5 g. of hydrogen chloride in 50 ml. of methanol, and an additional 100 ml. of methanol was added. The solution was allowed to stand for 18 hours at about 25° C. and was then evaporated to dryness at 45° C. under reduced pressure. The oily residue was dissolved in 50 ml. of water; the solution was basified with aqueous sodium hydroxide solution and extracted with ether. The extract was washed with water, then with saturated sodium chloride solution, dried through anhydrous sodium sulfate, and evaporated to dryness, to obtain 3.0 g. (95% yield) of cis-B-1-[2-(α,p-dimethoxybenzyl)cyclohexyl]piperidine of melting point 75–77° C. Recrystallization from ethanol gave 2.3 g. of this compound, melting point 81–82° C. Ultraviolet: λ max. 226 (13,200); 275 (1,460); 282 (1,210).

*Analysis.*—Calcd. for $C_{20}H_{31}NO_2$ (percent): C, 75.67; H, 9.84; N, 4.41. Found (percent): C, 75.70; H, 10.06; N, 4.15.

A solution of 10.7 g. (0.0354 mole) of cis-B-1-[2-(α,p-dimethoxybenzyl)cyclohexyl]piperidine in 50 ml. of ether was treated with 40 ml. of 1.3 N ethereal hydrogen chloride solution. The resulting solid was crystallized from 25 ml. of methylene chloride and 50 ml. of ether to give 9.3 g. of cis - B - 1 - [2 - (α,p-dimethoxybenzyl)cyclohexyl]piperidine hydrochloride of melting point 209–211° C. Ultraviolet: λ max. 227(12,500); 275 (1,400); 281 (1,200).

*Analysis.*—Calcd. for $C_{20}H_{31}NO_2 \cdot HCl$ (percent): C, 67.87; H, 9.11; Cl, 10.02; N, 3.96. Found (percent): C, 67.41; H, 9.31; Cl, 10.47; N, 3.83.

(B). In the manner given in Example 89, an ether solution of cis - B - α - (p-methoxyphenyl)-2-piperidinocyclohexanemethanol was treated in liquid ammonia with sodium amide and methyl iodide. The cis-B-1-[2-(α,p-dimethoxybenzyl)cyclohexyl] piperidine thus obtained was identical with the compound prepared by the above methanol-hydrogen chloride etherification procedure.

EXAMPLE 91

*Cis-B-1-[2-(α,p-dimethoxybenzyl)cyclohexyl] piperidine N-oxide hydrate*

To an ice-cooled solution of 2.2 g. (7 mmoles) of cis-B-1-[2-(α,p-dimethoxybenzyl)cyclohexyl]piperidine in 50 ml. of methanol was added 2.4 g. (14 mmoles) of m-chloroperbenzoic acid. The resulting colorless solution was allowed to stand in ice for 6 hours and then at room temperature (23 to 25° C.) for about 18 hours. It was evaporated to dryness at 35° C. to give an oily residue. To this residue was added 25 ml. of water followed by 25 ml. of 5% aqueous sodium hydroxide, and then the mixture was extracted three times with a total of 100 ml. of methylene chloride. The methylene chloride extracts were combined, washed twice with saturated salt solution, dried by passage through anhydrous sodium sulfate and evaporated to give 2.5 g. of an oil. The oil was dissolved in 25 ml. of hot ethyl acetate (saturated with water), and the cloudy solution was filtered through a sinter funnel. The resulting clear solution was evaporated to 10 ml., cooled and seeded. The resulting crystals were recovered by filtration and washed with ether to give colorless prisms of cis-B-1-[2-(α,p-dimethoxybenzyl)cyclohexyl]piperidine N-oxide hydrate melting at 108–110° C. Ultraviolet: λ max. 227 (12,750); 275 (1,400); 282 (1,250).

*Analysis.*—Calcd. for $C_{20}H_{31}NO_3 \cdot H_2O$ (percent): C, 68.34; H, 9.46; N, 3.99. Found (percent): C, 68.66; H, 9.46; N, 3.96.

EXAMPLE 92

*Cis-B-1-[2-(α,p-dimethoxybenzyl)cyclohexyl]piperidine and its methiodide*

A solution of 4 ml. of butyl lithium (0.01 mole) in hexane was added during 2 minutes to a solution of 3.03 g. (0.01 mole) of cis-B-α-(p-methoxyphenyl) - 2 - piperidinocyclohexanemethanol in 30 ml. of purified tetrahydrofuran. The mixture was stirred at room temperature for 30 minutes and then cooled in a Dry Ice bath at −70° C. To this solution was added a solution of methyl iodide (1.42 g.; 0.01 mole) in 10 ml. of tetrahydrofuran, dropwise, over a period of 10 minutes. The mixture was stirred at −70° C. for a period of 1.5 hours and then at room temperature for 19 hours. To the solution was thereupon added water (50 ml.) and the solution was then extracted with three portions of 75 ml. each of methylene chloride. The organic extracts were combined, dried by passage through anhydrous sodium sulfate and evaporated to give 2.7 g. of crude product. The crude product was dissolved in 20 ml. of methylene chloride and chromatographed over 135 g. of neutral alumina. The material was first eluted with eight portions of 250 ml. of a 5% ether-95% Skellysolve B hexanes solution. After evaporation of the combined eluates, 1.523 g. of solid material, melting between 82–84° C., was obtained. Further elution with two portions of 250 ml. of 25% ether-75% Skellysolve B hexanes, with two portions of 250 ml. each of 50% ether-50% Skellysolve B hexanes and with two portions of 250 ml. each of 75% ether-25% Skellysolve B hexanes gave a total of 0.204 g. of solid material after evaporation of the combined eluates. The above fractions were all combined and recrystallized from ethanol to give 0.644 g. of cis-B-1-[2-(α,p-dimethoxybenzyl)cyclohexyl]piperidine of melting point 84–85.5° C. This free base was identical with the free base obtained in Example 90, parts A and B.

Further elution of the column with 250 ml. of methanol gave 1.446 g. of material which was crystallized from methanol-ether overnight in the refrigerator to give 0.252 g. of the methiodide of cis-B-1-[2-(α,p-dimethoxylbenzyl)cyclohexyl]piperidine, melting after another recrystallization from methanol-ether at 217–218° C. Ultraviolet: λ max. 223 (24,000); 275 (1,390); 281 (1,280).

*Analysis.*—Calcd. for $C_{21}H_{34}INO_2$ (percent): C, 54.90; H, 7.46; I, 27.63; N, 3.05. Found (percent): C, 55.03; H, 7.68; I, 27.63; N, 3.23.

EXAMPLE 92A

*Cis-A-1-[2-(α,p-dimethoxybenzyl)cyclohexyl]piperidine hydrochloride methanol solvate*

In the manner given in Example 89, an ether solution of cis-A-α-(p-methoxyphenyl)-2-piperidinocyclohexanemethanol was treated with a solution of sodium amide in liquid ammonia and thereupon with a solution of methyl iodide in ether at about −70° C to give cis-A-1-[2-(α,p-dimethoxybenzyl)cyclohexyl]piperidine recovered as hydrochloride methanol solvate of melting point 196.5–197.5° C. Ultraviolet: 227 (11,400); 274 (1,380); 281 (1,200).

*Analysis.*—Calcd. for $C_{20}H_{31}NO_2 \cdot CH_3OH \cdot HCl$ (percent): C, 65.34; H, 9.40; Cl, 9.19; N, 3.63. Found (percent): C, 65.50; H, 9.28; Cl, 8.50; N, 4.03.

EXAMPLE 93

*Trans-C-1-[2-(α,p-dimethoxybenzyl)cyclohexyl]piperidine*

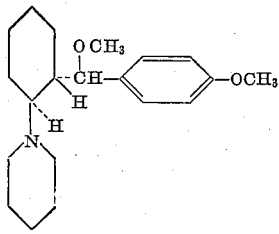

A solution of butyl lithium in hexane (5.25 ml., containing 0.01 mole) was added during a period of 10 minutes to a solution of α-(p-methoxyphenyl)-2-piperidinocyclohexanemethanol (3.03 g.; 0.01 mole of the trans-C alcohol) in 40 ml. of tetrahydrofuran in a nitrogen atmosphere. The reaction mixture was then stirred for 45 minutes. It was cooled to −70° C. and thereto was added a solution of 1.41 g. (0.01 mole) of methyl iodide in 10 ml. of purified tetrahydrofuran over a period of 30 minutes. The mixture was then stirred at room temperature (about 25° C.) overnight for about 16 hours. The reaction mixture was thereupon evaporated to dryness and the resulting residue was dissolved in 50 ml. of water and 50 ml. of methylene chloride. The aqueous layer was extracted with methylene chloride and the methylene chloride extracts combined, washed with saturated salt solution, dried by passage through anhydrous sodium sulfate and evaporated, to give 3.2 g. of a crude product. The crude product was chromatographed over 155 g. of neutral alumina, using six portions of 150 ml. each of 6% ether-94% Skellysolve B hexanes solution. The eluates were evaporated to give 1.642 g. of an oily product which was crystallized from 5 ml. of methanol to give 1.2 g. of a product melting at 78–79° C. Additional recrystallization gave pure trans-C-1-[2-(α,p-dimethoxybenzyl)cyclohexyl]piperidine of melting point 79–80° C. Ultraviolet: λ max. 225 (11,550); sh. 265 (1,150); 275 (1,550); 282 (1,350).

*Analysis.*—Calcd. for $C_{20}H_{31}NO_2$ (percent): C, 75.67; H, 9.84; N, 4.41. Found (percent): C, 75.80; H, 10.08; N, 4.71.

The same product was obtained when trans-C-α-(p-methoxyphenyl)-2-piperidinocyclohexanemethanol in methanol solution was treated with anhydrous hydrogen chloride in methanol solution and the resulting hydrochloride was treated with 20% aqueous sodium hydroxide.

EXAMPLE 94

*Trans-D-1-[2-(α,p-dimethoxybenzyl)cyclohexyl]piperidine*

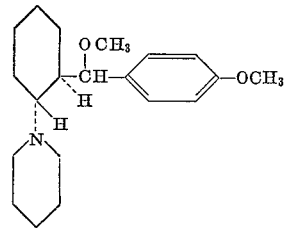

A hexane solution of butyl lithium (5.25 ml.; 0.01 mole) was added during 10 minutes to a solution of trans-D-α-(p-methoxyphenyl)-2-piperidinocyclohexanemethanol (3.03 g.; 0.01 mole) in 30 ml. of purified tetrahydrofuran in a nitrogen atmosphere. The mixture was stirred for a period of 40 minutes, then cooled to −70° C. and a solution of 1.42 (0.01 mole) of methyl iodide in 10 ml. of purified tetrahydrofuran was added over a period of 30 minutes. The mixture was then stirred for 18 hours at room temperature, evaporated to dryness and the residue dissolved in 50 ml. of water and 50 ml. of methylene chloride. The aqueous layer was extracted with methylene chloride and the combined methylene chloride extracts were washed with saturated salt solution, dried through sodium sulfate and evaporated. The crude product, amounting to 3.2 g., was chromatographed over 100 g. of neutral alumina using five fractions of 150 ml. each of 6% ether-94% Skellysolve B hexanes. The five fractions were combined and evaporated to give 1.145 g. of oily trans-D-1-[2-(α,p-dimethoxybenzyl)cyclohexyl]piperidine. Ultraviolet: λ max. 228 (12,350); 278 (1,550); 284 (1,300).

*Analysis.*—Calcd. for $C_{20}H_{31}NO_2$ (percent): C, 75.67; H, 9.84; N, 4.41. Found (percent): C, 75.48; H, 9.93; N, 4.30.

EXAMPLE 95

*Trans-C-1-[2(α,p-dimethoxybenzyl)cyclohexyl]piperidine*

A solution of 2 g. of hydrogen chloride in 15 ml. of methanol was added to a solution of 0.8 g. (2.64 mmoles) of α-(p-methoxyphenyl)-2-piperidinocyclohexanemethanol (trans-D isomer) in 40 ml. of methanol. The mixture was allowed to stand overnight. The resulting solution was basified with 20% aqueous sodium hydroxide solution. The methanol was evaporated in vacuo, 25 ml. of water was added, and the product was extracted with three portions of 25 ml. each of methylene chloride. The extracts were combined, washed with saturated salt solution, dried over magnesium sulfate and evaporated. The residue (0.8 g.) was dissolved in 3% ether-97% Skellysolve B hexanes and chromatographed over neutral alumina with the same solvent mixture. The column was eluted with ten portions of 100 ml. each of 3% ether-97% Skellysolve B hexanes and the fractions thus obtained were evaporated to give 0.351 g. of an oil, which was kept overnight at −10° C. and thereupon solidified. The solidified material was crystallized from methanol to give trans-C-1-[2-(α-p-dimethoxybenzyl cyclohexyl]piperidine of melting point 78–79° C., identical with the compound of Example 93.

EXAMPLE 96

*1-[2-(α-ethoxy-p-methoxybenzyl)cyclohexyl]piperidine (cis-A isomer) and the hydrochloride thereof*

A solution of cis-A-α-(p-methoxyphenyl)-2-piperidinocyclohexanemethanol (30.3 g.; 0.1 mole) in 250 ml. of ether was added during 45 minutes to a suspension of freshly prepared sodium amide (0.2 mole) in 1 l. of liquid ammonia. The mixture was stirred for 1 hour and then cooled in a Dry Ice-acetone bath. A solution of 31.2 g. (0.2 mole) of ethyl iodide in 100 ml. of ether was added dropwise over a period of 30 minutes, the mixture was then stirred in the cold for 1 hour and allowed to stir without cooling for 2 hours. The solution was thereupon allowed to evaporate overnight. To the resulting product 500 ml. of water was added, and the mixture was extracted with 5 portions of 100 ml. each of methylene chloride. The extracts were combined, washed with water, then with saturated salt solution, dried by passage through anhydrous sodium sulfate and evaporated to give 30 g. of a yellow oil. A solution of this oil in 200 ml. of petroleum ether (boiling range 30–60° C.) was allowed to crystallize overnight to give 15.8 g. (53% recovery) of starting alcohol as determined by mixed melting point (78–80° C.). The filtrate was evaporated, and the residue was chromatographed over 750 g. of neutral alumina. Elution was 6% ether-94% Skellysolve B hexanes (8 fractions of 250 ml. each) gave 7.23 g. of oily cis-A-1-[2-α-ethoxy-p-methoxybenzyl)cyclohexyl]piperidine which was 98.9% pure as determined by vapor phase chromatography. Further elution with 25% ether-75% Skellysolve B hexanes (4 fractions of 250 ml. each) gave 0.546 g. of oil of one component; 50% ether-50% Skellysolve B hexanes (4 fractions of 250 ml. each) gave 0.777 g. of oil and 2 fractions of 450 ml. each gave 0.396 g. of oil. Total yield from the ethyl ether fractions was 30%. This oil did not crystallize. The oily cis-A-1-[2-(α-ethoxy-p-methoxybenzyl)cyclohexyl]piperidine had the following analysis: Ultraviolet: λ max. 226.5 (12,000); sh. 268, 276 (1,800); 284 (1.550).

*Analysis.*—Calcd. for $C_{21}H_{33}NO_2$ (percent): C, 76.09; H, 10.03; N, 4.23. Found (percent): C, 75.97; H, 10.10; N, 4.23.

The hydrochloride of cis-A-1-[2-(α-ethoxy-p-methoxybenzyl)-cyclohexyl]piperidine was prepared by treatment of an ethereal solution of the above oily base with ethereal hydrogen chloride. Two recrystallizations from ethanol gave colorless prisms of the hydrochloride of cis-A-1-[2-(α - ethoxy - p - methoxybenzyl)cyclohexyl]piperidine of melting point 203–204.5° C. Ultraviolet: λ max. 227 (11,900); 275 (1,500); 282 (1,300).

*Analysis.*—Calcd. for $C_{21}H_{33}NO_2 \cdot HCl$ (percent): C, 68.55; H, 9.31; Cl, 9.64; N, 3.81. Found (percent): C, 68.01; H, 9.42; Cl, 9.72; N, 3.59.

EXAMPLE 97

*1-[2-(α-ethoxy-p-methoxybenzyl)cyclohexyl]piperidine (cis-B isomer)*

A solution of 26 g. of hydrogen chloride in 200 ml. of ethanol was added to a solution of cis-A-α-(p-methoxyphenyl)-2-piperidinocyclohexanemethanol (12.1 g.; 0.03 mole) in 1200 ml. of ethanol. After 20 hours, the mixture was filtered, and a precipitate collected of melting point 232–233° C. This material was unreacted starting material. The filtrate was cooled, basified wtih 20% sodium hydroxide and evaporated to eliminate the ethanol. Thereafter 250 ml. of water was added to the solution and the solution extracted with methylene chloride to give 11.9 g. of a yellow oil. The yellow oil was dissolved in 50 ml. of methylene chloride and chromatographed on 590 g. of neutral alumina using a solvent mixture of 12% ether-88% Skellysolve B hexanes (6 portions of 250 ml. each).

The eluates were combined and evaporated to give 3.80 g. of the cis-B-1-[2-(α-ethoxy-p-methoxybenzyl)cyclohexyl] piperidine as an oil. Ultraviolet: 227.5 (12,200); 268 (1,100); 276 (1,460); 283 (1,200).

*Analysis.*—Calcd. for $C_{21}H_{33}NO_2$ (percent): C, 76.09; H, 10.03; N, 4.23. Found (percent): C, 76.14; H, 9.71; N, 4.31.

EXAMPLE 98

*1-[2-(α,3,4,5-tetramethoxybenzyl)cyclohexyl]piperidine (cis-B isomer)*

A solution of 6 g. of hydrogen chloride in 50 ml. of methanol was added to a solution of cis-A-α-(3,4,5-trimethoxyphenyl)-2-piperidinocyclohexanemethanol hydrochloride (2 g.; 0.005 mole) in 100 ml. of methanol, and the resulting solution was allowed to stand for 24 hours. The colorless solution was then evaporated to dryness at 40° C. The resulting solid was triturated with ether and filtered, to give 2 g. of material melting between 210–228° C. This material was crystallized from 20 ml. of methanol to give 0.7 g. of recovered starting material of melting point 257–258° C. The filtrate was diluted with 1 ml. of ether to give 0.35 g. of additional starting material. Further dilution of the filtrate with 50 ml. of ether gave 0.2 g. of starting material; total recovery of starting material 62.5%. The remaining filtrate was evaporated to dryness to give 0.7 g. of an amorphous solid. A solution of this solid in 20 ml. of water was basified with 20% aqueous sodium hydroxide. The mixture was extracted with three portions of 20 ml. each of methylene chloride. The extracts were combined, washed with water and saturated salt solution, then dried by passage through anhydrous sodium sulfate, and evaporated to give 0.53 g. (26.6% yield) of product. This product was crystallized from methanol to give colorless needles of cis-B-1-[2-(α,3,4,5 - tetramethoxybenzyl)cyclohexyl]piperidine of melting point 89–90° C. Ultraviolet: sh. 235 (7,600); λ max. 271 (868); sh. 280 (675).

*Analysis.*—Calcd. for $C_{22}H_{35}NO_4$ (percent): C, 69.99; H, 9.35; N, 3.71. Found (percent): C, 70.04; H, 9.47; N, 3.60.

EXAMPLE 99

*Cis-A-1-[2-(α,p-dimethoxybenzyl)cyclohexyl]hexahydro-1H-azepine and the hydrochloride as methanol solvate*

A solution of 15.8 ml. of butyl lithium (0.03 mole) in hexane (1.9 M solution) was added dropwise during 5 minutes to a solution of cis-A-α-(p-methoxyphenyl)-2-(hexahydro-1H-azepin-1-yl)cyclohexanemethanol (9.5 g.; 0.03 mole) in 90 ml. of tetrahydrofuran which had been previously purified by passage through basic alumina. The solution was stirred for a period of 35 minutes. It was then cooled to −70° C. and a solution of 4.36 g. (0.3 mole) of methyl iodide in 30 ml. of tetrahydrofuran was added over a period of 30 minutes. The mixture was stirred at −70° C. for two hours and then overnight (about 18 hours) at room temperature. It was evaporated to dryness, 100 ml. of water was added and the product was extracted with three portions of 100 ml. each of methylene chloride. The organic extract was washed with saturated salt solution, dried by passage through anhydrous sodium sulfate and evaporated, yielding 9.5 g. of a yellow oil. This oil was chromatographed over 475 g. of neutral alumina as follows: elution with 5% ether-95% Skellysolve B hexanes (3 fractions of 350 ml. each) gave 1.143 g. of oil; elution with 10% ether-90% Skellysolve B hexanes (3 fractions of 350 ml. each) gave 0.744 g. of oil; elution with 15% ether-85% Skellysolve B hexanes (3 fractions of 350 ml. each) gave 0.535 g. of oil.

The product of the three bands was converted to the hydrochloride with hydrogen chloride dissolved in ether and was then recrystallized several times from methanol-ether to give 1.8 g. of cis-A-1-[2-(α,p-dimethoxybenzyl)-cyclohexyl]hexahydro-1H-azepine hydrochloride methanol solvate melting at 187–191° C. Ultraviolet: λ max. 227 (11,200); 275 (1,350); 282 (1,150).

Nuclear magnetic resonance spectrum (in CDCl₃) showed benzylic methoxy at 192 c.p.s.; methanol at 208 c.p.s.; aromatic benzylic carbon doublet at 299 c.p.s. and 295.5 c.p.s.

*Analysis.*—Calcd. for $C_{21}H_{33}NO_2 \cdot CH_3OH \cdot HCl$ (percent): C, 66.06; H, 9.58; Cl, 8.87; N, 3.50. Found (percent): C, 66.16; H, 9.72; Cl, 9.32; N, 3.96.

EXAMPLE 100

*Cis-B-1-[2-(α,p-dimethoxybenzyl)cyclohexyl]hexahydro-1H-azepine and its hydrochloride*

A hexane solution of butyl lithium (21.4 ml. containing 0.0406 mole) was added during 5 minutes to a solution of cis-B-α-(p-methoxyphenyl) - 2 - (hexahydro-1H-azepin-1-yl)cyclohexanemethanol (12.9 g.; 0.0406 mole) in 120 ml. of purified tetrahydrofuran in nitrogen. The reaction mixture was stirred for a period of 30 minutes. It was then cooled to −70° C. and a solution of 5.77 g. (0.0406 mole) of methyl iodide in 40 ml. of tetrahydrofuran was added during 1 hour. The mixture was then stirred at −70° C. for 2 hours and at room temperature overnight. It was evaporated to dryness, and the residue was dissolved in 50 ml. of water and 100 ml. of methylene chloride. The aqueous layer was extracted with two portions of 50 ml. each of methylene chloride.

The combined methylene chloride extracts and original layer were then washed with saturated salt solution, dried by passage through anhydrous sodium sulfate and evaporated to give 13 g. of a crude product. The crude product was dissolved in 50 ml. of methylene chloride and chromatographed over 650 g. of neutral alumina. Elution with 6% ether-94% Skellysolve B hexanes (7 fractions of 250 ml. each) gave 3.657 g. of oil; elution with 12% ether-88% Skellysolve B hexanes (4 fractions of 250 ml. each) gave 1.301 g. of oil; with 25% ether-75% Skellysolve B hexanes (4 fractions of 250 ml. each) gave 1.198 g. of oil; with 50% ether-50% Skellysolve B hexanes (4 fractions of 250 ml. each) 0.847 g. of oil; and with ether (4 fractions of 250 ml. each) 1.011 g. of oil. These 5 fractions showed only one component by vapor phase chromatography. The 5 fractions were dissolved separately in ether and treated with hydrogen chloride in ether. The resulting hydrochloride salts melted in the range of 121–125° C. They were combined (5.28 g.) and recrystallized from a mixture of 3 ml. of methanol and 150 ml. of ether, yielding 4.4 g. of colorless prisms of melting point 122–123.5° C. which NMR indicated to be a mixture.

Three and three-tenths g. of the above hydrochloride mixture was treated with aqueous sodium hydroxide, and the basic mixture was extracted with methylene chloride. The methylene chloride fractions were combined, dried by passage through anhydrous sodium sulfate and evaporated to give 2.5 g. of an oil which was dissolved in 20 ml. of methylene chloride and chromatographed over 125 g. of neutral alumina. The first three eluates with methylene chloride (250 ml. each) gave 1.02 g. of oil. Elution with 6% ether-94% Skellysolve B hexanes (8 fractions of 250 ml. each) gave 0.492 g. of oil; with 12% ether-88% Skellysolve B hexanes (4 fractions of 250 ml. each) gave 0.325 g. of oil; and with 25% ether-75% Skellysolve B hexanes gave 0.325 g. of oil. The thus-obtained four bands indicated >99% purity. The cis-B-1-[2-(α,p-dimethoxybenzyl)cyclohexyl]hexahydro - 1H - azepine of the second band had the following analysis:

*Analysis.*—Calcd. for $C_{21}H_{33}NO_2$ (percent): C, 76.09; H, 10.03; N, 4.23. Found (percent): C, 76.29; H, 9.93; N, 4.47.

Ultraviolet: λ max. 227 (12,950); sh. 267 (1,100); 275 (1,450); 282 (1,250).

Nuclear magnetic resonance spectrum (in CDCl₃) showed benzylic methoxy at 187 c.p.s.; aromatic methoxy at 228 c.p.s.; hydrogen on benzylic carbon doublet at 252 c.p.s. and 261.5 c.p.s.

EXAMPLE 101

*Cis - 1 - [2-(α,3,4,5-tetramethoxybenzyl)cyclohexyl]hexahydro-1H-azepine hydrochloride*

A solution of 0.01 mole of cis α-(3,4,5-methoxyphenyl) - 2 - (hexahydro-1H-azepin-1-yl)cyclohexanemethanol in 15 ml. of dimethylformamide was added with stirring to 0.455 g. of a suspension of sodium hydride (53% in mineral oil; 0.01 mole of sodium hydride) in 10 ml. of dimethylformamide. The mixture was heated on the steam bath under a nitrogen atmosphere for 2.5 hours. It was then cooled to room temperature and 1.42 g. (0.01 mole) of methyl iodide was added dropwise during a period of 4 minutes. The mixture was stirred overnight and then evaporated to dryness, 25 ml. of water was added, and the product was extracted with four portions of 35 ml. each of ether. The ether extracts were combined and extracted with 10% aqueous acetic acid (two portions of 20 ml. each). The combined acidic extract was cooled in ice, basified with 15% aqueous sodium hydroxide solution and extracted with four portions of 25 ml. each of ether. The combined ether solution was washed with water and saturated salt solution, dried by passage through anhydrous sodium sulfate and evaporated to dryness to give 2.2 g. of a yellow oil. The oil was dissolved in benzene and chromatographed on 66 g. of neutral alumina. Elution with 4 portions of 100 ml. each of benzene gave 0.213 g. of oil which was discarded. Further elution with 5% ether-95% benzene (3 portions of 100 ml. each) gave 0.20 g. of oil. A solution of this oil in ether was acidified with ethereal hydrogen chloride and was allowed to stand overnight. Small colorless prisms, 0.15 g. of melting point 138–139° C. were collected and these prisms were recrystallized from methanol-ether to give 0.12 g. of cis-B-1-[2-(α,3,4,5 - tetramethoxybenzyl)cyclohexyl]hexahydro-1H-azepine hydrochloride of melting point 202–204° C. Ultraviolet: λ max. 207 (43,650); sh. 224 (8,200); sh. 236 (6,700); 270 (915); sh. 278 (740).

*Analysis.*—Calcd. for $C_{23}H_{37}NO_4 \cdot HCl$ (percent): C, 64.54; H, 8.95; Cl, 8.28; N, 3.27. Found (percent): C, 64.76; H, 8.75; Cl, 8.47; N, 3.46.

EXAMPLE 102

*Cis - 1-[2 - (α,p - dimethoxybenzyl)cyclohexyl]-4-methylpiperazine*

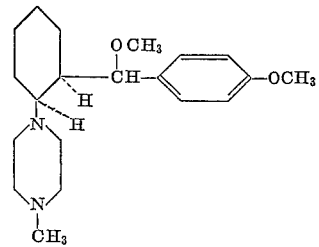

A suspension of 6.35 g. (0.02 mole) of cis-α-(p-methoxyphenyl) - 2 - (4 - methyl - 1-piperazinyl)cyclohexanemethanol in 360 ml. of methanol containing 12 g. of anhydrous hydrogen chloride was stirred at room temperature for 16 hours. The mixture was then heated at reflux for 2 hours and the resulting solution was treated with aqueous sodium hydroxide until alkaline. The solution was thereupon extracted with methylene chloride. The methylene chloride solution was washed with water and saturated sodium chloride solution and finally dried by passage through sodium sulfate and concentrated to give a residue which was crystallized from 50% ethanol-water solution several times to give cis-1-[2-(α,p-dimethoxybenzyl)cyclohexyl]-4-methylpiperazine of melting point 103–

104° C. Ultraviolet: λ max. 226 (12,850); 276 (1,500); 283 (1,250).

*Analysis.*—Calcd. for $C_{20}H_{32}N_2O_2$ (percent): C, 72.25; H, 9.70; N, 8.43. Found (percent): C, 72.06; H, 9.77; N, 8.66

EXAMPLE 103

*Cis - 1 - [2 - (α,p-dimethoxybenzyl)cyclohexyl]-4-methylpiperidine*

In the manner given in Example 102, cis-α-(p-methoxyphenyl)-2-(4-methylpiperidino)cyclohexanemethanol was treated with hydrogen chloride, dissolved in methanol, followed by a base to give cis-1-[2-(α,p-dimethoxybenzyl)cyclohexyl]-4-methylpiperidine of melting point 112–113° C. after recrystallization from absolute ethanol. Ultraviolet: λ max. 222 (13,050); 276 (1,500); 282 (1,250).

*Analysis.*—Calcd. for $C_{21}H_{33}NO_2$ (percent): C, 76.09; H, 10.03; N, 4.23. Found (percent): C, 76.38; H, 10.46; N, 4.15.

EXAMPLE 104

*Cis-4-[2-(α,p-dimethoxybenzyl)cyclohexyl]morpholine*

In the manner given in Example 102, cis-α-(p-methoxyphenyl)-2-morpholinocyclohexanemethanol was treated with hydrogen chloride in methanol solution at room temperature for 20 hours and then with a base to give cis-4-[2-(α,p-dimethoxybenzyl)cyclohexyl]morpholine of melting point 99–100° C. after recrystallization from absolute ethanol. Ultraviolet: λ max. 227 (12,900); 275.5 (1,500); 282 (1,250).

*Analysis.*—Calcd. for $C_{19}H_{29}NO_3$ (percent): C, 71.44; H, 9.15; N, 4.39. Found (percent): C, 71.64; H, 9.27; N, 4.45.

EXAMPLE 105

*Cis - 3 - [2-(α,p-dimethoxybenzyl)cyclohexyl]-3-aza-bicyclo[3.2.2]nonane and its hydrochloride hydrate*

A solution of 3.45 g. of cis-α-(p-methoxyphenyl)-2-(3-aza-bicyclo[3.2.2]nonan-3-yl)cyclohexanemethanol (melting point 114.5–115.5° C.) produced by reacting 2-(p-methoxy) benzoylcyclohexanone and 3-azabicyclo[3.2.2]nonane, followed by catalytic hydrogenation in 175 ml. of methanol containing 5 g. of anhydrous hydrogen chloride was allowed to stand for a period of 20 hours. The solution was made basic by the addition of 20% aqueous sodium hydroxide solution and extracted with methylene chloride. The methylene chloride extracts were dried and evaporated and the thus-obtained material was several times recrystallized from absolute ethanol to give colorless needles of cis-3-[2-(α,p-dimethoxybenzyl)cyclohexyl]-3-azabicyclo[3.2.2]nonane of melting point 109–111° C. Ultraviolet: λ max. 228 (13,300); sh. 268.5 (1,150); 276 (1,450); 283 (1,250).

*Analysis.*—Calcd. for $C_{23}H_{35}NO_2$ (percent): C, 77.26; H, 9.87; N, 3.92. Found (percent): C, 77.05; H, 10.02; N, 3.99.

Treating the thus-obtained material with hydrogen chloride in ether and recrystallizing the thus-obtained product from methyl ethyl ketone gave cis-3-[2-(α,p-dimethoxybenzyl)cyclohexyl]-3-azabicyclo[3.2.2]nonane hydrochloride hydrate of melting point 197–199° C.

*Analysis.*—Calcd. for $C_{23}H_{35}NO_2 \cdot HCl \cdot H_2O$ (percent): C, 67.05; H, 9.30; Cl, 8.61; $H_2O$, 4.37. Found (percent): C, 67.69; H, 9.77; Cl, 8.69; $H_2O$, 4.05.

EXAMPLE 106

*Cis-1-[2-(α,p-dimethoxybenzyl)cyclohexyl]pyrroldine perchlorate*

In the manner given in Example 102, cis-α-(p-methoxyphenyl)-2-(2-pyrrolidinyl)cyclohexanemethanol was reacted with hydrogen chloride in methanol to give cis-1-[2-(α,p-dimethoxybenzyl)cyclohexyl]pyrrolidine as an oil. The oil was treated with perchloric acid. The resulting salt was recrystallized from ethanol-ether and then from isopropanol to give cis-1-[2-(α,p-dimethoxybenzyl)cyclohexyl]pyrrolidine perchlorate of melting point 155–156° C. Ultraviolet: λ max. 227 (12,900); 275 (1,450); 281.5 (1,250).

*Analysis.*—Calcd. for $C_{19}H_{29}NO_2 \cdot HClO_4$ (percent): C, 56.50; H, 7.49; N, 3.47; Cl, 8.78. Found (percent): C, 56.34; H, 7.49; N, 3.62; Cl, 9.37, 9.54.

EXAMPLE 107

*Cis-1-[2-(α,p-dimethoxybenzyl)cyclohexyl]-2-methylpiperidine*

In the manner given in Example 102, cis-α-(p-methoxyphenyl)-2-,2-methylpiperidino)cyclohexanemethanol was treated with hydrogen chloride in methanol (for a period of 16 hours) and then with a base to give cis-1-[2-(α,p-dimethoxybenzyl)cyclohexyl]-2-methylpiperidine. Ultraviolet: λ max. 228 (14,210); 276 (2,120); 283 (1,830); sl. sh. 323 (360).

*Analysis.*—Calcd. for $C_{21}H_{33}NO_2$ (percent): C, 76.09; H, 10.03; N, 4.23. Found (percent): C, 76.18; H, 10.26; N, 4.45.

EXAMPLE 108

*Cis - α - (2 - methoxy-p-tolyl)-2-piperidinocyclohexanemethanol hydrochloride; and cis-1-[2-(α,2-dimethoxy-4-methylbenzyl)cyclohexyl]piperidine and methanesulfonate hemihydrate thereof*

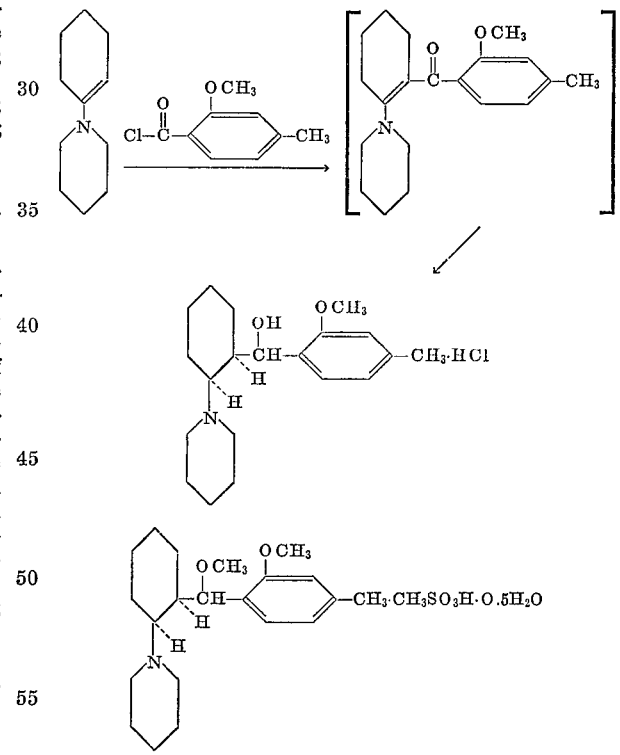

A mixture of 37 g. (0.223 mole) of 1-piperidino-1-cyclohexene [boiling point 124–125° C. (19 mm.)] 22.6 g. (0.223 mole) of triethylamine and 150 ml. of chloroform was cooled to a temperature between 0° and 5° C. To this mixture was added 41.2 g. (0.223 mole) of 2-methoxy-4-methylbenzoyl chloride in 50 ml. of chloroform over a period of 30 minutes, keeping the temperature between 0–10° C. This mixture was stirred for 1 hour at a temperature between 0–10° C. and then at room temperature (23–25° C.) for a period of 24 hours. The mixture was filtered, and the filtrate concentrated in vacuo and the thus-obtained residue was taken up in 150 ml. of absolute ethanol and hydrogenated in the presence of 1.5 g. of platinum oxide for a period of 24 hours. Thereupon 1 g. of platinum oxide was added and hydrogenation continued for another 24 hours. The mixture was then filtered to remove the catalyst, and the filtrate was concentrated in vacuo. The thus-obtained residue was taken up in 600 ml. of 10% aqueous acetic acid and 600 ml. of ether. This mixture was stirred for 1 hour, the acid layer separated, basified with 20% aqueous sodium hydroxide solution and the thus-obtained oil separated by extraction with methylene chloride. The methylene chloride extracts were combined, washed with water, saturated sodium chloride solution and dried by passage through anhydrous magnesium sulfate. The thus-obtained solution was evaporated to give 34 g. of a brownish oil which was dissolved in 150 ml. of absolute ethanol and hydrogenated in the presence of 1.5 g. of platinum oxide for 24 hours. The catalyst was removed by filtration, the alcoholic solution concentrated in vacuo to give an oil which was treated with ethereal hydrogen chloride. The hydrochloride thus obtained was suspended in 200 ml. of warm isopropanol, then cooled to room temperature, filtered and recrystallized from absolute ethanol-ether to give 13 g. (16.5% yield) of cis-α-(2-methoxy-p-tolyl)-2-piperidinocyclohexanemethanol hydrochloride of melting point 251–252° C. Ultraviolet: λ max. 219 (8,400); 274 (2,250); 281 (2,300).

*Analysis.*—Calcd. for $C_{20}H_{31}NO_2 \cdot HCl$ (percent): C, 67.87; H, 9.11; N, 3.96; Cl, 10.02. Found (percent): C, 67.65; H, 9.40; N, 4.03; Cl, 9.84.

A mixture of 7.1 g. (0.02 mole) of cis-α-(2-methoxy-p-tolyl)-2-piperidinocyclohexanemethanol hydrochloride was treated as in Example 102 with 400 ml. of methanol containing 10 g. of anhydrous hydrogen chloride at reflux temperature for 18 hours and then with a base to give cis - 1 - [2-(α,2-dimethoxy-4-methylbenzyl)cyclohexyl]piperidine as a colorless oil. Ultraviolet: λ max. 222 (9,250); 276 (2,650); 283 (2,700).

*Analysis.*—Calcd. for $C_{21}H_{33}NO_2$ (percent): C, 76.09; H, 10.03; N, 4.23. Found (percent): C, 76.26; H, 9.58; N, 4.38.

The oily cis-1-[2-(α,2-dimethoxy-4-methylbenzyl)cyclohexyl]piperidine (3.76 g.) was reacted with 1.1 g. of methanesulfonic acid in ether solution. The gummy material, which was first obtained, was crystallized from methyl ethyl ketone-ether in the presence of 0.2 ml. of water to give 2.7 g. of cis-1-[2-(α,2-dimethoxy-4-methylbenzyl)cyclohexyl]piperidine methanesulfonate hemihydrate of melting point 94.5–96.5° C.

*Analysis.*—Calcd. for $C_{21}H_{33}NO_2 \cdot CH_3SO_3H \cdot 0.5H_2O$ (percent): C, 60.51; H, 8.77; N, 3.2; $H_2O$, 2.06. Found (percent): C, 60.75; H, 8.60; N, 3.86; $H_2O$ (undried sample) 4.34.

EXAMPLE 109

*Cis - α - (p-methoxyphenyl)-3,3-dimethyl-6-piperidinocyclohexanemethanol and cis - 1 - [2(α,p-dimethoxybenzyl)-4,4-dimethylcyclohexyl]piperidine hydrochloride*

In the manner given in Example 108, 16.6 g. (0.086 mole) of 1-piperidino-4,4-dimethyl-1-cyclohexene was reacted with 14.7 g. of p-anisoyl chloride in chloroform solution in the presence of triethylamine and the resulting product was hydrogenated in the presence of platinum oxide to give, in 30% yield, cis-α-(p-methoxyphenyl)-3,3-dimethyl - 6 - piperidinocyclohexanemethanol of melting point 113–135° C. Ultraviolet: λ max. 226 (12,000); 268 sh.; 276 (1,650); 283 (1,400).

*Analysis.*—Calcd. for $C_{21}H_{33}NO_2$ (percent): C, 76.09; H, 10.03; N, 4.23. Found (percent): C, 76.39; H, 9.72; N, 3.96.

The above compound is useful as a diuretic.

In the manner given in Example 102, cis-α-(p-methoxyphenyl) - 3,3 - dimethyl-6-piperidinocyclohexanemethanol (3.3 g.) was reacted with 5 g. of hydrogen chloride in 200 ml. of methanol and then with a base to give the diuretic cis - 1 - [2-(α,p-dimethoxybenzyl)-4,4-dimethylcyclohexyl]piperidine, which after recrystallization from ethanol-water, had a melting point of 76–81° C. This product was crystallized again from absolute ethanol to yield the same compound of melting point 81–82° C. Part of this product was converted, with hydrogen chloride in ether, to the diuretic cis-1-[2-(α,p-dimethoxybenzyl)-4,4-dimethylcyclohexyl]piperidine hydrochloride which had a melting point of 205–206° C. Ultraviolet: λ max. 228 (13,050); 275 (1,400); 282 (1,200).

*Analysis.*—Calcd. for $C_{22}H_{35}NO_2 \cdot HCl$ (percent): C, 69.17; H, 9.50; N, 3.67; Cl, 9.28. Found (percent): C, 69.10; H, 9.87; N, 3.78; Cl, 9.36.

EXAMPLE 110

*Cis-2-[[α-methoxy-α-(2-piperidinocyclohexyl)-p-tolyl]oxy]ethanol*

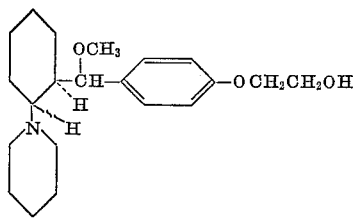

A solution of 1.75 g. (0.005 mole) of cis-α-[p-(2-hydroxyethoxyphenyl) - 2 - piperidino]cyclohexanemethanol hydrochloride (melting point 196–198° C.) was dissolved in 100 ml. of methanol containing 2.5 g. of hydrogen chloride. This reaction mixture was allowed to stand 20 hours at room temperature and then concentrated and neutralized as shown in Example 102. The thus-obtained cis-2-[[α-methoxy-α-(2-piperidinocyclohexyl) - p - tolyl] oxy]ethanol, after two recrystallizations from aqueous ethanol, had a melting point of 88–89° C. Ultraviolet: λ max. 228 (13,800); sl. sh. 268 (1,100); 276 (1,450); 283 (1,200).

*Analysis.*—Calcd. for $C_{21}H_{33}NO_3$ (percent): C, 72.58; H, 9.57; N, 4.03. Found (percent): C, 72.34; H, 9.66; N, 4.33.

The above compound is useful as a diuretic.

In the manner given in Example 102, other ether compounds of Formula IVa can be made by reacting an amino alcohol corresponding to Formula IV with a lower alkyl alcohol such as methyl, ethyl, propyl, isopropyl, butyl, isobutyl, secondary butyl, pentyl and hexyl alcohols, including the isomers, containing water-free hydrogen chloride as condensing agent. Other ether compounds of Formula IVa thus produced include: 1-[2-(o-hydroxy-α-methoxybenzyl)cyclohexyl]piperidine melting point 113–114.5° C.) useful as a diuretic; cis-1-[2-(α,4-dimethoxy-3,5-dimethylbenzyl)cyclohexyl]piperidine (melting point 68–69° C.); cis-1-[2-(α-propoxy-p-methoxybenzyl)cyclohexyl]piperidine (as hydrochloride melting point 192–193° C.), useful as a diuretic and oral antidiabetic; 1-[2-(α-methoxy-p-benzyloxybenzyl)cyclohexyl] piperidine (melting point 100–101° C.), useful as a diuretic; cis-1-[2-(α-methoxy-p-ethoxybenzyl)cyclohexyl] piperidine (as hydrochloride melting point 206–207° C.); cis-1-[2 - (α-methoxy-p-butoxybenzyl)cyclohexyl]piperidine; cis-1-[2 - α-methoxy-p-methylcarbamoyloxybenzyl)cyclohexyl]piperidine (double melting point 115.5–116° C., then 120–122° C.), useful as a diuretic;

cis-1-[2-(α-propoxy-4-methoxy-3,5-dimethylbenzyl)-cyclohexyl]hexahydro-1H-azepine;

cis-1-[2(α-pentyloxy-2,4-dimethylbenzyl)cyclohexyl] piperidine;

cis-1-[2-(α-hexyloxy-2,5-dichlorobenzyl)cycloheptyl] heptamethylene-imine;

cis-4-[2-(α-isopropoxy-2-butylbenzyl)cyclohexyl] morpholine;

cis-1-[2-(α-sec.butoxy-2-propylbenzyl)cycloheptyl]-1,2,3,4-tetrahydroquinoline;

cis-1-[2-(α,3,4,5-tetramethoxybenzyl)cyclooctyl] piperidine;

cis-1-[2-(α-ethoxy-3,4,5-trimethoxybenzyl)cyclo-
octyl]-2-methylpiperidine;
cis-1-[2-(α-propoxy-p-methoxybenzyl)cyclopentyl]-2-
methylpyrrolidine;
cis-1-[2-(α-methoxy-p-iodobenzyl)cyclopentyl]-2-
ethylpyrrolidine;
cis-1-[2-(α-ethoxy-p-trifluoromethylbenzyl)cyclo-
heptyl]-4-methylpiperidine;
cis-1-[2-(α-isopropoxy-2-chlorobenzyl)cyclooctyl]
octamethyleneimine;
cis-1-[2-(α-isopentyloxy-3-fluorobenzyl)cycloheptyl]-
3,6-dimethylhexamethyleneimine;
cis-4-[2-(α-isohexyloxy-2-bromobenzyl)cyclohexyl]
homomorpholine;
cis-1-[2-(α-ethoxy-2,4-diiodobenzyl)cyclopentyl]-2-
propylpiperidine;
cis-1-[2-(α-methoxy-p-hexylbenzyl)cyclopentyl]-4-
butylpiperazine;
cis-1-[2-(α-propoxy-2,4,6-triethylbenzyl)cycloheptyl]
heptamethyleneimine; and the like.

Instead of alkanols, diols such as ethylene glycol, 1,3-propanediol, 1,2-propanediol, 1,4-butanediol and the like can be used for the etherification as exemplified below.

EXAMPLE 111

*Cis-2-[[p-methoxy-α-(2-piperidinocyclohexyl)-
benzyl]oxy]ethanol*

A suspension of 9.0 g. (0.03 mole) of α-(p-methoxyphenyl)-2-piperidinocyclohexanemethanol (cis alcohol) in 250 ml. of ethylene glycol containing 15 g. of hydrogen chloride was stirred at room temperature for 15 hours. The mixture was then allowed to stand at room temperature for another 90 hours, then basified with 20% aqueous sodium hydroxide solution an d diluted with water. The solid which separated was recovered by filtration, washed sodium hydroxide solution and diluted with water. The methylene chloride layer was washed with water and saturated sodium chloride solution and finally dried over anhydrous sodium sulfate. The methylene chloride solution was then concentrated in vacuo and the resulting residue crystallized from Skellysolve B hexanes, to give cis-2 - [[p-methoxy-α-(2-piperidinocyclohexyl)benzyl]oxy]-ethanol of melting point 111–112.5° C. Ultraviolet: λ max. 227 (10,750); sl. sh. 268 (886); 276 (1,250); 282.5 (1,020).

*Analysis.*—Calcd. for $C_{21}H_{33}NO_3$ (percent): C, 72.58; H, 9.57; N, 4.03. Found (percent): C, 72.48; H, 9.50; N, 4.07.

The hydrochloride of the above amine melted at 193–195° C.

The above compounds are useful as diuretics.

EXAMPLE 112

*Cis-α-(p-benzyloxyphenyl)-2-piperidinocyclohexane-
methanol propionate ester hydrochloride*

A solution of 2.0 g. (0.00526 mole) of cis-α-(p-benzyloxyphenyl)-2-piperidinocyclohexanemethanol and 10 ml. of propionic anhydride in 100 ml. of methylene chloride was allowed to stand for a period of 24 hours at room temperature. The methylene chloride was removed in vacuo and the residue dissolved in ether. Addition of ethereal hydrogen chloride gave a gummy material which became solid on contact with water. The solid was dried in vacuo and recrystallized from isopropanol several times to give cis-α-(p-benzyloxyphenyl)-2-piperidinocyclohexenemethanol propionate ester hydrochloride of melting point 185.5–187° C.

*Analysis.*—Calcd. for $C_{28}H_{37}NO_3 \cdot HCl$ (percent): C, 71.24; H, 8.11; N, 2.97; Cl, 7.51. Found (percent): C, 70.62; H, 8.64; N, 2.76; Cl, 7.31.

This compound is useful as a tranquilizer; for example, it can be used to calm animals such as cattle and swine during transport.

EXAMPLE 113

*Cis-α-(p-methoxyphenyl)-2-piperidinocyclohexane-
methanol hexanoate ester hydrochloride*

A solution of 3.0 g. of α-(p-methoxyphenyl)-2-piperidinocyclohexanemethanol (cis alcohol) and 10 g. of hexanoic anhydride in 100 ml. of tetrahydrofuran was left at room temperature (23–26° C.) for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol ether to give cis-α-(p-methoxyphenyl)-2-piperidinocyclohexanemethanol hexanoate ester hydrochloride of melting point 191–193° C.

*Analysis.*—Calcd. for $C_{25}H_{39}NO_3 \cdot HCl$ (percent): C, 68.54; H, 9.20; N, 3.20; Cl, 8.10. Found (percent): C, 67.48; H, 9.17; N, 3.30; Cl, 9.97.

EXAMPLE 114

*Cis-α-(p-methoxyphenyl)-2-piperidinocyclohexane-
methanol hydrogen succinate ester hydrochloride*

In the same manner given in Example 113, 3.0 g. of α-(p-methoxyphenyl)-2-piperidinocyclohexanemethanol was treated with 1.3 g. of succinic anhydride in 100 ml. of tetrahydrofuran and the product converted to a hydrochloride salt to give cis-α-(p-methoxyphenyl)-2-piperidinocyclohexanemethanol hydrogen succinate ester hydrochloride of melting point 185–186° C.

*Analysis.*—Calcd. for $C_{23}H_{33}NO_5 \cdot HCl$ (percent): C, 62.78; H, 7.79; N, 3.18; Cl, 8.06. Found (percent): C, 62.89; H, 7.87; N, 3.21; Cl, 7.99.

This compound is useful as a diuretic.

EXAMPLE 115

*Cis-α-(p-methoxyphenyl)-2-piperidinocyclohexane-
methanol benzoate ester*

In the manner given in Example 113, a solution of 1.0 g. of cis-α-(p-methoxyphenyl)-2-piperidinocyclohexanemethanol was treated with benzoic anhydride in methylene chloride at room temperature to give cis-α-(p-methoxyphenyl) - 2-piperidinocyclohexanemethanol benzoate ester of melting point 131–132° C.

*Analysis.*—Calcd. for $C_{26}H_{33}NO_3$ (percent): C, 76.62; H, 8.16; N, 3.44. Found (percent): C, 76.90; H, 8.17; N, 3.24.

EXAMPLE 116

*Cis-α-(-3,4,5 - trimethoxyphenyl)-2-(hexahydro-1H-aze-
pin - 1 - yl)cyclohexanemethanol p - nitrobenzoate
ester*

A mixture of 1.0 g. of cis-α-(3,4,5-trimethoxyphenyl)-2 - (hexahydro-1H-azepin-1-yl)cyclohexanemethanol hydrochloride and 1.0 g. of p-nitrobenzoyl chloride and 15 ml. of dry pyridine was heated on the steam bath for 1 hour and then poured into cold water. The mixture was extracted with methylene chloride, three portions of 100 ml. each, the methylene chloride extracts were combined, washed with water, saturated sodium chloride solution and dried by passage through anhydrous sodium sulfate. The solution was thereupon evaporated in vacuo to give a reddish, dark gummy material which was chromatographed on Florisil (anhydrous magnesium silicate) eluting the column with ether. The ether eluates were combined, evaporated and the thus-obtained material recrystallized repeatedly from ethanol to give in 40% yield cis-α-(3,4,5-trimethoxyphenyl) - 2-(hexahydro-1H-azepin-1-yl)cyclohexanemethanol p-nitrobenzoate ester of melting point 126–127° C.

*Analysis.*—Calcd. for $C_{29}H_{38}N_2O_7$ (percent): C, 66.14; H, 7.27; N, 5.32. Found (percent): C, 66.42; H, 7.21; N, 4.82.

This compound can be reacted with trichloroacetic acid to give the corresponding trichloroacetic acid salt useful as a herbicide, for example, against Johnson grass, yellow foxtail, green foxtail, Bermuda grass and quack grass.

EXAMPLE 117

*Cis-A-α-(p-methoxyphenyl)-2-piperidinocyclohexanemethanol acetate ester hydrochloride*

In the manner given in Example 113, a solution of 3.0 g. of cis-A-α-(p-methoxyphenyl)-2-piperidinocyclohexanemethanol and 10 ml. of acetic anhydride was allowed to stand in 150 ml. of ether for 3 days. Addition of ethereal hydrogen chloride precipitated cis-A-α-(p-methoxyphenyl)-2-piperidinocyclohexanemethanol acetate ester hydrochloride having after recrystallization from isopropanol-ether a melting point of 207–208° C.

*Analysis.*—Calcd. for $C_{21}H_{31}NO_3 \cdot HCl$ (percent): C, 66.03; H, 8.45; N, 3.67; Cl, 9.28. Found (percent): C, 66.05; H, 8.65; N, 3.60; Cl, 9.53.

EXAMPLE 118

*Cis-A-α-(p-methoxyphenyl)-2-piperidinocyclohexanemethanol propionate ester hydrochloride*

In the same manner given in Example 113, 3.0 g. of cis-A-α-(p - methoxyphenyl) - 2 - piperidinocyclohexanemethanol was treated with propionic anhydride in ether, and the resulting ester precipitated as a white hydrochloride, using ethereal hydrogen chloride. This hydrochloride was recrystallized from isopropanol-ether and a second time from isopropanol to give cis-A-α-(p-methoxyphenyl)-2-piperidinocyclohexanemethanol propionate ester hydrochloride of melting point 195–195.5° C.

*Analysis.*—Calcd. for $C_{22}H_{33}NO_3 \cdot HCl$ (percent): C, 66.74; H, 8.65; N, 3.54; Cl, 8.96. Found (percent): C, 66.54; H, 8.81; N, 3.63; Cl, 3.54.

In the same manner, the B-isomers otherwise corresponding to Examples 117 and 118 were made, namely, α-(p-methoxyphenyl) - 2 - piperidinocyclohexanemethanol acetate ester hydrochloride (cis-isomer B) having a melting point of 201° C.

*Analysis.*—Calcd. for $C_{21}H_{31}NO_3 \cdot HCl$ (percent): C, 66.03; H, 8.45; N, 3.67; Cl, 9.28. Found (percent): C, 65.88; H, 8.73; N, 3.91; Cl, 9.21.

and α-(p-methoxyphenyl)-2-piperidinocyclohexanemethanol propionate ester hydrochloride (cis-isomer B) of melting point 192–193° C.

*Analysis.*—Calcd. for $C_{22}H_{33}NO_3 \cdot HCl$ (percent): C, 66.74 H, 8.65; N, 3.54; Cl, 8.96. Found (percent): C, 66.46; H, 8.88; N, 3.81; Cl, 9.02.

EXAMPLE 118A

*α-(3,4,5-trimethoxyphenyl) - 2 - (hexahydro-1H-azepin-1-yl)cyclohexanemethanol acetate ester hydrochloride*

In the manner given in Example 112, a solution of 3.0 g. of α-(3,4,5 - trimethoxyphenyl) - 2 - (hexahydro-1H-azepin-1-yl)cyclohexanemethanol was reacted with 10 ml. of acetic anhydride in 100 ml. of ether to give after treatment with ethereal hydrogen chloride, α-(3,4,5-trimethoxyphenyl) - 2 - hexahydro - 1H - azepin-1-yl)cyclohexanemethanol acetate ester hydrochloride of melting point 222–223° C.

*Analysis.*—Calcd. for $C_{24}H_{37}NO_5 \cdot HCl$ (percent): C, 63.21; H, 8.40; N, 3.07; Cl, 7.78. Found (percent): C, 63.04; H, 8.49; N, 3.08; Cl, 7.61.

EXAMPLE 119

*α-(3,4,5-trimethoxyphenyl) - 2 - (hexahydro-1H-azepin-1-yl)cyclohexanemethanol 3,4,5-trimethoxybenzoate ester*

In the manner given in Example 116, α-(3,4,5-trimethoxyphenyl) - 2 - (hexahydro - 1H - azepin-1-yl)cyclohexanemethanol was reacted with 3,4,5-trimethoxybenzoyl chloride in chloroform to give α-(3,4,5-trimethoxyphenyl) - 2 - (hexahydro - 1H - azepin-1-yl)cyclohexanemethanol 3,4,5-trimethoxybenzoate ester of melting point 130–133° C.

*Analysis.*—Calcd. for $C_{32}H_{45}NO_8$ (percent): C, 67.23; H, 7.93; N, 2.45. Found (percent): C, 67.54; H, 7.72; N, 3.00.

This compound can be reacted with trichloroacetic acid to give the corresponding trichloroacetic acid salt useful as a herbicide, for example, against Johnson grass, yellow foxtail, green foxtail, Bermuda grass and quack grass.

EXAMPLE 120

*Cis-2-[[p-methoxy-α-(2-piperidinocyclohexyl)benzyl]oxy]ethanol acetate ester hydrochloride*

A solution of 1.5 g. of cis-2-[[p-methoxy-α-(2-piperidinocyclohexyl)benzyl]oxy]ethanol and 10 ml. of acetic anhydride in 100 ml. of ether was allowed to stand for a period of 20 hours at room temperature. The ester which was thus produced was precipitated as the hydrochloride with ethereal hydrogen chloride. A total yield of 1.45 g. (79%) cis-2-[[p-methoxy-α-(2-piperidinocyclohexyl)benzyl]oxy]ethanol acetate ester hydrochloride of melting point 194° C. was obtained.

This compound is useful as a diuretic.

EXAMPLE 121

*Cis-2-[[p-methoxy-α-(2-piperidinocyclohexyl)benzyl]oxy]ethanol hydrogen succinate ester hydrochloride*

A mixture of 1.15 g. of cis-2-[[p-methoxy-α-(2-piperidinocyclohexyl)benzyl]oxy] ethanol was reacted with 0.34 g. of succinic anhydride in 350 ml. of ether. The ether solution was warmed, then allowed to stand for 24 hours at room temperature. Addition of ethereal hydrogen chloride gave cis-2-[[p-methoxy-α-(2-piperidinocyclohexyl)benzyl]oxy]ethanol hydrogen succinate ester hydrochloride of melting point 173–175° C.

*Analysis.*—Calcd. for $C_{25}H_{37}NO_6 \cdot HCl$ (percent): C, 62.03; H, 7.91; N, 2.89; Cl, 7.33. Found (percent): C, 61.65; H, 8.11; N, 3.04; Cl, 9.97.

This compound is useful as a diuretic.

EXAMPLE 122

*α-(p-Methoxyphenyl) - 2 - piperidinocyclohexanemethanol phenylacetate ester hydrochloride*

A solution of 3.0 g. of α-(p-methoxyphenyl)-2-piperidinocyclohexanemethanol and 10.0 g. of phenylacetic anhydride in 100 ml. of tetrahydrofuran was left at room temperature (23–26° C.) for a period of 2 days. The solvent was removed in vacuo and the residue dissolved in ether. This solution was treated with ethereal hydrogen chloride, and the thus-obtained hydrochloride was recrystallized from isopropanol-ether and from absolute ethanol-ether to give α-(p-methoxyphenyl) - 2 - pipidinocyclohexanemethanol phenylacetate ester hydrochloride.

EXAMPLE 123

*α-(p-Methoxyphenyl) - 2 - piperidinocyclohexanemethanol 3-phenylpropionate ester hydrochloride*

A solution of 3.0 g. of α-(p-methoxyphenyl)-2-piperidinocyclohexanemethanol and 10 g. of 3-phenylpropionic anhydride in 100 ml. of tetrahydrofuran was left at room temperature (23–26° C.) for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(p-methoxyphenyl)-2-piperidinocyclohexanemethanol 3-phenylpropionate ester hydrochloride.

EXAMPLE 124

*α-(p-Methoxyphenyl) - 2 - piperidinocyclohexanemethanol benzoate ester hydrochloride*

A solution of 3.0 g. of α-(p-methoxyphenyl)-2-piperidinocyclohexanemethanol and 10 g. of benzoic anhydride in 100 ml. of tetrahydrofuran was left at room temperature (23–26° C.) for a period of 2 days. The solvent was removed in vacuo and the residue dissolved in ether.

This solution was treated with ethereal hydrogen chloride, and the thus-obtained hydrochloride was recrystallized from isopropanol-ether and from absolute alcohol-ether to give α-(p-methoxyphenyl) - 2 - piperidinocyclohexanemethanol benzoate ester hydrochloride.

EXAMPLE 125

α-(*p-Methoxyphenyl*)-*2-piperidinocyclohexanemethanol*) *octanoate ester hydrochloride*

A solution of 3.0 g. of α-(p-methoxyphenyl)-2-piperidinocyclohexanemethanol and 10 g. of octanoic anhydride in 180 ml. of tetrahydrofuran was left at a room temperature (23–26° C.) for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(p-methoxyphenyl) - 2 - piperidinocyclohexanemethanol octanoate ester hydrochloride.

EXAMPLE 126

α-(*3,4,5-trimethoxyphenyl*)-*2-pyrrolidinocyclopentanemethanol decanoate ester hydrochloride*

A solution of α-(3,4,5-trimethoxyphenyl)-2-pyrrolidinocyclopentanemethanol and decanoic anhydride in tetrahydrofuran was left at room temperature for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(3,4,5-trimethoxyphenyl) - 2 - pyrrolidinocyclopentanemethanol decanoate ester hydrochloride.

EXAMPLE 127

α-(*3,4,5-trimethoxyphenyl*)-*2-pyrrolidinocyclopentanemethanol valerate ester hydrochloride*

A solution of α-(3,4,5-trimethoxyphenyl)-2-pyrrolidinocyclopentanemethanol and valeric anhydride in tetrahydrofuran was left at room temperature for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(3,4,5-trimethoxyphenyl)-2-pyrrolidinocyclopentanemethanol valerate ester hydrochloride.

EXAMPLE 128

α-(*3,4,5-trimethoxyphenyl*)-*2-pyrrolidinocyclopentanemethanol β-cyclopentylpropionate ester hydrochloride*

A solution of α-(3,4,5-trimethoxyphenyl)-2-pyrrolidinocyclopentanemethanol and β-cyclopentylpropionic anhydride in tetrahydrofuran was left at room temperature for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(3,4,5-trimethoxy)-2-pyrrolidinocyclopentanemethanol β-cyclopentylpropionate ester hydrochloride.

EXAMPLE 129

α-(*3,4,5-trimethoxyphenyl*)-*2-pyrrolidinocyclopentanemethanol benzoate ester hydrochloride*

A solution of α-(3,4,5-trimethoxyphenyl)-2-pyrrolidinocyclopentanemethanol and benzoic anhydride in tetrahydrofuran was left at room temperature for a period of 2 days. The solvent was removed in vacuo and the residue dissolved in ether. This solution was treated with ethereal hydrogen chloride and the thus-obtained hydrochloride was recrystallized from isopropanol-ether and from absolute ethanol-ether to give α-(3,4,5-trimethoxyphenyl)-2- pyrrolidinocyclopentanemethanol benzoate ester hydrochloride.

EXAMPLE 130

α-(*p-Trifluoromethylphenyl*) - *2* - (*hexahydro-1H-azepin-1-yl*)-*cyclooctanemethanol isobutyrate ester hydrochloride*

A solution of α-(p-trifluoromethylphenyl)-2-(hexahydro-1H-azepin-1-yl)cyclooctanemethanol and isobutyric anhydride in tetrahydrofuran was left at room temperature (23–26° C.) for a period of 2 days. The solvent was removed in vacuo and the residue dissolved in ether. This solution was treated with ethereal hydrogen chloride and the thus-obtained hydrochloride was recrystallized from isoprpnaol-ether and from absolute ethanol-ether to give α-(p-trifluoromethylphenyl)-2-hexahydro - 1H - azepin-1-yl)-cyclooctanemethanol isobutyrate ester hydrochloride.

EXAMPLE 131

Cis-α-(*3,4,5-trimethoxyphenyl*)-*2-(hexahydro-1H-azepin-1-yl*)*cyclohexanemethanol laurate ester*

A mixture of 1.0 g. of cis-α-(3,4,5-trimethoxyphenyl)-2 - (hexahydro-1H-azepin-1-yl)cyclohexanemethanol hydrochloride and 1.0 g. of lauroyl chloride and 15 ml. of dry pyridine was heated on the steam bath for 1 hour and then poured into cold water. The mixture was extracted with methylene chloride, three portions of 100 ml. each, the methylene chloride extracts were combined, washed with water and saturated sodium chloride solution and dried by passage through anhydrous sodium sulfate. The solution was thereupon evaporated in vacuo, and the residue thus-obtained was chromatographed on Florisil (anhydrous magnesium silicate), eluting the column with ether. The ether eluates were combined, evaporated, and the thus-obtained material recrystallized repeatedly from ethanol to give in 40% yield cis-α-(3,4,5-trimethoxyphenyl)-2-(hexahydro- - 1H - azepin-1-yl) cyclohexanemethanol laurate ester.

EXAMPLE 132

α-(*p-Methylphenyl*)-*2-piperidinocyclohexanemethanol crotonate ester*

In the manner given in Example 116, α-(p-methylphenyl) - 2 - piperidinocyclohexanemethanol was reacted with crotonoyl chloride in pyridine to give α-(p-methylphenyl)-2-piperidinocyclohexanemethanol crotonate ester.

EXAMPLE 133

α-(*p-Methylphenyl*)-*2-piperidinocyclohexanemethanol chrysanthemummonocarboxylate ester*

In the maner given in Example 116, α-(p-methylphenyl)-2-piperidinocyclohexanemethanol was reacted with chrysanthemummonocarbonyl chloride in pyridine to give α-(p-methylphenyl) - 2 - piperidinocyclohexanemethanol chrysanthemummonocarboxylate ester.

EXAMPLE 134

α-(*p-Methylphenyl*)-*2-piperidinocyclohexanemethanol 3-butynoate ester*

In the manner given in Example 116, α-(p-methylphenyl)-2-piperidinocyclohexanemethanol was reacted with 3-butynoyl chloride in pyridine to give α-(p-methylphenyl)-2-piperidinocyclohexanemethanol 3-butynoate ester.

EXAMPLE 135

α-(*p-Methylphenyl*)-*2-piperidinocyclohexanemethanol cinnamate ester*

In the manner given in Example 116, α-(p-methylphenyl)-2-piperidinocyclohexanemethanol was reacted with cinnamoyl chloride in pyridine to give α-(p-methylphenyl) - 2 - piperidinocyclohexanemethanol cinnamate ester.

EXAMPLE 136

α-(2,4-dichlorophenyl)-2-octamethylenediminocyclopentanemethanol 3-phenylpropionate ester A mixture of α-(2,4-dichlorophenyl)-2-octamethyleneiminocyclopentanemethanol hydrochloride and 3-phenylpropionyl chloride in pyridine was reacted as in Example 116 to give α-(2,4-dichlorophenyl)-2-octamethyleneiminocyclopentanemethanol 3-phenylpropionate ester.

In the manner given in Example 116, other esters of Formula IVb can be synthetized by reacting an acid bromide or chloride with an alcohol of Formula IV. Representative compounds, thus obtained, include: the acetate, propionate, butyrate, isobutyrate, valerate, hexanoate, isovalerate, heptanoate, octanoate, nonanoate, decanoate, undecanoate, laurate, β-cyclopentylpropionate, benzoate, phenylacetate, 3-phenylpropionate, 3-butynoate, crotonate, cinnamate, acrylate, anisoate and 3,4,5-trimethoxybenzoate of the cis-A, cis-B, trans-C and trans-D isomers of α-(p-methoxyphenyl)-2-piperidinocyclohexanemethanol;
α-(3,4,5-trimethoxyphenyl)-2-piperidinocyclopentanemethanol;
α-(p-ethoxyphenyl)-2-piperidinocyclohexanemethanol;
α-(p-benzyloxyphenyl)-2-piperidinocyclohexanemethanol;
α-(p-benzyloxyphenyl)-2-pyrrolidinocyclohexanemethanol;
α-[p-(2-hydroxyethoxy)phenyl]-2-piperidinocyclohexanemethanol;
α-(o-methoxyphenyl)-2-piperidinocyclohexanemethanol;
α-(o-hydroxyphenyl)-2-piperidinocyclohexanemethanol
α-(2-methoxy-4-methylphenyl)-2-piperidinocyclohexanemethanol;
α-(3,5-dimethyl-4-methylphenyl)-2-piperidinocyclohexanemethanol;
α-(p-trifluoromethylphenyl)-2-piperidinocyclohexanemethanol;
α-(p-allyloxyphenyl)-2-piperidinocyclohexanemethanol;
α-(3,4-methylenedioxyphenyl)-2-(hexahydro-1H-azepin-1-yl)cyclohexanemethanol;
α-(p-chlorophenyl)-2-(2-isopropylpyrrolidino)cyclohexanemethanol;
α-(p-hydroxyphenyl)-2-octamethyleneiminocyclohexanemethanol;
α-(o-methylphenyl)-2-pyrrolidinocyclohexanemethanol;
α-(p-methylphenyl)-2-pyrrolidinocyclohexanemethanol;
α-(2-methoxy-4-methylphenyl)-2-morpholinocyclohexanemethanol;
α-(2-hydroxy-5-chlorophenyl-2-homomorpholinocyclohexanemethanol;
α-[p-(carboxymethoxy)phenyl]-2-(3,6-dimethylhexamethyleneimino)cyclohexanemethanol;
α-(3,4-methylenedioxyphenyl)-2-(2-methylpiperidino)-cyclohexanemethanol;
α-(p-ethoxyphenyl)-2-pyrrolidinocycloheptanemethanol;
α-(2,3,4-trimethoxyphenyl)-2-piperidinocyclooctanemethanol;
α-(3,5-diiodophenyl)-2-(3-methylpiperidino)cyclohexanemethanol;
α-(2-methoxy-4-chlorophenyl)-2-piperidinocyclohexanemethanol;
α-(2-methyl-4-trifluoromethylphenyl)-2-piperidinocyclohexanemethanol;
α-(3,4-dipropylphenyl)-2-pyrrolidinocycloheptanemethanol;
α-(2,5-dichlorophenyl)-2-heptamethyleneiminocycloheptanemethanol;
α-(3,4-dichlorophenyl)-2-(3-methylpiperidino)-cyclooctanemethanol;
α-(p-propoxyphenyl)-2-(4-butylpiperazino)-cyclooctanemethanol;
α-(2,5-diiodophenyl)-2-(2-methylhexamethyleneimino)cycloheptanemethanol;
α-(3-fluorophenyl)-2-pyrrolidinocyclopentaenemethanol;
α-(2-hexylphenyl)-2-piperidinocyclopentanemethanol;
α-(3-pentylphenyl)-2-piperidinocyclohexanemethanol;
α-(2-butylphenyl)-2-morpholinocyclohexanemethanol;
α-2-propylphenyl)-2-(1,2,3,4-tetrahydro-1-quinolyl)cycloheptanemethanol;
α-(3-ethylphenyl)-2-piperidinocyclooctanemethanol;
α-phenyl-2-octamethyleneiminocyclooctanemethanol;
α-phenyl-2-(2,3,6-trimethylmorpholino)cycloheptanemethanol and the like.

EXAMPLE 136A

α-(3,4,5-trimethoxyphenyl)-2-piperidinocyclohexane methanol N-oxide hydrate

To a solution of α-(3,4,5-trimethoxyphenyl)-2-piperidinocyclohexanemethanol (6.9 g.; 0.019 mole) in 70 ml. of methanol was added, under cooling (in ice), 6.5 g. (0.038 mole) of m-chloroperbenzoic acid during 1 minute. The resulting reaction mixture was allowed to stand in ice for 7.5 hours and thereupon at room temperature for 16 hours. It was then evaporated to dryness in vacuo at 40° C. To the thus-obtained residue was added 70 ml. of water followed by 50 ml. of 5% aqueous sodium hydroxide and 100 ml. of methylene chloride. The mixture was shaken until solution resulted. The aqueous layer was extracted with methylene chloride (4 portions of 50 ml. each). The combined organic layers were washed with saturated salt solution, dried by passage through anhydrous sodium sulfate and evaporated to give 5.5 g. of amorphous solid. This solid was dissolved in 100 ml. of ethyl acetate (saturated with water), and the solution was refluxed for 5 minutes during which time a suspension resulted. It was allowed to cool and was then filtered, and the precipitate, a hydrate, was washed with ethyl acetate and then with ether to give 4.9 g. (65% yield) of material which was recrystallized from ethyl acetate to give pure α-(3,4,5-trimethoxyphenyl)-2-piperidinocyclohexanemethanol N - oxide hydrate of melting point 158–159° C. Ultraviolet: sh. 227 (9,150); λ max. 269 (835); 278 (555).

*Analysis.*—Calcd. for $C_{21}H_{33}NO_5 \cdot H_2O$ (percent): C, 63.45; H, 8.88; N, 3.52. Found (percent): C, 63.12; H, 9.06; N, 3.31 (dried at room temperature at 0.1 mm.).

EXAMPLE 137

α-(3,4-dimethoxyphenyl)-2-(hexahydro-1H-azepin-1-yl)cyclohexanemethanol N-oxide In the manner given in Example 136A, α-(3,4-dimethoxyphenyl)-2-(hexahydro - 1H - azepin-1-yl)cyclohexanemethanol hydrochloride was treated with aqueous methanolic sodium hydroxide solution and thereupon extracted with methylene chloride. The methylene chloride solution was evaporated, the crude product dissolved in methanol and treated with m-chloroperbenzoic acid as shown in Example 136A to give α-(3,4-dimethoxyphenyl)-2 - (hexahydro-1H-azepin-1-yl)cyclohexanemethanol N-oxide.

EXAMPLE 138

α-(3,4,5-trimethoxyphenyl)-2-pyrrolidinocyclopentanemethanol N-oxide

In the manner given in Example 137, α-(3,4,5-trimethoxyphenyl)-2-pyrrolidinocyclopentanemethanol was treated with m-chloroperbenzoic acid to give α-(3,4,5-trimethoxyphenyl) - 2 - pyrrolidinocyclopentanemethanol N-oxide.

EXAMPLE 139

1-[2-(α,3,4,5-tetramethoxybenzyl)cyclohexyl] piperidine N-oxide

In the manner given in Example 91, 1-[2-(α,3,4,5-tetramethoxybenzyl)cyclohexyl]piperidine was treated in methanol solution with m-chloroperbenzoic acid to give 1 - [2-(α,3,4,5-tetramethoxybenzyl)cyclohexyl]piperidine N-oxide.

EXAMPLE 140

*Cis-α-(p-methoxyphenyl)-2-piperidinocyclohexane-methanol benzoate ester N-oxide*

In the manner given in Example 91, cis-α-(p-methoxyphenyl)-2-piperidinocyclohexanemethanol benzoate was treated with m-chloroperbenzoic acid in methanolic solution to give cis-α-(p-methoxyphenyl)-2-piperidinocyclohexanemethanol benzoate ester N-oxide.

EXAMPLE 141

*α-(p-methoxyphenyl)-2-piperidinocyclohexanemethanol acetate ester N-oxide*

In the manner given in Example 91, α-(p-methoxyphenyl)-2-piperidinocyclohexanemethanol acetate ester was treated in methanolic solution with m-chloroperbenzoic acid to give α-(p-methoxyphenyl)-2-piperidinocyclohexanemethanol acetate ester N-oxide.

In the same manner as given in Example 91, other alcohols of Formula IV, ethers of Formula IVa and esters of Formula IVb can be converted with hydrogen peroxide or a peracid such as m-chloroperbenzoic acid, peracetic acid, perpropionic acid and the like to the corresponding N-oxides. The N-oxides comprised by this invention include especially the N-oxides of the compounds prior exemplified and listed as alcohols, ethers and esters.

EXAMPLE 142

*α-(3,4,5-trimethoxyphenyl)-2-hexahydro-1H-azepin-1-yl)cyclohexanemethanol methiodide*

A solution of α-(3,4,5-trimethoxyphenyl)-2-(hexahydro-1H-azepin-1-yl)cyclohexanemethanol (3.8 g.; 0.01 mole) in 25 ml. of methanol and 14.2 g. (0.01 mole) of methyl iodide was refluxed for a period of 8 hours. It was then evaporated to dryness and the residual oily solid was crystallized from methanol-ether to give 3.5 g. (67.5% yield) of α-(3,4,5-trimethoxyphenol)-2-hexahydro - 1H-azepin-1-yl)cyclohexanemethanol methiodide of melting point 191–193° C.

*Analysis.*—Calcd. for $C_{23}H_{38}INO_4$ (percent): C, 53.18; H, 7.37; I, 24.43; N, 2.70. Found (percent): C, 52.93; H, 7.27; I, 24.44; N, 3.00.

EXAMPLE 143

*α-(3,4,5-trimethoxyphenyl)-2-piperidinocyloheptane-methanol butyl iodide*

In the manner given in Example 142, butyl iodide was reacted with a α-(3,4,5-trimethoxyphenyl)-2-piperidinocycloheptanemethanol to give α-(3,4,5-trimethoxyphenyl)-2-piperidinocycloheptane methanol butyl iodide.

EXAMPLE 144

*α-(3,4,5-trimethoxyphenyl)-2-morpholinocyclohexane-methanol octyl bromide*

In the manner given in Example 142, α-(3,4,5-trimethoxyphenyl)-2-morpholinocyclohexanemethanol was reacted in methanol solution with octyl bromide to give α - (3,4,5-trimethoxyphenyl)-2-morpholinocyclohexanemethanol octyl bromide.

EXAMPLE 145

*1-[2-(α,3,4,5-tetramethoxybenzyl)cyclohexyl]piperidine dodecyl bromide*

In the manner given in Example 142, 1-[2-(α,3,4,5-tetramethoxybenzyl)cyclohexyl]piperidine in methanol solution was reaction with dodecyl bromide to give 1-[2-(α,3,4,5 - tetramethoxybenzyl)cyclohexyl]piperidine dodecyl bromide.

EXAMPLE 146

*1-[2-α,p-dimethoxybenzyl)cyclohexyl]-4-methyl-piperidine isopropyl iodide*

In the manner given in Example 142, 1-[2-(α,p-dimethoxybenzyl)cyclohexyl]-4-methylpiperidine was reacted with isopropyl iodide in methanol solution to give 1 - [2-(α,p-dimethoxybenzyl)cyclohexyl]-4-methylpiperidine isopropyl iodide.

EXAMPLE 147

*α-(p-benzyloxyphenyl)-2-piperidinocyclohexane-methanol propionate ester dodecyl iodide*

In the manner given in Example 142, α-(p-benzyloxyphenyl) - 2 - piperidinocyclohexanemethanol propionate ester was reacted with dodecyl iodide in methanol solution to give α - (p-benzyloxyphenyl)-2-piperidinocyclohexanemethanol propionate ester dodecyl iodide.

EXAMPLE 148

*α-(3,4,5-trimethoxyphenyl)-2-(hexahydro-1H-azepin-1-yl)cyclohexanemethanol p-nitrobenzoate ester ethiodide*

α - (3,4,5-trimethoxyphenyl)-2-(hexahydro-1H-azepin-1-yl)cyclohexanemethanol p-nitrobenzoate ester was reacted with ethyl iodide to give α-(3,4,5-trimethoxyphenyl) - 2-hexahydro-1H-azepin-1-yl)cyclohexanemethanol p-nitrobenzoate ester ethiodide.

EXAMPLE 149

*α-(p-methoxyphenyl)-2-piperidinocyclohexanemethanol propionate ester isobutyl iodide*

In the manner given in Example 142, α-(p-methoxyphenyl) - 2 - piperidinocyclohexanemethanol propionate ester was reacted with isobutyl iodide to give α-(p-methoxyphenyl) - 2-piperidinocyclohexanemethanol propionate ester isobutyl iodide.

In the manner given in Example 142, other quaternary ammonium compounds can be prepared by reacting the alcohols (IV), ethers (IVa) and esters (IVb), with an alkyl halide in which the alkyl group has from 1 to 12 carbon atoms and the halogen is bromine or iodine.

The alcohols, ethers and esters of Formulae IV, IVa and IVb, when obtained in the form of hydrochloride, can furthermore be converted to the free base by reacting such compounds in aqueous or methanolic or methanolic-aqueous solution of a base, particularly sodium and potassium hydroxide and ammonium hydroxide.

From the aqueous solution, the free bases are obtained by extracting with a water-insoluble solvent such as ether, methylene chloride, chloroform, carbon tetrachloride, benzene or the like. The free bases can be converted to other salts by treatment of the free base with an inorganic or organic acid such as hydrogen iodide, hydrogen bromide, perchloric acid, sulfuric acid, nitric acid, tartaric acid, lactic acid, acetic acid, or the like, usually in aqueous or aqueous-alcoholic solution.

EXAMPLE 150

*Resolution of cis-B-1-[2-α,p-dimethoxybenzyl)cyclohexyl]piperidine*

A mixture of 16.0 g. of cis-B-1-[2-(α,p-dimethoxybenzyl)cyclohexyl]piperidine (Example 90), 19.5 g. of O,O,'-di-p-toluoyl-L-tartaric acid acid, 25 ml. of absolute ethanol and 25 ml. of ethyl acetate was heated until all solids were dissolved. Ethyl acetate (200 ml.) was added and the hot solution filtered. On standing overnight, a white solid separated which was recovered by filtration, then washed with 50 ml. of ethyl acetate and dried in vacuo; 11.50 g. of material was obtained of melting point 151–152° C. which was recrystallized from a mixture of absolute ethanol (25 ml.) and ethyl acetate (110 ml.) to give the O,O'-di-p-toluoyl-L-tartrate of (—)-cis-B-1-[2-(α,p-dimethoxybenzyl)cyclohexyl]piperidine of melting point 159–160° C.; $[\alpha]_D^{25}$ —130° in methanol.

Analysis.—Calcd. for C₂₀H₃₁NO₂·C₂₀H₁₈O₈ (percent): C, 68.26; H, 7.02; N, 1.99. Found (percent): C, 67.99; H, 6.78; N, 2.07.

Ten g. of the above salt was treated with 100 ml. of 5% aqueous sodium carbonate solution, and the mixture was extracted with methylene chloride. The methylene chloride layer was washed with saturated sodium chloride solution, dried over anhydrous magnesium sulfate, and evaporated in vacuo to give 4.56 g. of a white solid. This white solid was recrystallized from 30 ml. of absolute ethanol (twice) to give 3.2 g. of (—)-cis-B-1-[2-(α,p-dimethoxybenzyl)cyclohexyl]piperidine of melting point 106.6–107.5° C. Optical rotation [α]_D^{25} —65° in chloroform.

Analysis.—Calcd. for C₂₀H₃₁NO₂ (percent): C, 75.67; H, 9.84; N, 4.41. Found (percent): C, 75.49; H, 10.00; N, 4.68.

The hydrochloride of this base was prepared by suspending 2.5 g. of the (—)-cis-B-1-[2-(α,p-dimethoxybenzyl)cyclohexyl]-piperidine in 20 ml. of isopropanol and adding 7.0 ml. of 1.2 N ethereal hydrogen chloride solution. The mixture was warmed on the steam bath until solution was complete, filtered and the filtrate diluted with 125 ml. of ether to give 2.55 g. of (—)-cis-B-1-[2-(α,p - dimethoxybenzyl)cyclohexyl]piperidine hydrochloride of melting point 227–228° C. and rotation [α]_D^{25} —58° in methanol.

Analysis.—Calcd. for C₂₀H₃₁NO₂·HCl (percent): C, 67.87; H, 9.11; N, 3.96; Cl, 10.02. Found (percent): C, 67.46; H, 9.02; N, 3.79; Cl, 10.05.

The mother liquor containing essentially the d-base, L-acid salt of above was concentrated in vacuo, the residue dissolved in 250 ml. of hot ethyl acetate and seeded with l-base, L-acid salt and allowed to stand for 24 hours at room temperature. A gum separated, the ethyl acetate was decanted off, and the gum washed with 25 ml. of ethyl acetate. The combined ethyl acetate (275 ml.) was seeded again with l-base, L-salt and put in the refrigerator at 5° C. for 48 hours. The solution deposited a gum, and the ethyl acetate was decanted off, and the gum washed with 25 ml. of ethyl acetate. The combined ethyl acetate (300 ml.) was concentrated in vacuo to give 15.85 g. of gum. The gum was converted to the free base with 5% aqueous sodium bicarbonate solution-methylene chloride. The organic layer which separated was washed with saturated sodium chloride, dried over anhydrous sodium sulfate and evaporated to give 6.2 g. of a white solid which was crystallized from 45 ml. of absolute ethanol to give 1.45 g. a material of melting point 150–107° C. This product was recrystallized from 10 ml. of absolute ethanol to give 1.17 g. of (+)-cis-B-1-[2-(α,p-dimethoxybenzyl)cyclohexyl]piperidine of melting point 106–107° C. and rotation [α]_D^{25} +65° (chloroform).

Analysis.—Calcd. for C₂₀H₃₁NO₂ (percent): C, 75.67; H, 9.84; N, 4.41. Found (percent): C, 75.57; H, 9.58; N, 4.34.

The hydrochloride of the d-base was prepared as shown above for the l-base in isopropanol and with ethereal hydrogen chloride. The (+)-cis-B-1-[2-(α,p-dimethoxybenzyl)cyclohexyl]piperidine hydrochloride had a melting point of 230–231° C. and rotation [α]_D^{25} +60° in methanol.

Analysis.—Calcd. for C₂₀H₃₁NO₂·HCl (percent): C, 67.87; H, 9.11; N, 3.96; Cl, 10.02. Found (percent): C, 67.39; H, 9:45; N, 3.98; Cl, 10.14.

EXAMPLE 151

Resolution of cis-B-α-(p-methoxyphenyl)-2-piperidinocyclohexanemethanol

A warm solution of 12.1 g. (0.04 mole) of cis-B-α-(p-methoxyphenyl)-2-piperidinocyclohexanemethanol and 15 g. (0.04 mole) of O,O'-dibenzyl-D-tartaric acid monohydrate in 2000 ml. of isopropanol was filtered, seeded with a few crystals of the l-base, D-acid salt and allowed to stand at room temperature for 8 days. The isopropanol was decanted from the crystalline salt, 100 ml. of fresh isopropanol was added, and the (—)-cis-B-α-(p-methoxyphenyl)-2-piperidinocyclohexanemethanol O,O'-dibenzoyl-D-tartrate was recovered by filtration; a total of 7.0 g. of melting point 170–172° C., rotation [α]_D^{25} —52° in chloroform.

This salt was converted to the free base with aqueous sodium bicarbonate in methylene chloride, the organic layer was washed with saturated sodium chloride solution, dried over anhydrous sodium sulfate and evaporated to a white solid which was crystallized from ether. A first crop of 2.25 g. of colorless needles was obtained which was (—) - cis-B-α-(p-methoxyphenyl)-2-piperidinocyclohexanemethanol of melting point 141–142° C., optical rotation [α]_D^{25} —46° in chloroform.

Analysis.—Calcd. for C₁₉H₂₉NO₂ (percent): C, 75.20; H, 9.63; N, 4.62. Found (percent): C, 74.89; H, 9.89; N, 4.68.

The isopropanol mother liquor from the l-base, D-acid salt was concentrated in vacuo, and the residue converted to the crude d-base with aqueous sodium bicarbonate and recovered by extraction with methylene chloride. The crude d-base (8.3 g.) and 10.0 g. of O,O'-dibenzoyl-L-tartaric acid in 2000 ml. of isopropanol was seeded with a d-base, L-acid salt and allowed to stand 6 days at room temperature. The isopropanol was decanted from the crystalline salt, and the solid washed with fresh isopropanol, filtered and converted to the d-base with aqueous sodium bicarbonate as before. A total of 1.32 g. of (+)-cis - B - α - (p-methoxyphenyl)-2-piperidinocyclohexanemethanol of melting point 141–142° C. and optical rotation [α]_D^{25} +45° in chlorofrom was obtained.

Analysis.—Calcd. for C₁₉H₂₉NO₂ (percent): C, 75.20; H, 9.63; N, 4.62. Found (percent): C, 75.44; H, 9.59; N, 4.57.

The methods given in Examples 150 and 151 can be used to resolve other compounds shown in this application, particularly those of Formulae IV, IVa and IVb.

What is claimed is:
1. A substituted methanol of the formula:

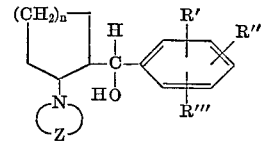

wherein n has the value of 1 to 4, inclusive, wherein

represents piperidino and mono- and dimethyl-substituted piperidino, wherein R', R" and R'" are selected from the group of substituents consisting of hydrogen, halogen, alkyl of 1 to 6 carbon atoms, inclusive, and alkoxy of 1 to 6 carbon atoms, inclusive, and —CF₃ with the proviso that at least one of the variants R', R", and R'" is selected from the group consisting of hydrogen, halogen, alkoxy as defined above, and CF₃; and the acid addition salts, N-oxides and alkyl quaternary ammonium halide salts thereof in which the alkyl group has from 1 to 12 carbon atoms, inclusive.

2. The substituted methanol hydrochloride of claim 1, wherein n=2,

is piperidino and R', R" and R'" are 3-, 4- and 5-methoxy groups, and the product is therefore the hydrochloride of α-(3,4,5-trimethoxyphenyl) - 2 - piperidinocyclohexanemethanol of melting point of about 266–267° C.

3. The substituted methanol of claim 1, wherein $n=2$,

is piperidino, R′ and R″ are hydrogen and R‴ is p-methoxy which has a melting point of about 81–82.5° C., and the product is therefore cis-A-α-(p-methoxyphenyl)-2-piperidinocyclohexanemethanol.

4. The substituted methanol of claim 1, wherein $n=2$,

is piperidino, R′ and R″ are hydrogen, R‴ is p-methoxy, which has a melting point of about 135–136° C. and is therefore cis-B-α-(p-methoxyphenyl)-2-piperidinocyclohexanemethanol.

5. The substituted methanol of claim 1, wherein $n=2$,

is piperidino, R′ and R″ are hydrogen, R‴ is p-methoxy, which has a melting point of about 148–149° C. and is therefore trans-C-α-(p-methoxyphenyl)-2-piperidinocyclohexanemethanol.

6. The substituted methanol of claim 1, wherein $n=2$,

is piperidino, R′ and R″ are hydrogen, R‴ is p-methoxy, which has a melting point of about 81–82° C. and is therefore trans-D-α-(p-methoxyphenyl)-2-piperidinocyclohexanemethanol.

7. The substituted methanol hydrochloride compound according to claim 1, wherein $n=3$,

is piperidino, R′, R″ and R‴ are 3-, 4- and 5-methoxy groups which has a melting point of about 243–244° C. and is therefore α-(3,4,5-trimethoxyphenyl)-2-piperidinocycloheptanemethanol hydrochloride.

8. The substituted methanol compound according to claim 1, wherein $n=1$,

is piperidino, R′, R″ and R‴ are 3-, 4- and 5-methoxy groups, which has a melting point of about 91–92° C. and is an α-(3,4,5-trimethoxyphenyl)-2-piperidinocyclopentanemethanol.

9. The substituted methanol compound according to claim 1, wherein $n=1$,

is piperidino, R′, R″ and R‴ are 3-, 4- and 5-methoxy groups, which has a melting point of about 119–120° C. and is an α-(3,4,5-trimethoxyphenyl)-1-piperidinocyclopentanemethanol.

10. A substituted methanol N-oxide compound according to claim 1, which is α-(3,4,5-trimethoxyphenyl)-2-piperidinocyclohexanemethanol N-oxide hydrate having a melting point of about 158–159° C.

11. The substituted methanol hydrochloride compound according to claim 1, wherein $n=2$,

is piperidino, R′ is hydrogen, R″ is 2-methoxy and R‴ is 4-methyl, which has a melting point of about 251–252° C. and is therefore cis-α-(2-methoxy-p-tolyl)-2-piperidinocyclohexanemethanol hydrochloride.

12. The substituted methanol hydrochloride compound according to claim 1, wherein $n=2$,

is piperidino, R′ and R″ are hydrogen and R‴ is p-ethoxy, which has a melting point of about 221–222° C. and is therefore α-(p-ethoxyphenyl) - 2 - piperidinocyclohexanemethanol hydrochloride.

13. The substituted methanol compound according to claim 1, wherein $n=2$,

is 4-methylpiperidino, R′ and R″ are hydrogen and R‴ is p-methoxy, which has a melting point of about 93–94° C. and is therefore cis-α-(p-methoxyphenyl)-2-(4-methylpiperidino)cyclohexanemethanol.

14. The substituted methanol compound according to claim 1 wherein $n=2$,

is piperidino, R′ and R″ are hydrogen, and R‴ is p-methoxy, which has a melting point of about 141–142° C., an optical rotation of about $[\alpha]_D^{25} -46°$ in chloroform, and the compound is therefore (−)-cis-B-α-(p-methoxyphenyl)-2-piperidinocyclohexanemethanol.

15. The substituted methanol compound according to claim 1, wherein $n=2$,

is piperidino, R′ and R″ are hydrogen, and R‴ is p-methoxy, which has a melting point of about 141–142° C., an optical rotation of about $[\alpha]_D^{25} +45°$ in chloroform, and the compound is therefore (+)-cis-B-α-(p-methoxyphenyl)-2-piperidinocyclohexanemethanol.

16. Cis-α-(p-methoxyphenyl)-3,3-dimethyl - 6 - piperidinocyclohexanemethanol of melting point about 133–135° C.

References Cited

UNITED STATES PATENTS 3,257,413  6/1966  Short  260—294.7X

FOREIGN PATENTS 845,822  8/1960  Great Britain.

OTHER REFERENCES

Szmuszkovicz et al., "Chemical Abstracts," vol. 68 (1968): p. 12285.

ALEX MAZEL, Primary Examiner

J. H. TURNIPSEED, Assistant Examiner

U.S. Cl. X.R.

117—138.5; 252—380; 260—239, 243, 247.7, 268, 289, 326.5, 326.8, 340.5; 424—246, 248, 250, 258, 267, 274

UNITED STATES PATENT OFFICE
CERTIFICATE OF CORRECTION

Patent No. 3,595,867  Dated July 27, 1971

Inventor(s) Jacob Szmuszkovicz

It is certified that error appears in the above-identified patent and that said Letters Patent are hereby corrected as shown below:

Column 2, line 54, for "3.6" read -- 3,6 --. Column 3, line 29, for "of hydrogenation" read -- of a hydrogenation --; line 60, for "the" read -- they --; line 66, for "halides" read -- halide --. Column 4, line 60, for "types" read -- type --; line 67, for "unoknwn" read -- unknown --. Column 6, line 29, for "carobxylic" read -- carboxylic --; line 32, for "as acid" read -- as benzoic acid --; line 66, for "IV" read -- IVb --. Column 7, line 28, for "oxides" read -- oxide --; line 38, for "and products" read -- and the products --. Column 9, line 42, for "dec.)" read -- (dec.) --; line 44, for "ethanol" read -- methanol --; line 68, for "cholroform" read -- chloro- --; line 70, for "111-111.5 C." read -- 111-111.5° C. --; line 73, for "cyclohexnone" read -- cyclohexanone --. Column 10, line 6, for "cyclohexnone" read -- cyclohexanone --; line 19, for "n" read -- in --; line 29, for "(2-ethoxy" read -- (2-methoxy --. Column 12, line 13, for "heptane" read -- heptene --. Column 14, line 26, for "portion" read -- portions --; line 64, for "becomes" read -- became --. Column 15, line 73, for "γ/max" read -- λmax --. Column 16, line 15, for "γ/max" read -- λmax --; line 16, for "(1.300)" read -- (1,300) --; line 21, for "-2-piperidinocyclohexam" read -- -2-piperidinocyclohexane"; line 26, for "can be used in" read -- can be in --; Formula trans, for "OCH" read -- $OCH_3$ --. Column 19, line 48, for "mthoxy" read -- methoxy --; line 64, for "$C_{18}H_{29}NO_2$" read -- $C_{19}H_{29}NO_2$ --. Column 21, line 9, for "cis-β-α-" read -- cis-β-γ --; line 16, for "-2-hexa" read -- -2-(hexa --; line 48, for "268(757;" read -- 268 (757); --; line 50, for "H, 913" read -- H, 9.13 --; line 54, for "hydro-1-" read -- hydro-1H- --; line 75, for "60.0 g." read -- 60.6 g. --. Column 22, line 24, for "yl(cyclo" read -- yl)cyclo --; line 42, for "were absorber" read -- were absorbed --; line 54, for "(357;" read -- (357); --; line 55, for "$C_{20}H_{18}$" read -- $C_{20}H_{28}$ --. Column 24, line 29, for "the oil" read -- this Page 2

UNITED STATES PATENT OFFICE
CERTIFICATE OF CORRECTION

Patent No. 3,595,867                           Dated   July 27, 1971

Inventor(s)   Jacob Szmuszkovicz

It is certified that error appears in the above-identified patent and that said Letters Patent are hereby corrected as shown below:

oil --.   Column 25, line 43, for "480 mil." read -- 480 ml. --; lines 49-50, for ")-1-yl" read -- (-1-cyclohexen-1-yl --; line 64, for "aqueuos" read -- aqueous --.  Column 26, line 7, for "in ethanol in ethanol in" read -- in ethanol in --; line 58, for "Filtrate B'" read -- Filtrate B --; line 65, for "nirtogen" read -- nitrogen --.  Column 28, line 24. for "sh 27" read -- sh 227 --; line 71, for "2-[-(p-" read -- 2-[p-( --.  Column 29, line 61, for "[p-methyl" read -- 2-[p-(methyl --.  Column 32, line 5, for "(p-hydroxyphenyl-2" read -- (p-hydroxyphenyl)-2- --.  Column 34, line 5, for "ι-2,5" -- α-(2,5 --; line 10, for "α-(butylphenyl)" read -- α-(2-butylphenyl) --.  Column 35, line 51, for "(6,000);" read -- (6,600) --; line 60, for "0.001 mole)" read -- 0.01 mole) --.  Column 38, line 50, for "(12,350)." read -- (12,350); --; line 57, for "[2(" read -- [2-( --.  Column 39, line 1, for "(α-p-" read -- (α,p- --; line 2, for "thoxybenzyl" read -- thoxybenzyl) --; line 31, for "[2-α-" read -- [2-(α- --; line 43, for "(1.550)" read -- (1,550). --.  Column 43, line 68, for "pyrroldine" read -- pyrrolidine --; line 70, for "(2-pyrrolidinyl" read -- (1-pyrrolidinyl --.  Column 44, line 12, for "2-,2" read -- 2-(2- --.  Column 45, line 50, for "[2(" read -- [2-( --; line 59, for "113-135° C." read -- 133-135° C. --.  Column 46, line 65, for "[2(" read -- [2-( --.  Column 47, line 35, for "an d diluted" read -- and diluted --; lines 36-37, for "washed sodium hydroxide solution and diluted with water. The" read -- washed with water and dissolved in methylene chloride. The --.  Column 49, line 33, for "N, 3.63" read -- N, 3.62 --; line 57, for "-2-hexa" read -- -2-(hexa --.  Column 50, line 17, for "(79%) cis" read -- (79%) of cis --; line 35, for "Cl, 9.97" read -- Cl, 7.97 --; line 49, for "pipidino" read -- piperidino --.  Column 51, line 7, for "methanol)" read -- methanol --; line 12, for "180 ml." read -- 100 ml. --; line 12, for "at a room" read -- at room --; line 61, for "3,4,5-trimethoxy)" read Page 3

UNITED STATES PATENT OFFICE
CERTIFICATE OF CORRECTION

Patent No. 3,595,867          Dated   July 27, 1971

Inventor(s)  Jacob Szmuszkovicz

It is certified that error appears in the above-identified patent and that said Letters Patent are hereby corrected as shown below:

-- 3,4,5-trimethoxyphenyl) --. Column 52, line 16, for "2-hexahydro" read -- 2-(hexahydro- --; line 38, for "(hexahydro--1H. read -- (hexahydro-1H --. Column 53, line 2, for "octamethylenedimino" read -- octamethyleneimino --. Column 54, line 6, for "α-2-propyl" read -- α-(2-propyl --. Column 55, line 31, for "2-hexahydro" read -- 2-(hexahydro --; line 41, for "2-hexahydro" read -- 2-(hexahydro --; line 51, for "with a" read -- with --. Column 56, line 2, for "1-[2-α" read -- 1-[2-(α --; line 26, for "2-hexahydro" read -- 2-(hexahydro- --; line 59, for "[2-α" read -- [2-(α --; line 64, for "tartaric acid acid" read -- tartaric acid --; line 75, for "-130°" -- -103° --. Column 57, line 13, for "106.6" read -- 106.5 --; line 49, for "1.45 g.a material" read -- 1.45 g. of material --; line 49, for "150-107°" read -- 105-107° --; line 65, for "H, 9:45" read -- H, 9.45 --. Column 58, lines 51-55, for "  " read -- -N⌒Z --.

Signed and sealed this 14th day of November 1972.

(SEAL)
Attest:

EDWARD M. FLETCHER, JR.            ROBERT GOTTSCHALK
Attesting Officer                   Commissioner of Patents